United States Patent [19]
Epard et al.

[11] Patent Number: 5,241,625
[45] Date of Patent: Aug. 31, 1993

[54] SCREEN IMAGE SHARING AMONG HETEROGENEOUS COMPUTERS

[75] Inventors: Marc A. Epard; He Ping; Neal E. Trautman; Paul F. VanVleck, all of Lawrence, Kans.

[73] Assignee: Farallon Computing, Inc., Alameda, Calif.

[21] Appl. No.: 620,544

[22] Filed: Nov. 27, 1990

[51] Int. Cl.⁵ .............................................. G06F 15/20
[52] U.S. Cl. ................................................... 395/163
[58] Field of Search ................. 364/DIG. 1 MS File, 364/DIG. 2 MS File; 395/159, 163, 200, 153

[56] References Cited

U.S. PATENT DOCUMENTS 4,860,247 8/1989 Uchida et al. ................. 395/163 X
4,903,218 2/1990 Longo et al. .............. 364/DIG. 2 X
4,937,036 6/1990 Beard et al. ............... 364/DIG. 1 X
4,958,303 9/1990 Assarpour et al. ................. 395/163
5,072,412 12/1991 Henderson, Jr. et al. .......... 395/159
5,119,319 6/1992 Tanenbaum .................... 395/153 X Primary Examiner—Thomas M. Heckler
Attorney, Agent, or Firm—Davis & Schroeder

[57] ABSTRACT

A system for remotely observing and optionally controlling information, including text and graphical images, displayed on a computer from among both homogeneous and heterogeneous computers coupled in a network or via other transport media such as magnetic disks captures window system event messages during a recording process. Such messages are then translated into procedure calls during the imaging process on the destination platform.

45 Claims, 24 Drawing Sheets

MACINTOSH SCREEN IMAGING

MACINTOSH IMAGING WITH QUICKDRAW CAPTURE AND PLAYBACK

SCREEN IMAGE SHARING AMONG HETEROGENEOUS COMPUTERS

BACKGROUND OF THE INVENTION

The present invention relates to sharing information among computers of different types. In particular, this invention relates to a system for remotely observing and optionally controlling information, including text and graphical images, displayed on a computer from among both homogeneous and heterogeneous computers coupled to each other in a network environment or via other transport media such as magnetic disks. Such observation and control may be in real-time over a network or may be deferred or delayed. In the context of the present invention, a computer refers to personal computers such as the Macintosh, manufactured by Apple Computer Inc., and the PC-AT and PS/2, manufactured by the International Business Machines Corporation. Such control and observation of information in a network which includes workstations such as the Sun-3 and Sun-4 families of workstations manufactured by Sun Microsystems, Incorporated, is also possible utilizing the present invention where such workstations have common libraries of graphics routines in their windowing systems.

The technology of computer screen sharing is widely known and used among computers of the same or compatible design ("homogeneous computers"). The hardware and program configuration of a computer, particularly a personal computer, is also currently often referred to as a "platform". Substantial difficulty arises when users of different computer platforms ("heterogeneous computers") wish to share information presented on their respectivescreens. A substantial part of the difficulty in sharing information among heterogeneous computers is attributable to differences in drawing commands of the windowing systems used by different computer platforms to present information to the user on the screen of his particular computer system.

Most computer window systems, including Macintosh, MS-Windows and the X-window system, are event of message driven. Graphics operations are often the most complex part of any window system simply because so many different effects and variations are required to satisfy a wide range of applications. Therefore, window systems incorporate a library of graphics routines designed specifically for the particular window system. The library graphics routines process complex graphic operations for presentation on the monitor screen of the computer. For example, in a Macintosh, the graphics library "QuickDraw", which is part of the Macintosh Operating System (MacOS), produces images on the screen thereof or off-screen. QuickDraw may also be used by a host computer to produce images on other Macintosh computers or on a homogeneous network of Macintosh or Macintosh-compatible computers. Similarly, in a PC-AT or other compatible computers, the MS-Windows program manufactured and marketed by Microsoft, Inc. provides analogous screen drawing routines via a Graphics Device Interface (GDI) library which is used for imaging all complex graphic operations either on or off screen. Similarly, GDI may be used by a host computer to produce images on other networked PC-AT computers quickly and precisely because both recording and playback of graphic images are performed on the same platform. However, controlling screen images in a heterogeneous computer environment, either deferred or dynamically (i.e. later in time on another computer or in real-time on a network, respectively) requires further processing.

In the prior art, U.S. Pat. No. 4,823,108 describes a method for displaying information in overlapping windows on a video display of a computer controlled video display system independent of the operating system of the computer. The method of this invention enables computer program output display data to be written within windows on the video display without substantial modification of the application program by writing such data to a pseudo screen buffer for temporary storage. The contents of the pseudo screen buffer are then compared with the contents of a previous image buffer at selected, timer-controlled intervals. At memory locations where the data differs, the differing data are written into the previous image buffer. As display data is thereby identified and periodically updated, it is displayed in selected windows. While the disclosed invention describes an application program display output independent windowing environment, the disclosure does not teach screen sharing of graphics displays among heterogeneous computers and is silent as to screen image sharing among networked heterogeneous computers.

Also in the prior art, U.S. Pat. No. 4,538,993 provides a classroom computer network which may comprise heterogeneous computers. However, since the primary station receives only video and audio signals which are controlled via either an analog or digital switch, no interactive control of remote secondary stations display is available to either the primary or secondary station users.

Further in the prior art is U.S. Pat. No. 4,622,545 in which methods and means are described for comparing existing and new regions to be displayed, one scan line at a time, and region operators are provided to specify precedence between the existing and new regions. Employing an inversion point imaging technique, new regions are appropriately clipped so that only required portions of a region are actually displayed to achieve desired graphic representations. Again, however, there is not teaching of interactive use and control of a second screen image from a first homogeneous or heterogeneous computer, whether connected directly or via a network.

The usefulness of remotely sharing information among computers on which such information is presented as images on monitor screens is boundless. For example, an obvious instructional aid, such systems can be used in multi-classroom teaching and multi-site industrial training environments. In addition, systems for sharing screen-imaged information are also useful in communications networks. While presently available products utilize screen sharing among homogeneous computers and also provide limited text screen sharing among heterogeneous computers, the technology for computer screen sharing of graphics data and images is limited as indicated by the prior art described avove. Therefore, it is both useful and desireable to provide a system for observing and optionally controlling information, including text and graphical images, displayed on a computer from among both homogeneous and heterogeneous computers coupled to each other in a network environment or statically via other transport media such magnetic disks. It is particularly desireable to provide such a system in which no modification of the graphics library interfaces or application programs being run is required.

SUMMARY OF THE INVENTION

The present invention allows users to remotely control and observe information, including both text and graphical images, displayed on a computer screen from among both homogeneous and heterogeneous computers coupled to each other in a network or, statically, via other transport media. Graphics commands which drive a computer window system and which are captured during the recording phase may be saved as a stored record or sent to other computers via computer networks, modems or ISDN. If the computer which is used to playback the captured messages (hereafter also referred to as "guest" or "destination computer") is of the same or a compatible type as the recording computer (hereafter also "host" or "source computer"), computer screen sharing is said to be homogeneous. If the computers are different types, the screen sharing is heterogeneous.

A message translation program according to the present invention ("translation program") translates the captured messages for delayed playback on the playback computer. Implementation of the translation package varies for each computer and window system coupled to each other, either directly or in a network environment.

A system for sharing computer screen information among homogeneous and heterogeneous computers according to the present invention translates graphics messages of one computer, for example, QuickDraw in a Macintosh, into the graphics procedure calls of another computer, for example, MS-Windows/GDI on a PC-AT. Conversely, the system of the present invention also translates graphic messages of the second platform, i.e., PC-AT/MS-Windows, into the graphics procedure calls of the first platform, i.e. Macintosh/QuickDraw. The capture/translation configuration of the system of the present invention also facilitates rapid and precise sharing of screen information among homogeneous platforms.

DESCRIPTION OF THE DRAWING

For fuller understanding of the present invention, reference is made to the accompanying drawing in the following detailed Description of the Preferred Embodiment of the invention. In the drawing.

Identical reference numbers refer to the same or equivalent parts of the present invention throughout the several figures of the drawing.

DESCRIPTION OF THE PREFERRED EMBODIMENT

A system for remotely observing and optionally controlling information, including text and graphical images, displayed on a computer screen from among computers constructed according to the preferred embodiment of the present invention provides for such control and observation of information among both homogeneous and heterogeneous computers coupled to each other in a network or via other transport media such as magnetic disks. Thus, referring to FIGS. 1A–2B, the system according to the present invention may be used with two or more homogeneous computers, such as the Macintosh 11, and with two or more heterogeneous computers, such as the Macintosh 11 and the PC-AT 13. Moreover, the system of the present invention may be used with both homogeneous and heterogeneous computers such as two Macintosh computers 11 and one or more PC-AT computers 13. Further, the system of the present invention may be used with more than two different kinds of computers in a heterogeneous environment, as, for example, a Macintosh 11, a PC-AT 13 and another Macintosh 11. In addition, the homogeneous or heterogeneous computer platforms may be coupled directly or in a network 17, or via telephone or other communication or transportation media 15, such as magnetic disk. It should be noted that the principles of the present invention are equally applicable to any combination of homogeneous and heterogeneous computers, including, but not limited to, the Macintosh and the PC-AT.

For purposes of describing the present invention, homogeneous screen sharing will be described with reference to Macintosh computer systems using QuickDraw, and heterogeneous screen sharing will be described with reference to Macintosh and PC-AT computer systems in which the PC-AT uses MS-Windows that incorporates the Graphic Device Interface (GDI).

QuickDraw

Figure 1A:
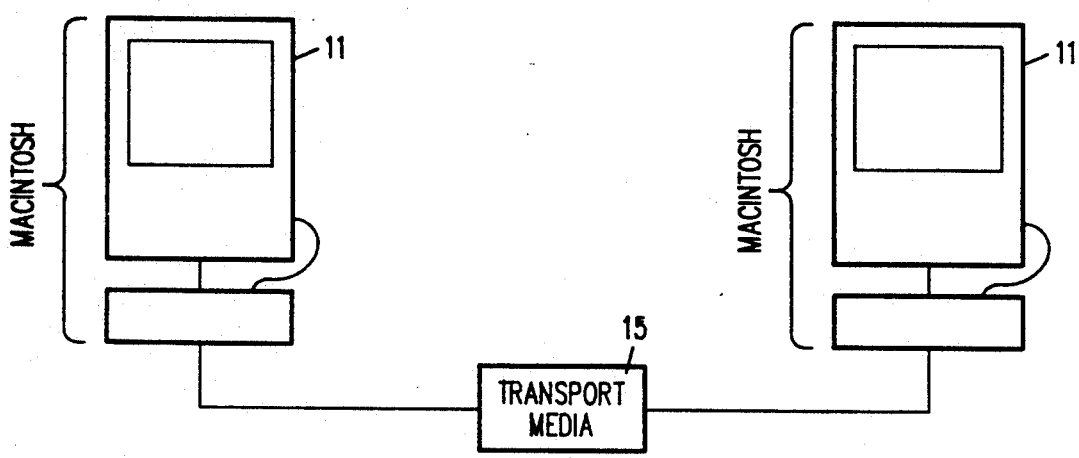
FIGS. 1A and 1B are system diagrams of homogeneous computers coupled for sharing screen information according to the present invention.
Figure 1B:
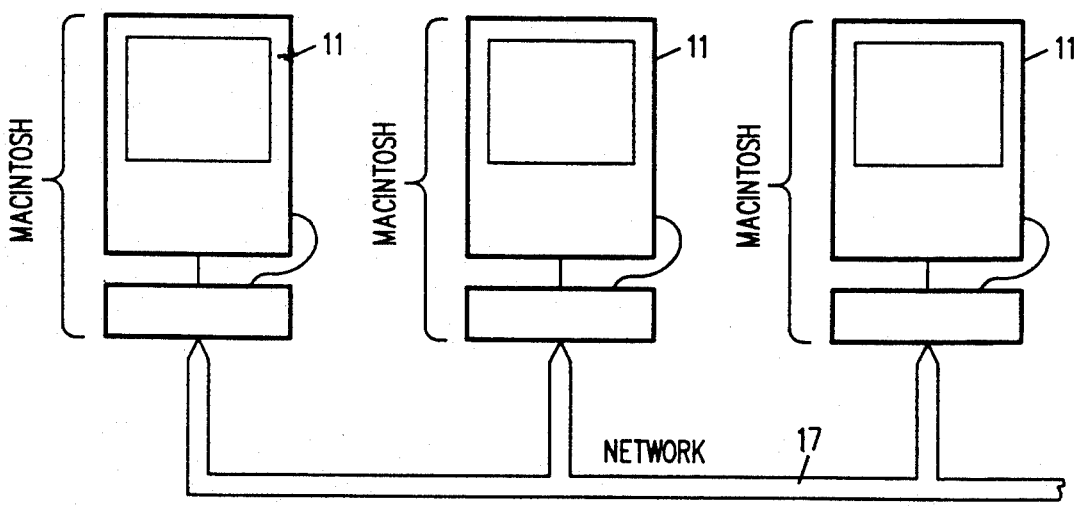
Figure 2A:
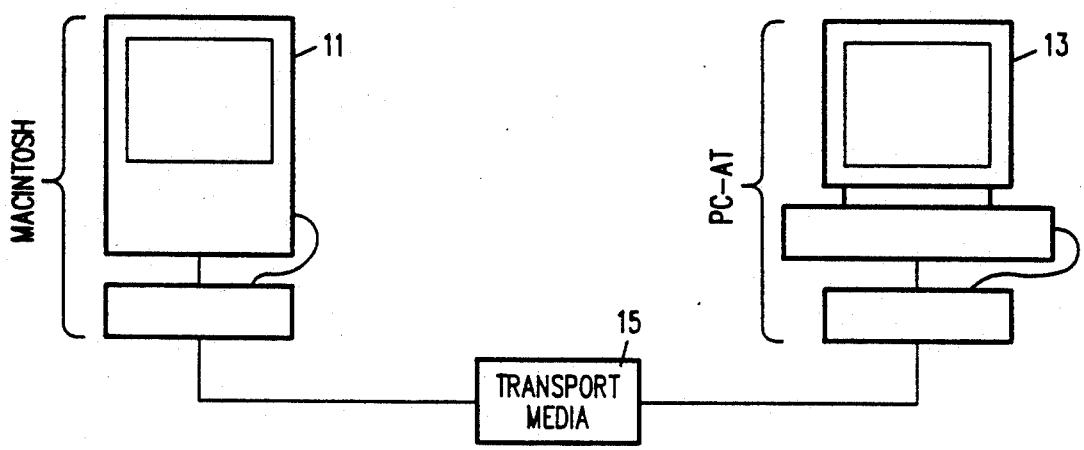
FIGS. 2A and 2B are system diagrams of heterogeneous computers coupled for sharing screen information according to the present invention.
Figure 2B:
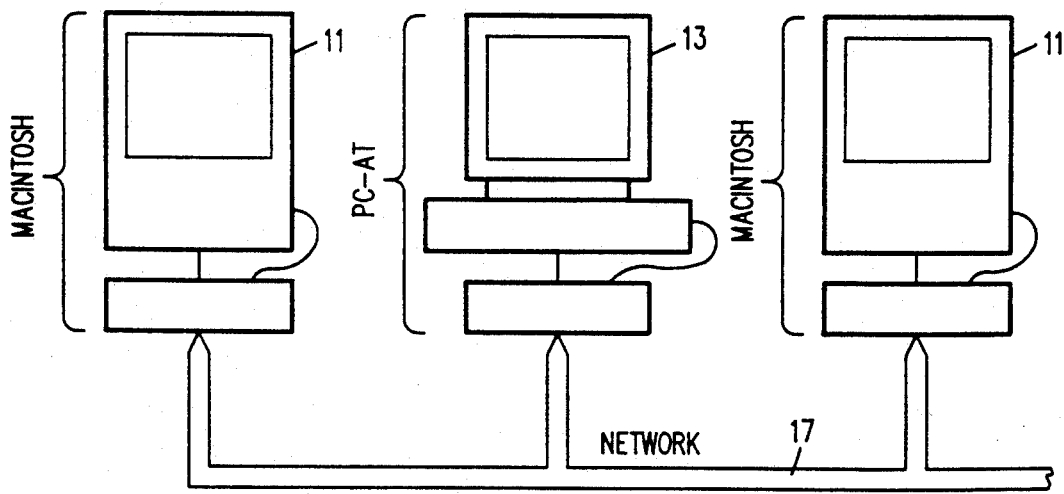
Figure 3A:
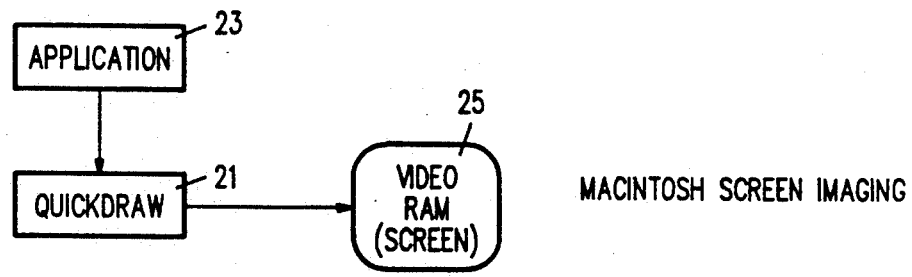
FIGS. 3A–3C are detailed block diagrams of prior art systems for recording, translation and playback of screen information among homogeneous computers.

Referring now to FIG. 3A, QuickDraw 21 converts graphics commands from higher-level application program 23 for presentation on video screen 25. QuickDraw 21 is the graphics library which is built into every Macintosh personal computer, and is described more fully in "Inside Macintosh, Vol. 1, by Apple Computers Inc., 1985 which is incorporated by reference as if fully set forth herein. Macintosh computers include a high resolution, memory mapped, raster graphics display screen 25 upon which text and graphics appear. Everything on the screen 25 is usually drawn with the QuickDraw 21 routines supplied in the Macintosh's ROM (not shown). It should be noted that not everything which can appear on the screen is drawn with QuickDraw 21 routines.

QuickDraw 21 works by manipulating the bits in a special area of memory called the frame buffer (not shown). The bits in the frame buffer memory represent the pixels on the display screen. The Macintosh hardware constantly keeps the frame buffer image updated on the display.

Occasionally, some Macintosh application 23 programs display images on the screen 25 by directly manipulating bits in the frame buffer. Usually, however, everything on the screen is drawn by QuickDraw 21.

QuickDraw 21 defines some clear mathematical constructs that are widely used in its procedures, functions and data types. The most basic QuickDraw type is the point which consists of two integers for specifying a horizontal and vertical position in a coordinate plane. Other types are lines, rectangles, ovals, arcs, rounded-corner rectangles, polygons, and regions. Many drawing operations consist of filling or framing these objects with a pattern.

In QuickDraw 21, a line is specified by its two endpoints. A rectangle consists of two points which specify the location of the top left and bottom right corners of the rectangle. Ovals, arcs, and rounded-corner rectangles are defined by their enclosing rectangle. An arc is defined as a wedge within an oval and is specified by the oval's rectangle and the starting and ending angles. Rounded-corner rectangles contain additional integers specifying the height and width of the ovals at the corners. A polygon is defined by a sequence of connected lines.

One of the most powerful QuickDraw data types is the region. A region is a set of spatially coherent points. The outline of a region is one or more closed loops. A region can be concave or convex, can consist of one area or many disjoint areas, and can even have holes in the middle.

A pattern is a 64-bit image, which is organized as an 8-by-8-bit square. Patterns can be used to draw lines and shapes or to fill areas on the screen. A pattern represents a repeating design, such as stripes or a gray pattern. When a pattern is drawn, it is aligned such that adjacent areas of the same pattern will blend into a continuous, coordinated pattern. Most QuickDraw 21 drawing operations consist of applying a pattern to a specific graphic object.

Lines are defined by two points: the current pen location and a destination location. When drawing a line, QuickDraw 21 moves the pen along the line defined by these two points. As the pen moves across the bitmap, the bits under the pen are affected by the pen pattern and pen mode. The pen size determines how large an area of bits are affected as the pen moves.

Text

QuickDraw 21 supports drawing text in multiple fonts in various sizes and styles. A font refers to a complete set of up to 255 characters of one typeface. The characters may be drawn in any size expressed in points. One point is 1/72 inch. Characters may also be drawn with stylistic variations such as bold, italic, and underline.

QuickDraw 21 interacts with the Macintosh Font Manager (not shown) to obtain bit images and other information about a font. For each font, the Font Manager obtains the information from a Macintosh resource file. If a requested font is not available, the default application font will be substituted. If the bit image of a specified size is not available, QuickDraw 21 will attempt to scale another size font.

Drawing Environment

All QuickDraw 21 drawing is performed by altering a bit image in an area of memory. Usually this area of memory is the frame buffer for a graphics display. A bitmap in QuickDraw 21 is a data structure that defines a physical bit image in terms of the coordinate plane. A bitmap specifies a pointer to the bit image, the row width of that image, and a boundary rectangle that gives the bitmap both its dimensions and a coordinate system. QuickDraw 21 is different from many graphics packages in that each bit does not map to a point in the coordinate plane. Instead, bits fall between points. Thus, the smallest visible object, a pixel, is a one-by-one rectangle.

QuickDraw 21 allows the screen 25 to be divided into a number of separate drawing areas called grafPorts. Each grafPort has its own complete drawing environment that defines how and where graphic operations will have their effect. A grafPort contains all the information about one instance of graphic output that is kept separate from all other instances. Many grafPorts can be open at once and each one will have its own coordinate system, drawing pattern, background pattern, pen size and location, character font and style, and a bitmap in which drawing takes place. GrafPorts are fundamental to the Macintosh's overlapping window user interface.

Each grafPort has a bitmap which tells QuickDraw 21 which bits in memory to manipulate when any drawing is done in the grafPort. The bitmap associated with most grafPorts is the frame buffer so that drawing will occur on the screen 25. A grafPort does not necessarily have to draw on the screen 25. Any arbitrary area in memory can be associated with a particular grafPort in order to do off-screen drawing without disturbing the screen image. These images can then be rapidly moved onto the screen or printed, for example.

Each grafPort has a rectangle, called the portRect, which defines a subset of the bitmap (screen) for use by the grafPort. All drawing done with this grafPort appears within the portRect. Each grafPort also has its own clipping region which can be used by the programmer to further limit drawing to any subset of the grafPort's portRect.

Each grafPort has a drawing pen which is used for drawing lines, shapes, and text. The pen has four characteristics: a location, a size, a drawing mode, and a drawing pattern. The pen location is represented by a point which defines the pen location within the particular coordinate system of its grafPort. The pen is rectangular in shape. The pen size defines the height and width of the pen and is also represented as a point. To draw a 1-pixel thin line, for instance, the pen size would be set to 1 pixel high and 1-pixel wide before moving the pen along the bitmap which would leave a 1-pixel thick trail. One of the end-points for each QuickDraw line is the current pen location so that line drawing is always specified simply by specifying the next ending point.

The pen mode and pen pattern determine how the bits under the pen are affected as the pen moves over them when drawing lines and shapes. The pen pattern is a pattern which is like the ink in a pen. As the pen moves across the bitmap, the pattern ink from the pen blends into a continuous coordinated pattern. The pen mode determines how the pen pattern will affect the bits that are already under the pen as the pen draws lines and shapes. QuickDraw 21 examines each bit in the pen pattern and each existing bit in the bitmap and evaluates them according to the pen mode in order to determine what the resulting bit should be that is left behind as the pen moves during drawing.

The pen mode defines various logical operations between the pen pattern and the bitmap. For example:

Copy the pen pattern into the bitmap replacing any bits which were already there; and Perform a logical boolean operation between the pattern bits and the bitmap bits such as AND,OR,XOR, or NOT.

As a result, the pen mode can replace bits, selectively invert bits, or selectively force areas to be white or black.

Each grafPort has its own text font, style, mode, and size for drawing text within the grafPort. The text font selects one of many available typefaces for QuickDraw 21 to use when drawing text. The text size determines the size of characters to be drawn. The text style determines which, if any, transformations QuickDraw 21 should perform on the text, such as Outlining, Underlining, Shadowing, Bold, or Italics. The text mode defines which logical operation to use when transferring the final text bits onto the bitmap in a manner very similar to the discussion of pen mode. As text is drawn, it may invert the presentation so that black characters on white, or white on black, are displayed.

Whenever QuickDraw 21 draws anything either on the screen or off the screen, the drawing is produced:
 Always inside a grafPort, in the bitmap and coordinate system defined by the grafPort;
 Usually at the grafPort's pen location; and
 Usually with the grafPort's pen size, pattern, and mode.

Text drawing does not use the pen size, pattern, or mode, but it does use the pen location. Each character is placed to the right of the current pen location. The pen is moved to the right to the location where it will draw the next character. The text mode rather than the pen mode affects how text will affect the bits already on the bitmap.

Drawing Operations

There are five different drawing operations for drawing different image shapes, namely, frame, paint, erase, invert, and fill. Each of the shape-drawing operations can be applied to rectangles, regions, ovals, arcs, rounded-corner rectangles and polygons.

The frame operation causes the pen to trace around the inside of the shape. For example, the FrameRect operation will draw a rectangle. The size of the line forming the rectangle will be determined by the pen size. The line will be drawn in the pen pattern according to the pen mode.

The paint operation will completely paint the shape with the current grafPort's pen pattern and mode. The erase opertion will fill the shape with the grafPort's background pattern. The invert operations will invert all of the bits in the shape. The fill operation is very similar to the paint operation, except that the pattern is specified directly and the pen pattern is ignored.

In addition to the shape-drawing operation, QuickDraw 21 provides routines to draw text and to perform bit-copy operations. Text is draw as described above. A bit image may be copied to and from any bitmap on-or off-screen. A procedure is also provided to scroll the contents of any rectangle in any direction.

Bottleneck Procedures

For each shape that QuickDraw 21 can produce, there are separate procedures that perform the basic graphic operations to produce that shape: frame, paint, erase, invert, and fill. Each of these procedures in turn calls a low-level internal QuickDraw routine for that shape to actually perform the drawing. For example, the FrameOval, PaintOval, EraseOval, InvertOval, and FillOval procedures in QuickDraw 21 actually call a single low-level routine within QuickDraw 21 which performs these operations on ovals. There are also low-level procedures for drawing text, lines, performing, bitcopy operations.

Low-level routines are also called the bottleneck procedures. The main QuickDraw bottleneck procedures are: StdText, StdLine, StdBits, StdRect, StdRRect, StdOval, StdArc, StdPoly, and StdRgn. It is possible to intercept calls to the bottleneck procedures and perform additional or substitute processing. This capability is central to the screen-sharing operations of directly coupled or networked computers according to the present invention.

Color QuickDraw

Color QuickDraw in the Macintosh II ROM provides additional support for a frame buffer containing two, four, or eight bits per pixel in addition to the one bit per pixel of the original Macintosh QuickDraw. The value of each pixel represents an index into a color table. Each entry in the color table contains the values (16-bit, unsigned) of the red, green, and blue component of the corresponding pixel value. Entry zero (pixel value zero) always contains white (red=65535,-green=65535,blue=65535). The last entry (pixel value 3, 15, or 255, for 2-bit pixels, 4-bit pixels, or 8-bit pixels, respectively) always contains black (red, green, and blue are zero). The other entries can contain colors specified by an application. Thirty-two bit QuickDraw provides support for 16-bit and 32-bit (actually 24-bit) frame buffers. These frame buffer formats eliminate the need for color tables by specifying the red, green, and blue values directly in each pixel. A 16-bit pixel includes five bits for red, five for green, five for blue, and one unused bit. A 32-bit pixel contains eight bits each for red, green, and blue, and eight unused bits.

The standard QuickDraw graphic objects (rectangles, regions, ovals, arcs, rounded-corner rectangles, and polygons) remain unchanged in color QuickDraw, but can also be drawn in color. The objects can be framed, painted, erased or filled with color patterns. The invert operation includes a "hilite" mode, and several additional transfer modes. The major differences for color QuickDraw are the pixel map, the pixel patter, and the color grafPort.

The pixel map is the color counterpart to Quick-Draw's bitmap. In addition to the bounding rectangle, row bytes, and pointer to the frame buffer, the pixel map includes color information such as the color table, depth, packing information, resolution, and format. Just as QuickDraw supported bit-copying, Color Quick-Draw supports directly copying pixel maps to and from the screen as well as to other pixel maps.

The pixel pattern specifies a color pattern. There are three types of color patterns: old-style patterns, full-color patterns, and RGB (red-greenblue) patterns. Old-style patterns are black and white patterns stored in a pixel pattern data structure. Full-color patterns contain a pixel map and color table and may be 2, 4, 8, 16; or 32 bits deep. RGB patterns contain four colors which when displayed together, or dithered, appear as yet a different color. RGB patterns are used to display colors which are not available on a 2, 4, or 8-bit device.

Color QuickDraw provides significant changes to the grafPort. The color grafPort includes RGB foreground and background colors, and color pixel patterns for the background, pen, and fill patterns. Additionally, support for fractional pen locations and character widening is included.

Color QuickDraw supports the QuickDraw operations of copy, AND, OR, XOR, and NOT, and adds new color modes. The "hilite" mode replaces the background color with a specified hilite color. The effect is similar to using a hilighter pen. Arithmetic modes (addOver, addPin, subOver, subPin, addMax, addMin, and blend) perform arithmetic operations on the red, green, and blue values of each pixel.

Color QuickDraw supports the same bottleneck procedures as QuickDraw. The only difference is that the procedures may be called to draw into a color grafPort as well as a black and white grafPort. When called with a color grafPort, pixel patterns and RGB colors are used for the drawing operations. When called with an old-system grafPort, black and white patterns and the old-style foreground and background colors are used.

MS-Windows GDI

Figure 4A:
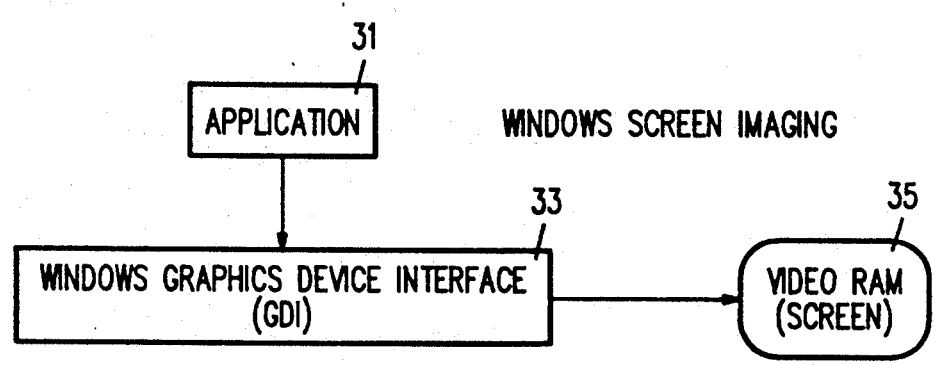
FIG. 4A is a block diagram of a prior art system for displaying graphics utilizing a windows graphics device (GDI) interface.
Figure 4B:
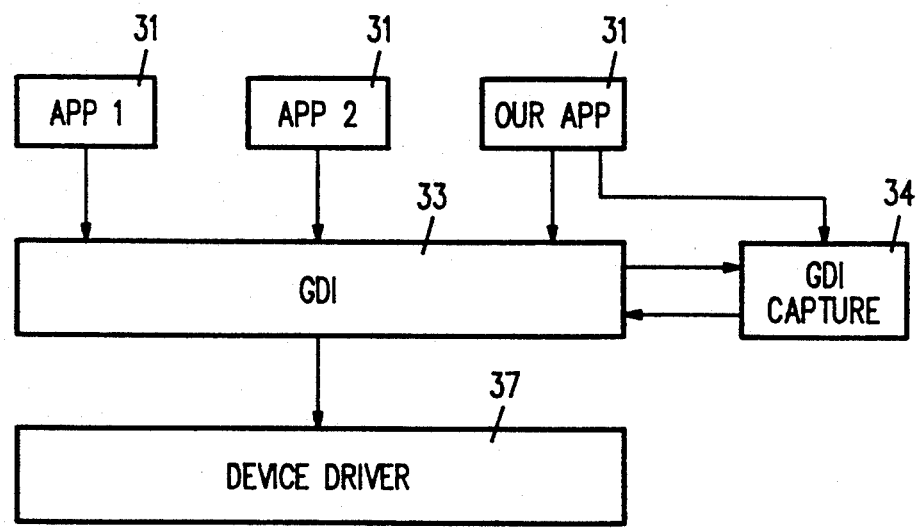
FIG. 4B is a block diagram of the system shown in FIG. 4A including a GDI capture module according to the present invention.

Referring now also to FIGS. 4A and 4B, MS-Windows is a software package manufactured and sold by Microsoft Corp. which provide a user interface, device independent graphics and program multitasking to PC-XT, PC-AT and PS/2 computers and computers which are compatible with them.

The Graphics Device Interface (GDI) 33 is the graphics package which is provided with MS-Windows. The GDI 33 is designed to work with a large number of different types of graphic display hardware. To achieve this, MS-Windows has been designed with the concept of a Device or Display Driver 37. A Display Driver 37 is a piece of code which is able to render certain primitive drawing commands onto a specific piece of display hardware, such as display screen 35. GDI 33 is able to use these primitive drawing commands to construct a more elaborate interface for high level programs. In this way, higher level programs can call the GDI package 33 and render images completely independent from the actual graphics hardware available.

The graphics device interface (GDI) contains the functions that perform device independent graphic operations within a Windows application. These functions create a wide variety of line, text, and bitmap output on a number of different output devices. GDI allows an application to create pens, brushes, fonts, and bit-maps for specific output operations.

Device-context attributes describe selected drawing objects (pens and brushes), the selected font and its color, the way in which objects are drawn (or mapped) to the device, the area on the device available for output (clipping region), and other important information. The data structure that contains these attributes is called the DC data block.

Drawing-tool functions create and delete the drawing tools that GDI uses when it creates output on a device or display surface.

A Windows application can use any of three tools when it creates output: a bit-map, a brush, or a pen. An application can use the pen and brush together, outlining a region or object with the pen and filling the region's or object's interior with the brush. GDI allows the application to create pens with solid colors, bit-maps with solid or combination colors, and brushes with solid or combination colors. (The available colors and color combinations depend on the capabilities of the intended output device.)

There are seven predefined brushes available in GDI; an application selects any one of them by using the GetStockObject function. The following list describes those brushes. There are six hatched brush patterns; an application can select any one of these patterns by using the CreateHatchBrush function. (A hatch line is a thin line that appears at regular intervals on a solid background.)

There are three predefined pens available in GDI; an application selects any one of them by using the GetStockObject function. In addition to selecting a stock pen, an application creates an original pen by using the GDI CreatePen function. This function allows the application to select one of six pen styles, a pen width, and a pen color (if the device has color capabilities). The pen style can be solid, dashed, dotted a combination of dots and dashes, or null. The pen width is the number of logical units GDI maps to a certain number of pixels (this number is dependent on the current mapping mode if the pen is selected into a device context). The pen color is an RGB color value.

Mapping functions alter and retrieve information about the GDI mapping modes. In order to maintain device independence, GDI creates output in a logical space and maps it to the display. The mapping mode defines the relationship between units in the logical space and pixels on a device.

Coordinate functions convert client coordinates to screen coordinates (or vice versa), and determine the location of a specific point. These functions are useful in graphics-intensive applications.

Clipping functions create, test, and alter clipping regions. A clipping region is the portion of a window's client area where GDI creates output; any output sent to that portion of the client area which is outside the clipping region will not be visible. Clipping regions are useful in any Windows application that needs to save one part of the client area and simultaneously send output to another.

Line output functions create simple and complex line output with the selected pen.

Regions functions create, alter, and retrieve information about regions. A region is an elliptical or polygonal area within a window that can be filled with graphical output. An application uses these functions in conjunction with the clipping functions to create clipping regions.

Ellipse and polygon functions draw ellipses and polygons. GDI draws the perimeter of each object with the selected pen and fills the interior by using the s brush. These functions are particularly useful in drawing and charting applications.

Bitmap functions display bitmaps. A bitmap is a matrix of memory bits that, when copied to a device, defines the color and pattern of a corresponding matrix of pixels on the device's display surface. Bitmaps are useful in drawing, charting, and word-processing applications because they let you prepare images in memory and then quickly copy them to the display.

Text functions retrieve text information, alter text alignment, alter text justification, and write text on a device or display surface. GDI uses the current font for text output.

Font functions select, create, remove, and retrieve information about fonts. A font is a subset of a particular typeface, which is a set of characters that share a similar fundamental design.

A font family is a group of typefaces that have similar stoke-width and serif characteristics. A typeface is a set of characters (letters, numerals, punctuation marks, symbols) that share a common design. Font characters share very specific characteristics, such as point size and weight.

Metalfile functions close, copy, create, delete, retrieve, play, and return information about metafiles. A metafile is a collection of GDI commands that creates desired text or images.

Metafiles provide a convenient method of storing graphics commands that create text or images. Metafiles are especially useful in applications that use specific text or a particular image repeatedly. They are also device independent; by creating text or images with GDI commands and then placing the commands in a metafile, an application can re-create the text or images repeatedly on a variety of devices. Metafiles are also useful in applications that need to pass graphics information to other applications.

Complete information on the GDI 33 and its programming interface is available in the Microsoft Windows Software Development Kit (SDK) which is incorporated by reference as if fully set forth herein. In particular, the "Reference" volume, Chapter 2 contains a detailed description of the functions GDI 33 provides. Chapter 4 of that same volume contains the specific parameters and values returned by all of the GDI functions.

QuickDrawCapture and QuickDrawPlayback

Figure 3B:
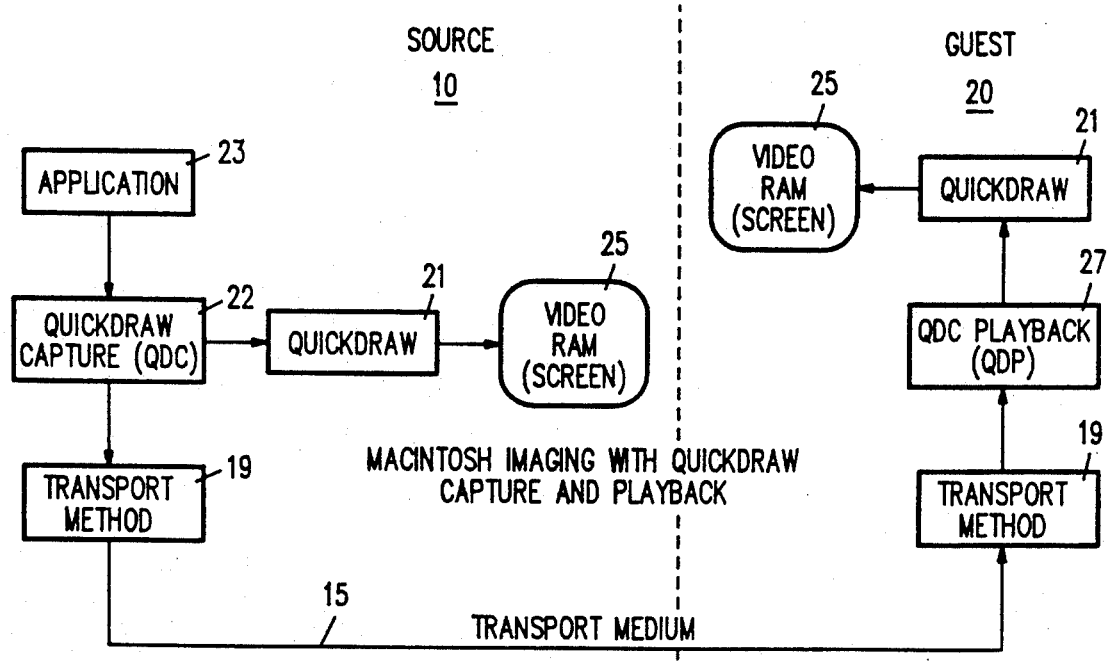
Figure 3C:
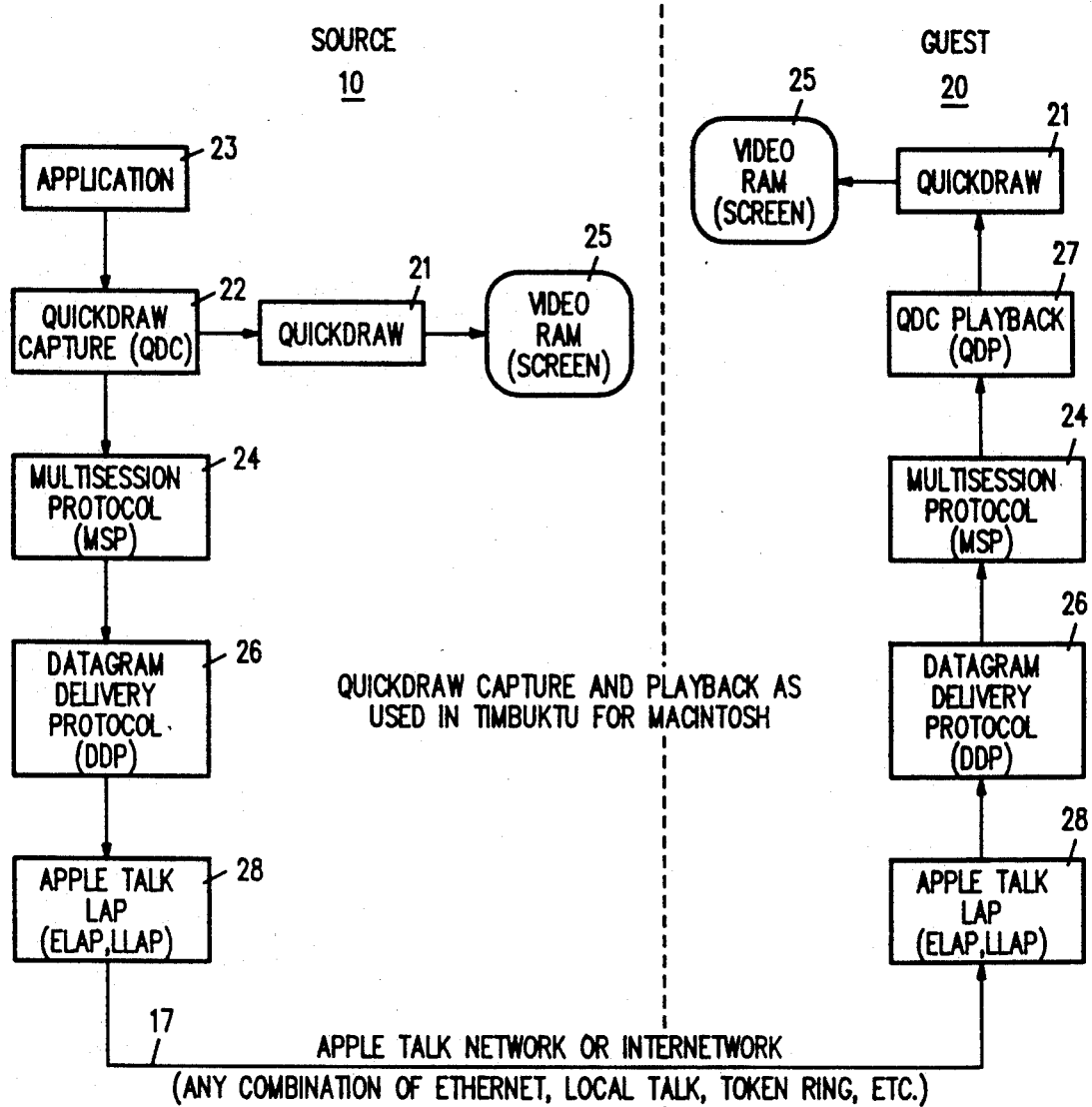

Referring now to FIGS. 3B and 3C, a host or source computer 10 broadcasts or relays or otherwise provides screen information and drawing commands to one or more destination or guest computers 20. In the exemplary systems shown, the source and guest computers 10, 20, respectively, are Apple Macintosh computers. As shown in FIG. 3B, Macintosh imaging via QuickDraw 21 may be transported from the source computer 10 to the guest computer 20 as a data file in a suitable transport medium 15, such as a stored file recorded on a magnetic disk, utilizing a suitable transport method 19, such as a modem or the mail system for the example of a magnetic disk. As shown in FIG. 3C, all screen data and drawing commands are communicated over a network 17 through a communications protocol referred to as the MultiSessionProtocol (MSP) 24. Datagram Delivery Protocol (DDP)-26 and AppleTalk LAP 28 provide a broadcast capability for efficient network utilization.

The source 10 and each guest 20 computer typically includes a bit-mapped display screen 25 on which text and graphic information is displayed. Application programs 23 typically draw to this screen 25 utilizing QuickDraw 21 which is included in the Macintosh ROM as described hereinabove. A QuickDraw Capture (QDC) module 22 installed in the source computer 10 intercepts application calls to the QuickDraw routines and sends them via the MSP 24 to a QuickDraw Playback (QDP) module 27 in each of the guest computers 20 to perform the identical drawing operations on each of the guest computer's 20 screen 25. Application programs 23 which do not utilize QuickDraw 21 are also accommodated by QDC 22 and QDP 27. A Macintosh desk accessory software module and a Macintosh startup document software module collectively referred to as "Timbuktu TM" comprises the guest portion of the MSP 24 and QDP 27 and the source portion of the MSP 24 and QDC 22, respectively.

With continuing reference to FIGS. 3B and 3C, the QuickDrawPlayback (QDP) program module 27 is used by the Timbuktu guest program. Timbuktu calls MSP 24 to read messages from the host, and passes them to QDP 27 which performs the drawing operations on the guest computer.

Timbuktu relates to a computer local area network (LAN), and comprises a method and system that permits one computer on the LAN to broadcast screen images or other data to some or all of the other computers on the network. Timbuktu In Timbuktu, one central computer called a host broadcasts data simultaneously to several computers, called the guests. The data is computer screen images or other data generated by an application program or a user at one of the computers. In the preferred embodiment, the host and guest computers are Apple Macintosh computers. In this embodiment, Macintosh computers connected with a conventional AppleTalk network, which lets one or more Macintoshes (i.e., nodes) in the network view the screen of and operate another Macintosh (i.e., node) in the network. Screen information and drawing commands are relayed from a host computer ("the host") to one or more guest (the "guest" or "client") computers, and user actions such as mouse movements and keystrokes are sent from the guests back to the host.

All screen data and user actions in Timbuktu are communicated through a communications protocol on the AppleTalk network. This protocol, called the MSP in the preferred embodiment of the present invention, uses AppleTalk's broadcast feature to achieve efficient utilization of the network. AppleTalk is fully described in Inside AppleTalk, Sidhu et al., Addison-Wesley, 1989.

Whereas QDC and QDP are responsible for sending drawing commands from the host to the guests, a software module called the Monitor module in Timbuktu obtains user events and mouse movements from guest users and relays them to the host. The Monitor module also provides a framework for managing differing font (i.e., character type face) availability between the host and guests.

Timbuktu is implemented as a combination of a Macintosh desk accessory (i.e., a piece of software) and a Macintosh startup document (i.e., a second piece of software). The desk accessory provides the user interface and includes the guest portion of MSP, QDP, and most of the Monitor module. The Macintosh startup document contains a driver (i.e., software) and an initialization module (i.e., software) which installs the driver in the macintosh's RAM when Macintosh is started. The driver contains the host portion of MSP as well as QDC and the host portion of the Monitor module.

Using the open architecture of AppleTalk to create the MSP, user generated data is broadcast over the network. MSP broadcasts data to all nodes on a network to provide efficient reliable, in-order delivery of a bytestream (i.e., data) from a socket in one node, the host, to sockets in multiple other nodes, the clients, on an internet. MSP also provides best-effort delivery of datagrams to the clients, reliable, sequenced delivery of packets from any guest to the host, and best-effort delivery of datagrams from any guest to the host.

Although some of these functions can be accomplished to a limited extent in the prior art without using broadcasting, broadcasting provides very efficient utilization of the available network bandwidth. Generally, MSP broadcasts each packet of user data just once for each network. All the guests on that network receive the packet and each sends a directed packet to the host acknowledging receipt. Since the Datagram Delivery Program (DDP) only provides best-effort delivery, occasionally some guests might not receive the broadcast packet. If the host does not receive an acknowledgment packet from each guest within a certain period of time, it rebroadcasts the packet. In this way, a packet is normally broadcast once on the network and each guest acknowledges with a short packet.

Using directed packets as is done in the prior art, a packet must be separately sent at least once to each client. In contrast, broadcasting data in accordance with Timbuktu reduces the number of packets containing user data sent from one per client to one per network and so increases network efficiency. Although the use of broadcasts does not eliminate any of the acknowledgment packets, these packets are typically short and account for a small portion of the bandwidth requirements.

Remote controlling and screen sharing functions are provided over an AppleTalk or other network. Further, a network broadcast capability is used to allow many guests to connect to one host with minimal increases in network bandwidth.

Timbuktu is preferably (although not necessarily) implemented wholly in terms of software, and has at least these advantages.

Data is sent once for all guests, instead of to each guest individually.

User generated data, not just network management packets, is broadcasted over the network. The guests can send data back to the host, for broadcast, if desired.

Broadcasts are sent over bridges to other networks.

Timbuktu is not limited to broadcasting of screen images. The same broadcast method can be used to send data files by taking such data from the host computer memory and broadcasting it to the guests. It is also not limited to AppleTalk networks or to Macintosh computers, but is implementable in any LAN having a broadcast or equivalent (such as multicast) capabilities and also with other kinds of computers, and achieves the same efficiencies as in the preferred embodiment of Timbuktu.

In accordance with Timbuktu (see FIG. 10A), an AppleTalk protocol called MSP 140 supports multiple guest computers such as 142G (only one of which is shown for simplicity) and one host computer 142H. In one embodiment of Timbuktu, included are Timbuktu driver 150 software installed in host 142H and Timbuktu Desk Accessory software 152 installed in each guest 142G. The driver 150 and Desk Accessory 152 are described in more detail below. MSP 140 installed in host 142H and guest 142G uses AppleTalk's capability to broadcast data packets to all the nodes on a network cable or wires or other media 144. By using broadcasts, the high volume of data representing Apple Macintosh commands from Quick Draw 135H is sent once to all guests 142G, instead of being sent to each guest individually (i.e., in directed fashion), thus substantially reducing the traffic demands placed on the network 144 by reducing the number of messages sent.

Figure 10A:
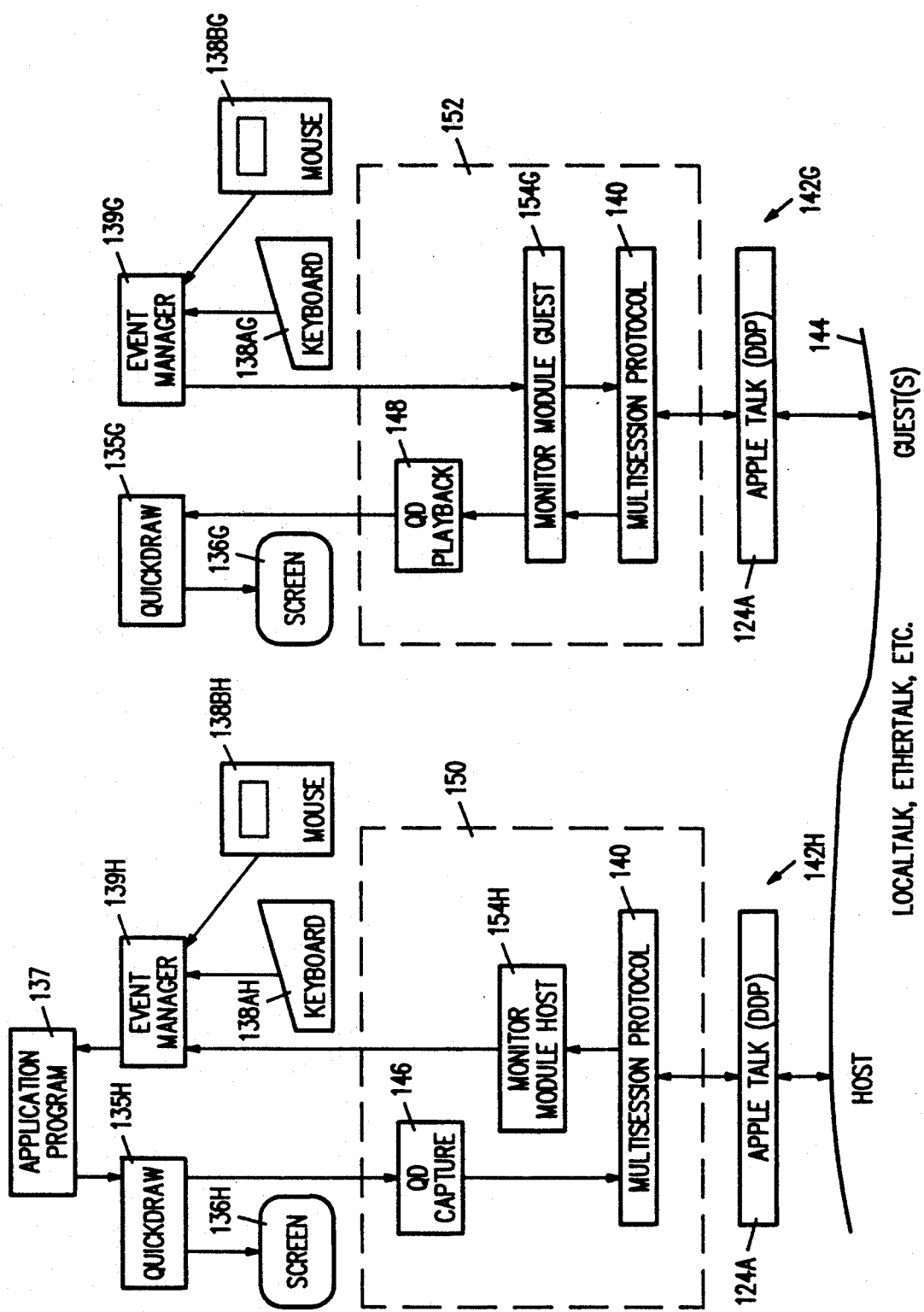
FIGS. 10A–10C show one embodiment of Timbuktu.

Other features shown in FIG. 10A are conventional application program 137, QuickDraw 135H, Event Manager 139H, Keyboard 138AH, screen 136H, mouse 138BH, and AppleTalk DDP 124A for the host 142H. Similarly, conventional screen 136G, Keyboard 138AG, mouse 138BG, Event Manager 139G, QuickDraw 135G, and AppleTalk DDP 124A are shown for a guest 142G.

a. MSP's Use of Statically-assigned Socket Numbers

In order to exploit DDP's (Datagram Delivery Protocol) 124A broadcast capability for efficient network utilization in the preferred embodiment of Timbuktu, each MSP guest 142G on a network must listen to the same particular socket number. MSP determines which is the particular socket number. Apple recommends that commercial products use socket numbers in the dynamic range. It is not practical to let DDP 124A assign the socket number because the DDP in each guest node is apt to pick a different socket number, eliminating the ability to broadcast to all the clients. The guests could, however, agree to use a prechosen socket number. This would enable the use of broadcast datagrams, but it creates two potential problems. First, the prechosen socket number might be in use by another process on one of the guests, preventing MSP from using it. Second, and more importantly, DDP on other nodes might have assigned the same socket number to other, non-MSP processes. When the MSP host broadcasts a datagram to the prechosen socket number, the non-MSP processes will also receive the datagram, possibly confusing them and causing errors.

To minimize these problems, MSP preferably uses socket numbers in the experimental range and allows the user to configure which socket number(s) to use. If other applications in the same or other nodes also use socket numbers in the experimental range, the user can assign different socket numbers to each of the applications. This technique will not work for dynamic socket numbers because it does not prevent DDP from picking the same socket for some other processes in other nodes. DDP will never give an experimental socket number to a process asking that DDP choose the number.

Thus, when an MSP host 142H needs to send a datagram to all the guests 142G on a network 144, the host 142H sends the datagram to the specific network number, the broadcast node number 255, and the socket number from the experimental range preconfigured by the user so as not to conflict with other processes in the MSP or other nodes.

b. Broadcast Groups

The guests 142G of an MSP host 142H are placed in groups so that all the members of a group are reached by a single broadcast or directed datagram. Usually, all the guests on one network are placed in one group and broadcast datagrams are used. However, it is possible that not all MSP guests are configured to use the same experimental socket number, and it is possible to configure an MSP guest to use only dynamic socket numbers. In these situations, additional groups are formed.

Since a datagram is broadcast only to one socket number on one network, guests are grouped by socket number as well as network number. If some guests use one experimental socket number and other guests on the same network use a different experimental socket number, guests are grouped by socket number.

Any guest using socket numbers which are in the dynamic range will be placed in a group by itself and so directed datagrams, rather than broadcast datagrams, are sent to that client. This is desirable if broadcast packets interfere with network performance or some devices on a network cannot tolerate high volumes of broadcast packets.

Because the Data Link layer in every node on a network responds to broadcast packets, broadcasting potentially puts a greater burden on all network nodes, even those not involved in an MSP session. For this reason, communication to any group which has only one member is done with datagrams directed to that member rather than broadcast. If an additional guest is added to such a group, the host will switch to broadcast datagrams.

Thus, a group is formed for each set of guests that have the same network and experimental socket numbers and for each guest using dynamic socket numbers. Datagrams are broadcast to groups with more than one member, but are directed to the single guest in a group of one.

c. Connections and Sessions

The MSP protocol includes "connections" and "sessions." A "connection" exists between the host and each of the guests. At any given time a host may have zero or more connections to as many guests, and connections may be opened or closed at anytime. When the first connection is opened, a "session" is said to have begun. The session ends when the last connection has been closed.

The potential for an MSP session is created explicity by the Timbuktu driver 150, which is software installed in the host computer 142H as shown in FIG. 10A. The host MSP software 140 (part of driver 150) watches for a request from a client (i.e., potential guest) 142G to open a connection.

When a request arrives, the host 142H first checks with the Timbuktu driver 150 to see if the client 142G is to be allowed access. The client 142G can include additional information in the request which is generally used for authentication. If the request is approved, the host 142H checks to see if the client 142G can be added to existing groups. If not, a new group is created. The host 142H then grants the request and the connection is said to be open. If the guest 142G was the first guest, a session is said to have begun. The host 142H continues to watch for requests from other clients and the process is repeated for each request.

To insure that late-arriving packets from previous connections will not interfere with a current connection, each connection has a pair of numbers assigned to it, referred to as connection IDs (Identifications). One ID is assigned by the host 142H and one by the guest 142G. The MSP host 142H picks a new "random" connection ID for each new group. That ID is assigned to each connection for the group and reported back to each guest 142G in the response granting an open request. All packets sent to the group include the connection ID and guests reject any packet with an incorrect ID. The MSP client generates a connection ID and sends it in the open request as well as all other packets sent to the host. The host then rejects any packets which have an incorrect ID. Additionally, the open confirmation sent from the host to the client contains the client's connection ID to insure the request and response are correctly paired.

d. MSP Data Streams

Once a session has begun, the host sends a stream of data with no missing or duplicate data. This data stream is delivered to all guests. A guest can also send a stream of data to the host for reliable delivery. Only the host receives data from a guest, and the other guests in the preferred embodiment of Timbuktu do not receive data directly from other guests.

To insure reliable, in-order delivery of stream data, each packet containing such data is numbered. The sender and receiver stay synchronized so the receiver always knows what packet number the sender will be sending next. Either the guest and host can be the sender or receiver. The receiver is required to acknowledge the receipt of each packet. When the receiver gets a packet with the correct packet number, it sends an acknowlegment, increments the expected packet number, and delivers the packet to the Timbuktu driver. If the received packet number is one less than the expected number, the receiver assumes the previous acknowledgment was lost and sends another. If the packet number is any other value, the packet is discarded.

In the preferred embodiment of Timbuktu, the sender does not send a new packet until the current packet has been acknowledged. For the guest-to-host stream, the guest as the sender waits to send a new packet until the acknowledgment for the previous packet has been received from the host. The guest then increments the packet number and sends the new packet directly to the host. If an acknowledgment is not received within a certain amount of time, the data packet is resent. The guest-to-host packet numbering for each guest starts at zero when that guest opens a connection. In other embodiments of Timbuktu, sending ahead is supported.

For the host-to-guest stream, packets are numbered separately for each group. When a packet is ready to be sent to a group, the host as the sender first waits until all the guests in that group have acknowledged the previous packet. Packets are sent (directed or broadcast) once for each group, but each guest in the group sends a separate acknowledgment. If any guest's acknowledgments are not received within a certain amount of time, the packet is resent (directed or broadcast). Because a group might have already existed when a new guest connects, the current packet number for the group is sent in the open response to a new guest.

Requiring acknowledgments for each packet and automatically resending packets guarantees that no packets are lost. Numbering each packet ensures that no packet will be received out of order and that no packet will be duplicated.

e. MSP Datagrams

In addition to data streams, which contain data to be reliably delivered to the receiver, MSP preferably supports datagrams which get only best-effort delivery. Datagrams may be sent from the host to all guests or from any guest to the host. Datagrams may be lost, duplicated, or delivered out of order. Because only best-effort delivery is required, packets containing datagrams are neither acknowledged nor numbered. Datagrams are sent (directed or broadcast) once per group from the host to the guests. Guest-to-host datagrams are sent with directed packets.

Guest-to-host datagrams also contain the last acknowledged host-to-guest packet number, just as it was sent in the acknowledgment packet. If an acknowledgment gets lost, a datagram can take its place, preventing unnecessary delays and packet retransmission.

f. Tickle Packets

To prevent accidentally closing a session when there is no data or acknowledgment to send, each end frequently sends special packets called tickles. Acknowledged packet numbers are also piggybacked onto tickle packets just as with datagrams (as described above).

g. MSP Packet Contents

Figure 11:
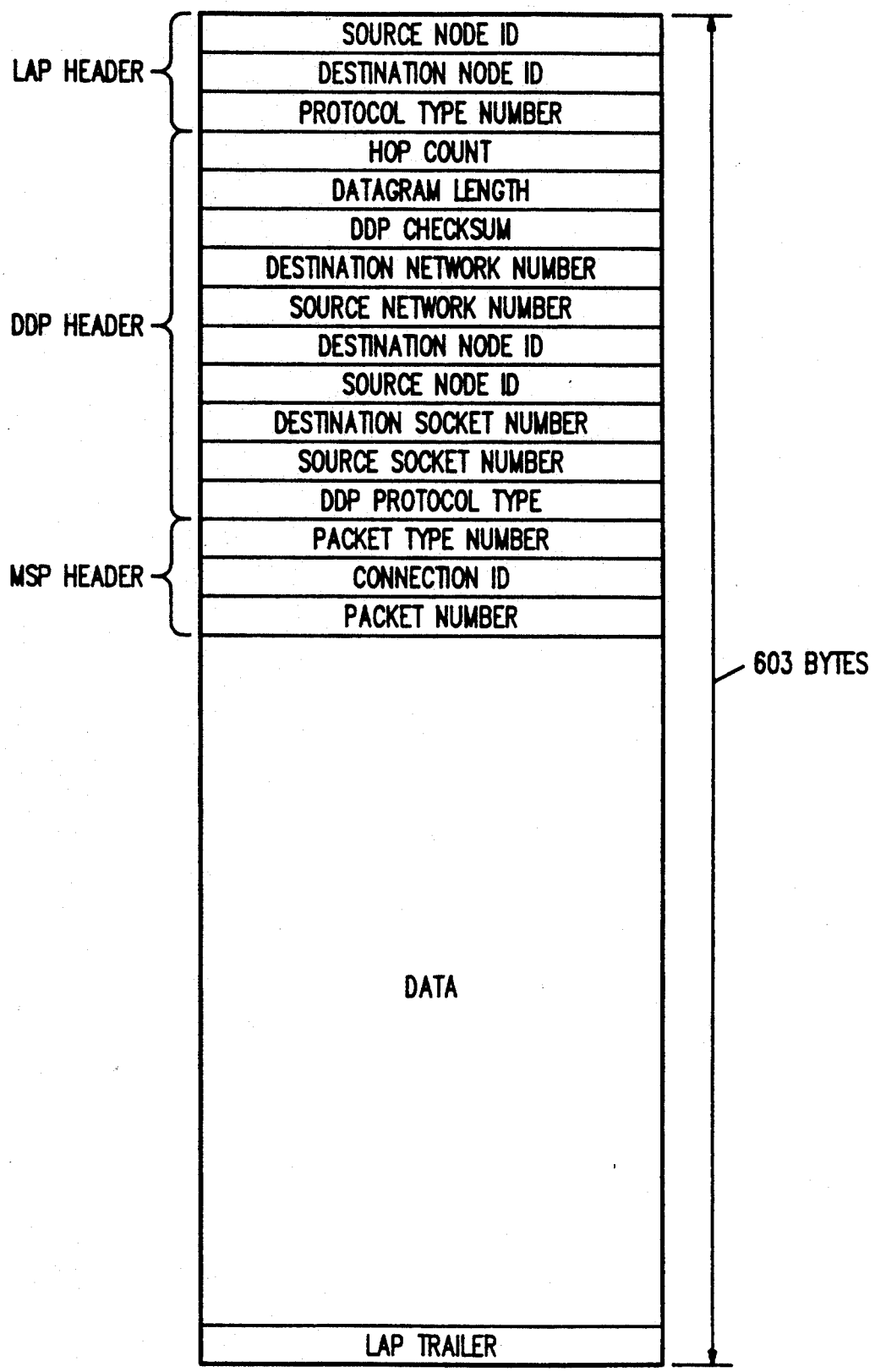
FIG. 11 shows the structure of a data packet in accordance with Timbuktu.

The MSP host and guests communicate by exchanging DDP datagrams which are referred to herein as packets, to avoid confusion with MSP datagrams. In addition to DDP and Link Access Protocol (LAP, i.e., AppleTalk) headers, each packet (see FIG. 11) contains an MSP header frequently followed by user data.

The MSP header indicates the packet type number, the connection ID, and a packet number. The MSP header is preferably four octets of eight bits each structured as follows: packet type (3 bits); connection ID (13 bits); packet number (16 bits); and 32 bits = 4 octets.

The MSP header and data are given to AppleTalk DDP which prefixes the packet with a conventional DDP header and hands the packet to the LAP (e.g., LocalTalk or EtherTalk LAP, i.e., LLAP or ELAP). The LAP layer encapsulates the packet with its LAP header (typically a source node ID, destination node ID and protocol type). The DDP header includes conventionally (1) a "hop count"; (2) a Datagram packet length; (3) a conventional DDP checksum; (4) a destination address including a destination network number, destination node number, and destination socket number; (5) a source address including a source network number, source node number, and source socket number; and (6) a DDP protocol packet type. ("Hop count" is a number conventionally relating to internet routers, i.e., bridges between networks). The entire packet is preferably at most 603 bytes long, the same maximum length as a conventional AppleTalk packet.

The types of packets are as follows:

| MSP Pkt. Type | Packet Type Name | Description |
|---|---|---|
| 0 | open request | Sent from a client to a host indicating a desire to participate in a session with the host. May contain client information for authentication or other purposes. |
| 1 | open response | Sent by the host to a client in response to an open request. The data portion of the packet contains an integer error code and the host's connection ID. |
| 2 | data stream | Sent by either the host or a client. Contains stream data for reliable, in-order delivery. |
| 3 | close | Sent by either the host or a client to indicate that the sender has closed a connection. No data is included. |
| 4 | datagram | Sent by either the host or a client. Contains a datagram which requires only best-effort delivery. |
| 5 | acknowledge | Sent by the recipient (host or client) of a pktdata (stream data) packet back to the sender as acknowledgment of the receipt of the data. |
| 6 | tickle | Sent regularly by host and clients to indicate a connection still exists. |
| 7 | unused | This type is unused and such packets are rejected. |

The connection ID number preferably ranges from 0 to 8191. The packet number preferably ranges from 0 to 65535.

Open request packets contain 0 for the packet type and packet number. The connection ID is the ID the client will be using for all packets sent to the host. The host remembers this ID and reject packets from the client with any other ID. Following the header are up to 64 bytes used as desired by higher-level software. Timbuktu uses this 64 byte area to send the password.

Open response packets contain 1 for packet type. The connection ID is the guest's connection ID. Response packets with any other connection ID are rejected as delayed from a previous connection. The packet number indicates the number of the next data packet the client should expect from the host. Following the header, response packets contain a two-byte error code and the host's connection ID. An error code of zero indicates that no error occurred and the connection is open. Any non-zero value indicates that the connection was not opened and can indicate the reason. All further packets from the host will contain the specified host connection ID and the guest will reject packets with any other ID.

Data stream packets, indicated by packet type 2, contain the sender's connection ID. The packet number is incremented by one for each packet. Following the header, data stream packets contain one or more data bytes. Host-to-guest packets may contain up to 582 bytes as limited by the maximum DDP packet size. Guest-to-host packets are preferably limited to 64 bytes to reduce memory requirements in the host.

Close or type 3 packets contain the sender's connection ID. The packet number is undefined and no data follows the header. Close packets may be sent by a guest to break a connection. The host may send a close packet directly to one guest to break the connection with that guest or it may broadcast a close to a whole group of guests. Three close packets are always sent together and are never acknowledged. It is assumed that one of the three packets will get to the destination(s). If not, the lack of tickle packets will eventually cause the connection to be broken.

Datagram packets contain packet type 4 and the sender's connection ID. Guest-to-host packets contain the latest acknowledged stream packet number in case the acknowledgement was lost. Host-to-guest datagrams contain zero in the packet number. The piggybacked acknowledgment is not used because each guest in a group of guests has a distinct packet stream and would be expecting a different value. Following the header, datagrams preferably contain up to eight bytes of user data. This rather low limit is intended to reduce guest and host memory requirements.

Type 5, acknowledgement packets, contain the sender's connection ID and the number of the packet being acknowledged.

Finally, tickle packets are type 6 and contain the sender's connection ID. The packet number is treated in the same fashion as it is for datagram packets.

h. MSP Host Interface

Figure 10B:
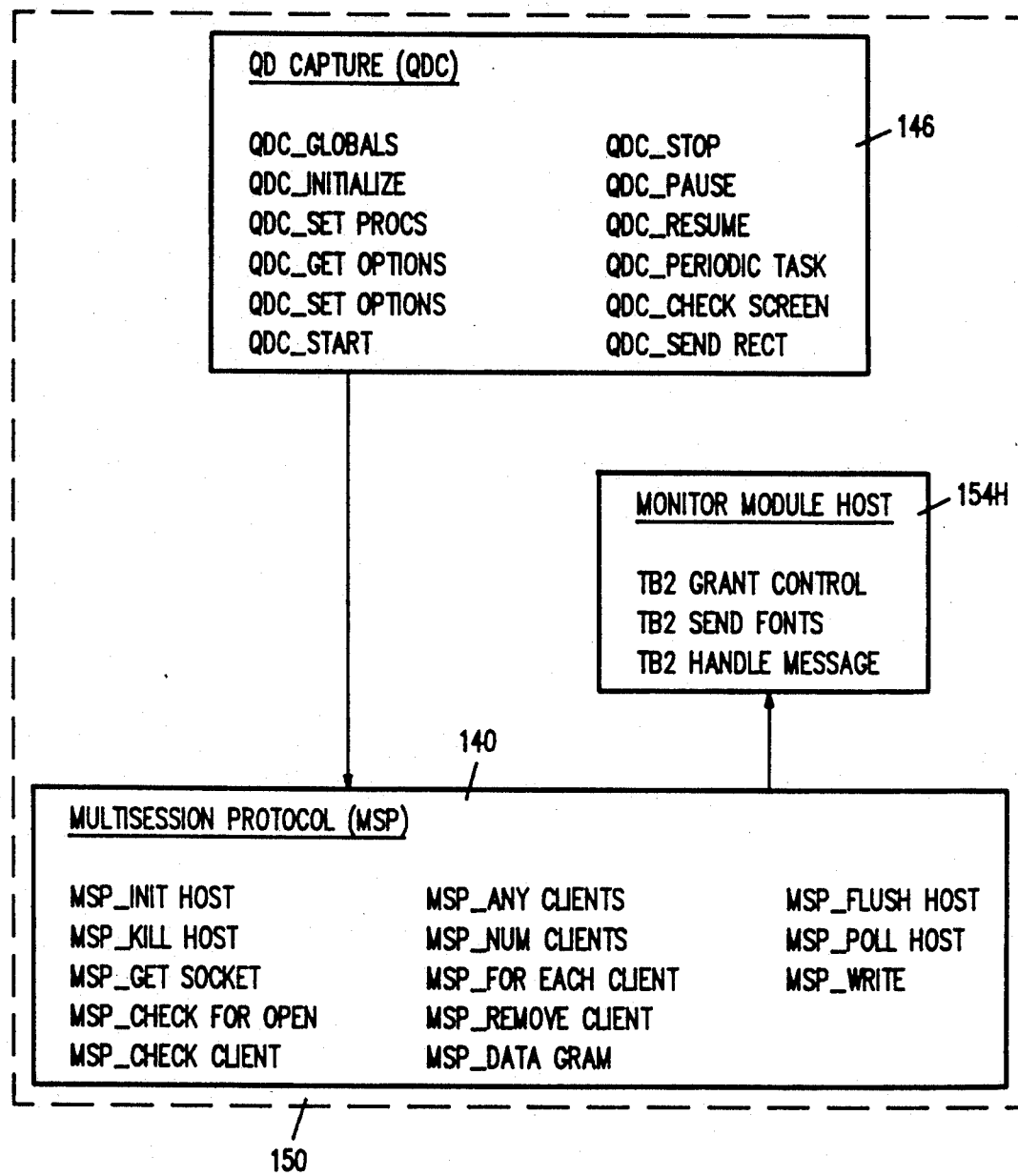

The interface to MSP 140 (see FIG. 10A) as seen by Timbuktu host 142H software differs from that of the guest 142G software. FIG. 10B shows Timbuktu driver 150 in more detail. The host interface in the preferred embodiment of Timbuktu consists of the called subroutines ("calls") described below. Each of these calls takes as a parameter an area of storage which MSP 140 uses to store the current state of the host 142H connections etc. While storage for this area is supplied by the Timbuktu driver 150, the contents are those of MSP 140. The calls in MSP 140 for driver 150 are shown in FIG. 10B, and described below.

MSP InitHost. This call initializes an MSP host record and prepares MSP to receive open requests. Any necessary DDP resources, such as a socket, are acquired. Call parameters: Pointer to storage for MSP host record; and returned parameters: Result code indicating success or failure.

MSP KillHost. This call closes all connections and releases any DDP resources. Call parameters: Pointer to MSP host record; and returned parameters: Result code indicating success or failure.

MSP GetSocket. This function returns the socket number to be used by clients (i.e., potential guests) for opening session. Call parameters: Pointer to MSP host record; and returned parameters: Socket number.

MSP CheckForOpen. This call checks to see if any client has requested a connection. If so, it allocates a client record for the client and calls a filter procedure, supplied by the Timbuktu driver 50. The filter procedure accepts or rejects a client and return a result code which is sent to the client. Call parameters: Pointer to MSP host record; and a procedure to be called to filter open requests (This procedure will be passed a pointer to the client record, the network address of the client and the data sent by the client in the open request. Although the client record is the property of MSP, it contains a 4-byte area, the "refCon," which is used by the Timbuktu Driver 50.). Returned parameters: Result code indicating success or failure.

MSP CheckClients. This routine is used to see if any guests have closed their connections. It notifies the Timbuktu driver 50 which guests have gone away. Call parameters: Pointer to MSP host record; and a procedure to be called for each guest being removed (A pointer to the guest record is passed to the procedure.). Returned parameters: None.

MSP AnyClients. This function is used to see if any guests are currently connected. Call parameters: Pointer to MSP host record; and returned parameters: Boolean result (True if any guests, False if none.).

MSP NumClients. This function is used to see how many guests are currently connected. Call parameters: Pointer to MSP host record; and returned parameters: Number of guests currently connected.

MSP ForEachClient. This call is used to perform processing for each of the current guests. For example, it is used to display a list of guests. Call parameters: Pointer to MSP host record; and A procedure to be called for each guest. Returned parameters: None.

MSP RemoveClient. This call closes the connection to one guest. Call parameters: Pointer to MSP host record; and Pointer to the guest record for the guest (This pointer is remembered from the CheckForOpen call or it is obtained using the ForEachClient call.). Returned parameters: Result code indicating success or failure.

MSP DataGram. This call sends a datagram to all the current guests. Call parameters: Pointer to MSP host record; Pointer to the data to send; and Length of the datagram. Returned parameters: Result code indicating success or failure.

MSP Write. MSP-Write is called to send data reliably to the guests. This call may or may not send the data immediately. MSP attempts to pack as much data as possible in data stream packets sent to the guests. As much of the specified data as will fit is placed in a packet buffer. When the buffer is filled, it is sent and new buffer is started. In addition, data is held for a minimum amount of time. After that time, the packet is sent whether or not it is full. Thus, even though MSP is a packet stream protocol, it provides a byte-stream interface to the host. Call parameters: Pointer to MSP host record; Pointer to the data to send; Length of the data; and A routine called while MSP is waiting for acknowledgments of previous packets (This routine calls MSP-PollHost to process any incoming data.). Returned parameters: Result code indicating success or failure.

MSP FlushHost. This call forces the current packet to be sent and waits to make sure it has been acknowledged by each guest. It is called before removing a guest or killing the host entirely to make sure all data has been delivered. (Not used in the preferred embodiment of Timbuktu.) Call parameters: Pointer to MSP host record; and A routine called while MSP is waiting for acknowledgements (This routine calls MSP PollHost to processing any incoming data.). Returned parameters: Result code indicating success or failure.

MSP PollHost. This call checks to see if any stream or datagram packets have been received from any guest. For each such packet, a routine supplied by the Timbuktu driver is called. Call parameters: Pointer to MSP host record; and A routine called for each datagram or stream packet (This routine is passed a pointer to the guest record of the guest who sent the packet, an indication of whether the packet contained stream or datagram data, a pointer to the data, and the length of the data.). Returned parameters: Result code indicating success or failure.

i. MSP Client Interface

The Timbuktu Desk Accessory 152 (see FIG. 10A) which is installed in each guest 142G, need not deal with many of the complexities which the host 142H must handle. As such, the interface presented by MSP to the Desk Accessory 152 is much simpler. The Timbuktu Desk Accessory 152 is shown in more detail in FIG. 10C. The following calls are provided by the MSP client software 140. Each of these calls takes as a parameter an area of storage which MSP 140 uses to store the current state of the client connection. While storage for this area is supplied by the Desk Accessory 152, the contents are MSP's 140. This record is not the same as the client or host records used in the MSP 140 interface in the host 142H.

MSP Open. This call requests a connection with a specified host 142H. The call provides the ability to limit the DDP socket numbers which the MSP client 142G will use. It also lets the Desk Accessory 152 send a password to the host 142H in the open request. Call parameters: Pointer to MSP client record; Network address of the host; List of sockets which may be used; Pointer to data (password) to be sent in the open request; and Length of open request data. Returned parameters: Result code indicating success or failure (This can include results returned by the procedure passed to MSP-CheckForOpen on the host.).

MSP Close. This call causes close packets to be sent to the host and tears down (i.e., eliminates) the connection. Call parameters: Pointer to MSP client record; and returned parameters: Result code indicating success or failure.

MSP HasData. This call is used to see if there is any stream data from the host available for reading. Call parameters: Pointer to MSP client record; and returned parameters: Result code indicating success or failure; and Boolean indicating true if there is data.

MSP Read. MSP-Read is called to read stream data sent by the host. The call will not return until the specified number of bytes have been received from the host. MSP HasData or MSP - ReadAvail are called before calling MSP-Read to prevent this. Call parameters: Pointer to MSP client record; Pointer to buffer to receive data; and Length of buffer. Returned parameters: Result code indicating success or failure.

MSP ReadAvail. Unlike MSP-Read, MSP-ReadAvail will return with whatever data is available. Call parameters: Pointer to MSP client record; Pointer to buffer to receive data; and Length of buffer. Returned parameters: Result code indicating success or failure length of data actually read.

MSP Send. MSP - Send is used to send stream or datagram packets to the host. Call parameters: Pointer to MSP client record; Pointer to data to send; Length of data; Boolean which is true for stream data and false for datagrams; and Procedure which is called while MSP is waiting for acknowledgments (It checks for and reads incoming data.). Returned parameters: Result code indicating success or failure.

MSP Flush. This routine is called to make sure all stream packets have been acknowledged by the host. This routine is called before calling MSP Close to make sure all data was delivered. (This routine is not used in the preferred embodiment.) Call parameters: Pointer to MSP client record; and Procedure which is called while MSP is waiting for acknowledgments (It checks for and reads incoming data.). Returned parameters: Result code indicating success or failure.

MSP PollClient. This call checks to see if any datagrams have been received from the host. For each datagram a routine supplied by the Timbuktu Desk Accessory is called. Call parameters: Pointer to MSP client record; and Procedure which is called to handle each datagram (It is passed a pointer to the data and the length of the data.). Returned parameters: Result code indicating success or failure.

j. QuickDrawCapture (QDC) and QuickDrawPlayback (QDP)

The QuickDrawCapture (QDC) module 146 (see FIG. 10A) generates the screen 136G images and drawing commands which make up the bulk of data delivered by the MSP protocol 140.

QDC 146 is a part of the Timbuktu host Driver software 150 which is installed in the host 142H that intercepts calls to QuickDraw 135H (described above). When QuickDraw 135H is about to draw something on the screen 136H, QDC 146 generates one or more messages which are sent to a Timbuktu routine which uses MSP 140 to deliver the messages to the MSP clients 142G.

The QuickDrawPlayback (QDP) module 148 is part of the Timbuktu guest Desk accessory software 152. Timbuktu calls MSP 140 to read messages from the host 142H, and passes them to QDP 148 which performs the drawing operations on the guest 142G.

k. Other Features

QDC Trap Intercepts, Text, Bit Images, Screen Bit Changes, and QDC Messages are explained elsewhere herein.

l. QDC Interface

The interface to QDC 146 (see FIG. 10B) consists of several procedures and a label for a global data area. QDC interface is explained more fully elsewhere herein. With respect to Timbuktu, the following applies:

QDC Globals. This label represents the address of the QDC globals area where the current state of QDC is stored. It is used only once in the call to QDC Initialize.

QDC Initialize, and QDC SetProcs procedures are explained more fully elsewhere herein.

QDC GetOptions, QDC SetOptions. These procedures are called to set or find out the current state of the QDC options to send or not send QuickDraw commands and screen bit changes. They take two boolean parameters, one true if QuickDraw commands are being sent, and the other true if screen bit changes are being sent.

QDC GetScrnSize. This procedure returns two integers representing the width and height of the screen.

QDC Start, QDC Stop, QDC Pause, QDC Resume, QDCPeriodicTask, QDC CheckScreen, QDC SetMouse, and QDC SendRect are all explained elsewhere herein.

m. Other Features

QDP Environment (a.k.a. Homogeneous QDP), Font Mapping, and QDP Interface are all explained elsewhere herein.

n. Monitor Module

Whereas QDC 146 and QDP 148 (see FIG. 10A) as described above are responsible for relaying drawing commands, QDC 146 and QDP 148 do not take care of forwarding user events from a guest 142G back to the host 142H. A part of Timbuktu called the Monitor Module 154G, 154H forwards user events and performs other tasks such as discovering font differences and providing both control and observe-only support. Like QDC 146 and QDP 148, the Monitor module 154G, 154H depends on other software to communicate messages using MSP 140.

The Monitor Module 154G, 154H defines additional message types which lie outside the range of QDC messages. From guest to host, these messages consist of user events and font information. From host to guest, additional messages include font information and observe/control mode changes.

On the guest 142G end, the Monitor Module 154G supports a single call that provides all the support needed to provide a full-screen view of the host's screen 136H. This call allocates a full-screen window and supplies it to QDP 148. This call then performs font negotiations with the host 142H and enters a loop obtaining user events and sending them to the host 142H and reading host messages and passing them to QDP 148.

o. Guest-to-Host Messages

The Monitor module 154G as installed in each guest 142G gets user events and constructs messages to be sent to the Monitor module 154H in the host 142H. The Monitor module 154G also sends font information in messages to the host 142H.

Although QDC 146 messages consist of a message type followed by zero or more data bytes, Monitor module 154G messages sent from the guest 142G to the host 142H consist of single records with the message type at the front of the record. The Monitor module 142G calls the Timbuktu Desk Accessory 152 which calls MSP 140 to deliver the whole record to the host 142H.

Gust-to-host messages consist of the following types: Key Event, Other Event, Key Map, Font Not Available, and Send Rectangle Request. The message records are as follows: Key Event (message type=0, event record, and key map); Other Event (message type=1 and event record); Key Map (message type=2 and key map); Font Not Available (message type=3 number of fonts in message one or more records containing a font number and bit array of unvariable sizes (1-48 pt)); and Send Rectangle Request (message type=4 and rectangle to send).

Key Event messages are sent for each key down and key up event on the guest 142G. The event record contains the actual event and the key map contains the new key map resulting from the event. Other Event messages are sent for auto-key, mouse 138BG down, and mouse 138BG up events. They are the same as key event messages but without the key map. When keys change that are not event-generating, Key Map messages are sent.

The Font Not Available message is discussed below. Send Rectangle Request is used to handle update events when QDP 148 does not have a bit image copy of the screen 136G. The rectangle is in coordinates and is simply the area needing to be redrawn.

p. Host-to-Guest Messages

In addition to the QDC 146 messages, the Monitor module 154H also defines two additional messages which are sent from the host 142H to the guests 142G.

| Message | Type | Data |
|---|---|---|
| set control | −128 | AppleTalk address of guest, boolean (true for control/false for observe), current mouse location |
| font map | −127 | font number, bit array of available sizes (1-48), name of the font |

The Set Control messages is used by a host to tell a guest that the guest may control the host or that control privilege has been revoked. Font Map messages are used during font negotiation, discussed below.

q. Font Negotiation

It is possible that font numbers on the host 142H do not match the numbers assigned to the same fonts on a guest 142G. In fact, when there are multiple guests 142G, fonts on each individual guest 142G may have different numbers. It may also be the case that some guests 142G do not even have some of the fonts that the host 142H has. QDC 146 and QDP 148 provide mechanisms to call routines to solve these problems. It is the Monitor module 154G, 154H that provides the routines.

When a session is first established, the Monitor module 154H on the host 42H sends out Pont Map messages to the guest(s) 142G. One message is sent for each font installed in the host 142H system and the last font is followed by a font message with font number zero to indicate the end of the list. Each message contains the name of the font, the host-assigned number of the font, and the sizes available on the host.

Each guest 142G looks up the font name in its system file to determine the local number assigned to the font. The guest 142G constructs a table mapping the host font numbers to the guest font numbers. This table is used by the MapFont function which the Monitor module 154G passes to QDP_PlayMessage to translate host font numbers into guest font numbers.

Finally, each guest 142G sends a series of Font Not Available messages to the host 142H indicating which fonts and sizes are not available on the guest. The host 142H keeps a list of fonts and sizes which are not available on all guests 142G. The UseFont procedure which the Monitor module 154H passes to QDC—SetProcs uses this list to tell QDC 146 whether to send text or to send bit images. When text is drawn in a font and size which is not available on all the guests, bit images are sent instead. But if the font is available in the right size on all the guests, text is sent. Fortunately, usually the latter is true, resulting in much smaller messages. In either case, visual fidelity is maintained.

r. Host Interface

The interface to the host part of the Monitor module 154H consists of three procedures as shown in FIG. 10B. Two of the procedures are called at the beginning of a Monitor module 154H session and the third procedure is called to handle Monitor module 154H messages.

s. Guest Interface

Figure 10C:
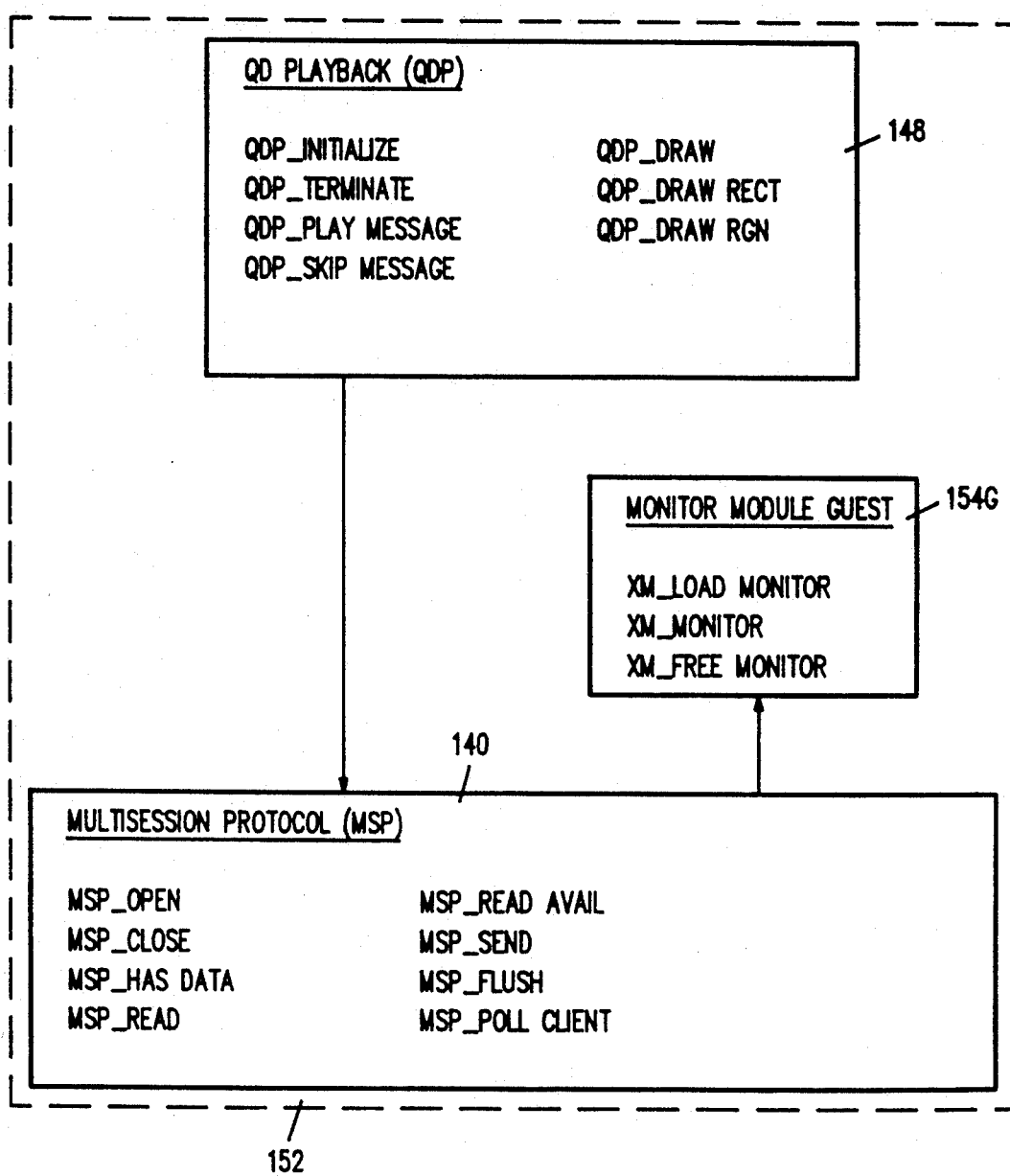

The guest 142G portion of the Monitor module 154G as shown in FIG. 10C is implemented in the preferred embodiment of Timbuktu as a separately compiled and linked software module of code. The code is stored as a Macintosh resource and is loaded into memory only when needed to control or observe a host 142H. The interface to the Monitor module 154G includes functions to load the module 154G, call the module 154G, and release the module's memory.

t. Timbuktu INIT

The Timbuktu INIT resource contains code which is executed when the Macintosh starts up. This code attempts to install and initialize the Timbuktu driver 150, according to configuration options specified in the Timbuktu Options file, also in the system folder. If no errors occur, and the options specify, Timbuktu will be available for connections from guests.

QDC-Initialize is called to install its trap intercepts and initialize its globals. The configuration options determine the options specified to QDC 146 (whether to patch QuickDraw, allocate the bit image copy of the screen, etc). In addition to QDC 146, Timbuktu itself installs several toolbox trap intercepts. These are used to perform various functions such as relaying the mouse 138BH location from the host 142H to the guest 142G, detecting disconnect requests, checking for new guests, and disconnecting guests 142G when the Macintosh is shut down. Finally, a device control call is issued to the Timbuktu driver to perform final initialization.

u. Timbuktu Driver

Although the INIT stays in memory only during the startup process, the Timbuktu driver 150 remains in memory until the Macintosh is shut down. The Timbuktu driver 150 (see FIG. 10B) includes QDC 146, the host portion of the Monitor module 154H, the host side of MSP 140, and the routines (not shown) to tie them all together. The driver 150 is called through the standard Macintosh driver interface via the Device Manager and is entered via one of the toolbox traps intercepted by QDC 146 or Timbuktu itself.

v. Device Control Calls

The device control call is used by the Timbuktu INIT and the Timbuktu desk accessory 152 (see FIG. 10A) to request control and monitor driver operation. Passed to each driver control call is a code indicating the operation to be performed. The goodbye and accrun calls are standard control calls issued by system software. The goodbye call is issued when the system is about to shutdown. Timbuktu then disconnects all current guests, closes the MSP host session, and shuts down QDC.

AccRun calls are issued by the system periodically to give the driver some processing time. Timbuktu uses this time to check for new open requests from guests and to check for incoming messages from a guest. Such messages are given to the Monitor module for processing. QDC CheckScreen is also called during the handling of accrun so that screen bit changes are detected and relayed to the guests.

The function of tb2CSInitialize is to perform the final initialization necessary to become a Timbuktu host. MSPInitHost is called to start the MSP host and the ATP transaction responder is started (see below). QDC SetProcs is called to provide QDC with procedures that use MSP to transmit messages and QDC-SetOptions is called to establish the initial method of relaying screen images.

In addition to issuing device control calls, the INT and desk accessory modify the driver's globals directly. The INIT allocates the globals at startup. The desk accessory obtains a pointer to the globals by issuing the tb2CSGetGlobals control call. By directly manipulating the driver globals instead of issuing device control calls, the driver's code size is reduced. The tb2CSGetScreenMode and tb2CSSetScreenMode calls are used to get and set the method QDC uses to send screen images. They in turn call QDC-GetOptions and QDC-SetOptions. Tb2CSUninvite causes any further open requests from guests to be denied and tb2CSDisconnect is used to disconnect current guests. Tb2CSGrantControl is used to grant or take away control privileges from any or all current guests.

w. Trap Intercepts

In addition to the control calls, the driver 150 is entered via one of the trap intercepts. In the case of a QuickDraw 135H trap, the trap intercept code in QDC 146 is called. QDC 146 then determines if a guest 142G is connected, and if so it calls routines in the driver 150 which use MSP 140 to deliver messages to the guest 142G.

In addition, Timbuktu's trap intercepts of the GetNextEvent and OSEventAvail traps take care of detecting clicks in the Timbuktu menu bar icon. Such clicks cause the driver 150 to disconnect any current guests 142G. The so-called emergency disconnect (command-shift option-click key sequence) is also detected in this logic.

QDC Trap Intercepts

When QDC 22 is initialized, it intercepts the QuickDraw bottleneck procedures and other selected QuickDraw routines. Each Macintosh toolbox routine, including QuickDraw routines, is called by a microprocessor instruction. For each trap to be intercepted, QDC 22 gets the address of the original routine from the Macintosh trap dispatcher and substitutes the address of its own routine. In each case the substitute routine will, in addition to performing other duties, call the originally called routine.

In general, each QDC trap replacement performs a standard set of operations as indicated by the following:
1. If drawing commands are not currently being captured, just call the original routine.
2. If the current drawing operation is not being performed on the screen, just call the original.
3. If the grafPort has changed, find the grafPort in a grafPort cache. If necessary, replace the least-recently-used entry in the cache. Send a message indicating the new grafPort, if it changed.
4. If anything about the current grafPort (pen location, text font, etc.) which is pertinent to the current operation differs from the cache, update the cache and send the appropriate messages informing QDP of the changes.
5. Send a message for the drawing operation. Include any parameters such as the rectangle or region being drawn.
6. If QDC is maintaining a copy of the screen bit images to detect changes (see below), change the grafPort so it refers to the copy and call the original routine to perform the drawing operation on the copy. Restore the grafPort to its original bitmap.
7. Call the original routine to perform the drawing operation.

To cut down on the volume of messages required to relay QuickDraw 21 images, QDC 22 and QDP 27 maintain synchronized caches of grafPorts. Each pair of corresponding entries in the caches is numbered. When QDC 22 discovers that a new grafPort is being used, it replaces an old entry in its cache. QDC 22 then issues a message telling the QDP 27 that, until told otherwise, drawing operations are to be performed on the new grafPort number. As the Macintosh applications 23 draw into their various grafPorts, the information about the current state of each grafPort is only sent once for each grafPort and, thereafter, only when it changes.

For example, when an application draws a rectangle in a newly-created window in the system of the present invention, the application program sets the pen size, pattern, and mode to achieve the desired look for the rectangle and issues a FrameRect trap. QuickDraw 21 then issues the StdRecttrap with the specified rectangle and specifiying the frame operation. QDC 22 determines that drawing commands are being captured and that the drawing is to be performed on the screen.

QDC 22 then discovers that the grafPort is not the same as the last one and attempts to ding the grafPort in the cache. Since the grafPort is new, it is not found in the cache and QDC 22 claims the entry that hasn't been used for the longest time. QDC 22 sends a message indicating the entry-number of the grafPort that is now to be used. Note that both caches will contain whatever information was left over from the last use of the same entry.

Now that the grafPort cache entry has been selected, QDC 22 examines the grafport's port rectangle, bitmap bounds, visible region, clipping region, pen location, pen pattern and pen mode to see if they differ from the cache. For each item that differs, a message is generated telling QDP 27 the new value.

If a copy of the screen bit image is maintained, QDC 22 changes the current grafPort to refer to the copy and calls the original StdRect to frame the rectangle on the copy. The current grafPort is then directed back to the screen. StdRect is called to frame the rectangle on the screen.

QDC 22 intercepts the following QuickDraw bottleneck procedures: StdRect, StdRgn, StdRRect, StdOval, StdArc, StdLine, StdBits, StdText, and StdPoly. QDC 22 also intercepts these additional QuickDraw traps: InitCursor, ObscureCursor, SetCursor, ScrollRect, DrawText. Finally QDC 22 intercepts these non-QuickDraw traps: SysBeep, MenuSelect, and DrawMenuBar.

For text, the destination Macintosh system on which QDP 27 is running might not have the same fonts that are installed on the source system. Special support is provided by QDP 27 to solve this problem. For each text-drawing command, the higher-level program is given the opportunity to decide whether to send the actual text or not. As described in the above referenced copending patent application, Timbuktu determines if the current font exists on the destination and, if not, inhibits transmission of the text. If the text is not sent, QDC 22 allows the drawing operation to proceed and then sends the resulting bit image from the area of the screen affected by the drawing operation.

Bit Images

When the bottleneck procedure StdBits is intercepted by QDC 22, the application is requesting that one bit image be transferred onto another bit image. In addition to the usual test to see if the destination is on-screen, QDC 22 performs some additional tests to optimize the relaying of bit images.

If the source is also on-screen, a special MoveBits messages is sent. The message includes the source and destination rectangles on the screen. Since it is assumed that the destination screen will be in the same state as the source screen, QDP 27 simply performs the same bit operation. Thus, QDC 22 avoids sending the bit image.

QDC 22 also tracks the operation of the Macintosh Menu Manager to speed up the restoration of the bit image under a pull-down menu when the menu is released. First, by intercepting the MenuSelect trap, QDC 22 can tell when a menu is being pulled down. Then, when the EraseRect occurs to clear the way for the menu, QDC 22 sends a message instructioin QDP 22 to stash a copy of the bits under the rectangle. Finally, when StdBits is called, QDC 22 discerns that Menu Manager is restoring the bits under the menu and sends a message iunstructing QDP 27 to restore the bits it stashed. This process is nestable due to hierarchical menus. To prevent custom menu definition procedures from confusing QDC 22, it detects "missed" restores and automatically cleans up the stack of bit staches.

If none of the special cases occur, QDC 22 performs the drawing operation and sends the resulting bit image to QDP 27.

Screen Bit Changes

For various reasons, some Macintosh applications bypass QuickDraw 21 and directly manipulate the screen's 25 frame buffer memory to draw screen images. To support these applications, QDC 22 must detect changes made to the frame buffer which were not made by QuickDraw 21. QDC 22 detects changes by maintaining a separate bit or pixel image which is the same size, shape and depth as the screen's frame buffer. It then continuously compares the contents of the copy with the contents of the frame buffer. When a difference is discovered, the changed bits (pixels) are sent to QDP 27 and the copy is updated.

Although this method can detect drawing done even with QuickDraw 21, it is much more efficient to send drawing commands than to send bit images when possible. Therefore, each of the trap intercepts perform drawing operations on both the screen and the copy of the screen image. In this way, all drawing done by QuikDraw 21 is reflected in both images and no differences are detected and sent by the screen comparison.

Detecting and sending changes to the screen bits requires sufficient memory for a copy of the screen and consumes much processor time comparing the images. For this reason, QDC 22 makes such capability optional.

QDC Messages

QDC 22 relays drawing commands and grafPort information to QDP 27 in a series of messages. Each message consists of a one-byte message type in the range of 0 to 127 and may be accompanied by one or more bytes of data. The message numbers are restricted to this range so that non-QDC messages can be included in the same message stream.

The following lists the message types and accompanying data:

| Message | Type | Data |
| --- | --- | --- |
| reserved | 0 | |
| SysBeep | 1 | Number of ticks |
| Cursor | 2 | Cursor |
| CrsrInit | 3 | None |
| CrsrObscure | 4 | None |
| ScrnBits | 5 | row number, byte in row, unpacked |

| Message | Type | Data |
|---|---|---|
| | | length, packed length, data (packed length bytes), row number (-1 at end) ... |
| CCursor | 6 | BW cursor, pixel depth, color table, run-length encoded pixel data |
| InitAllPorts | 7 | None |
| ClipRgn | 8 | Contents of the QuickDraw region handle |
| VisRgn | 9 | Contents of the QuickDraw region handle |
| Origin | 10 | Point |
| PortRect | 11 | Rectangle |
| FgColWhite | 12 | None |
| FgColBlack | 13 | None |
| BkColWhite | 14 | None |
| BkColBlack | 15 | None |
| PenSize | 16 | Point |
| PenMode | 17 | Integer pen mode |
| PatAlign | 18 | Point |
| FractBnable | 19 | None |
| FScaleDisable | 20 | None |
| ScrnPixels | 21 | Region data structure followed by pixel data |
| ScrnChanges | 22 | Region data structure followed by pixel data |
| FgColPixel | 23 | Pixel value |
| BkColPixel | 24 | Pixel value |
| FillPat | 25 | Pattern |
| FillDkGray | 26 | None |
| FillLtGray | 27 | None |
| FillGray | 28 | None |
| FillBlack | 29 | None |
| FillWhite | 30 | None |
| PenPat | 31 | Pattern |
| PenDkGray | 32 | None |
| PenLtGray | 33 | None |
| PenGray | 34 | None |
| PenBlack | 35 | None |
| PenWhite | 36 | None |
| BkPat | 37 | Pattern |
| BkDkGray | 38 | None |
| BkLtGray | 39 | None |
| BkGray | 40 | None |
| BkBlack | 41 | None |
| BkWhite | 42 | None |
| TxFont | 43 | Integer |
| TxFace | 44 | Style |
| TxMode | 45 | Integer |
| TxSize | 46 | Integer |
| SpExtra | 47 | Fixed |
| MoveTo | 48 | Point |
| ChExtra | 49 | Integer |
| PnLocHFrac | 50 | Integer |
| reserved | 51 | |
| FillPixPat | 52 | Pixel pattern |
| PenPixPat | 53 | Pixel pattern |
| BkPixPat | 54 | Pixel pattern |
| HilitePixel | 55 | Pixel value |
| HiliteMode | 56 | None |
| DevShape | 57 | Point (width, height) |
| SmallBitMap | 60 | Point (topLeft), width, height, bitmap data |
| DrawCache | 61 | Point (topLeft) |
| CopyPix | 62 | dest rect, transfer mode, height, src left, src right, pixel depth, mask rgn, color table, run-length encoded pixel data |
| CopyBits | 63 | dest rect, transfer mode, height, src left, src right, mask rgn, run-length encoded data |
| LineTo | 64 | Point |
| MoveBits | 65 | mode, source rectangle, destination rectangle, mask region |
| ScrollRect | 66 | rectangle, delta H, delta V |
| DrawChar | 67 | Character |
| DrawText | 68 | Text length, text |
| RectFrame | 69 | Rectangle |
| RectPaint | 70 | Rectangle |
| RectErase | 71 | Rectangle |
| RectInvert | 72 | Rectangle |
| RectFill | 73 | Rectangle |
| RgnFrame | 74 | Contents of the QuickDraw region handle |
| RgnPaint | 75 | Contents of the QuickDraw region handle |
| RgnErase | 76 | Contents of the QuickDraw region handle |
| RgnInvert | 77 | Contents of the QuickDraw region handle |
| RgnFill | 78 | Contents of the QuickDraw region handle |
| RRectFrame | 79 | oval width & height, rectangle |
| RRectPaint | 80 | oval width & height, rectangle |
| RRectErase | 81 | oval width & height, rectangle |
| RRectInvert | 82 | oval width & height, rectangle |
| RRectFill | 83 | oval width & height, rectangle |
| OvalFrame | 84 | Rectangle |
| OvalPaint | 85 | Rectangle |
| OvalErase | 86 | Rectangle |
| OvalInvert | 87 | Rectangle |
| OvalFill | 88 | Rectangle |
| ArcFrame | 89 | start angle, arc angle, oval rectangle |
| ArcPaint | 90 | start angle, arc angle, oval rectangle |
| ArcErase | 91 | start angle, arc angle, oval rectangle |
| ArcInvert | 92 | start angle, arc angle, oval rectangle |
| ArcFill | 93 | start angle, arc angle, oval rectangle |
| PolyFrame | 94 | Contents of the QuickDraw polygon handle |
| PolyPaint | 95 | Contents of the QuickDraw polygon handle |
| PolyErase | 96 | Contents of the QuickDraw polygon handle |
| PolyInvert | 97 | Contents of the QuickDraw polygon handle |
| PolyFill | 98 | Contents of the QuickDraw polygon handle |
| reserved | 99-100 | |
| Stash | 101 | Rectangle |
| Restore | 102 | None |
| FreeStash | 103 | None |
| reserved | 104-119 | |
| Continue | 120 | None |
| Port1 | 121 | None |
| Port2 | 122 | None |
| Port3 | 123 | None |
| Port4 | 124 | None |
| Port5 | 125 | None |
| Port6 | 126 | None |
| Port7 | 127 | None |

QDC Interface

The interface to QDC 22 consists of several procedures. QDC 22 internally maintains its own global data area. Generally, there is a series of calls which need to be preformed at start up time of the Macintosh. Then calls are made only to start and stop capture and to set some options. Most QDC 22 activity results indirectly from QuickDraw traps.

QDC Initialize. This procedure installs the QDC trap intercepts and initializes the QDC global data. It does not initiate the capture process. (see QDC_Start). It has the following parameters:
  resource ID of the code module containing the QDC code boolean indicating whether to allocate storage in high memory or the system heap
  boolean indicating whether or not to install the QuickDraw intercepts
  boolean indicating whether or not to intercept SysBeep location in which QDC_Initialize returns a pointer to its global variables QDC SetProcs. This procedure must be called at least once to tell QDC 22 which higher-level routines to call to send messages and perform other tasks. It has the following procedure parameters:

| | |
|---|---|
| Startmessge (msgType) | Called at the beginning of each message |
| PutData (data, length) | Called zero or more times for each message |
| EndMessage | Called after the last message data has been sent |
| MouseMoved (new point) | Called when the mouse has been moved |
| Periodic task | Called from each QuickDraw trap intercept |
| UseFont (fontNum, size) | Return true if QDC should send text in given font and size, otherwise return false |
| Got QDC Error (error) | Called by QDC to report problem |
| CantAllocateStash | Called by QDC when attempt to allocate bit (pixel) stash fails |

QDC Start. This procedure is called to initiate capturing QuickDraw commands and/or sending screen bit changes. It causes the starting screen image to be sent and may be called simultaneously while the capture process is on-going to send a new copy of the screen. It has no separately defined parameters. Three different methods of sending the initial screen image may be specified:

1. Generate update events causing the entire screen to be redrawn and the resulting QuickDraw calls to be captured;
2. Cause screen bits to be sent on a black and white Macintosh, but generate update events on a color Macintosh; and
3. Never send screen bits, but generate update events if on a color Macintosh.

QDC Stop. Stops sending drawing commands and bit images.

QDC CanSendColor. Returns true if the Macintosh has the right system software to send color images.

QDC SetVersion. Tells QDC the version of the destination QDC$_{13}$ Playback module and whether or not it supports color.

QDC SetScreenStash. Tells QDC whether or not to maintain a copy of the screen for the purpose of detecting changes not made with QuickDraw. The screen stash is allocated only when QDC is active (QDC_Start has been called). If QDC is currently sending color, the screen stash will be allocated with the same depth as the main graphics device. If the user changes the main device's depth, the screen stash will be reallocated with the new depth.

QDC HasScreenStash. Returns true if QDC is maintaining a screen stash.

QDC Pause, QDC Resume. Parameterless procedures which can be used to temporarily suspend and resume sending.

QDC Periodic Task. This operation should be called frequently to keep the mouse position and cursor shape current. It should at least be called from the Periodic-Task which was passed to QDC_SetProcs. It has no separately defined parameters.

QDC CheckScreen. This procedure is called frequently, although not as frequently as QDC_Periodic Task, to check for screen bit changes. It has no separately defined parameters.

QDC SetMouse. This procedure is called to force the mouse to a specific location. This is used by Timbuktu to move the pointer according to mouse movements on guest Macintosh computers 20 or other compatible computers. MouseMoved will not be called for mouse movements set with QDC_SetMouse. It takes the new mouse location as a parameter.

QDC SendRect. This call causes the bits in a rectangle to be sent. It takes a single rectangle parameter in global coordinates.

Homogeneous QDP

Unlike QDC 22 and with reference again to FIGS. 3B and 3C, QDP 27 intercepts no traps and operates in the normal Macintosh application (i.e., desk accessory) environment. A higher level program supplies a window into which drawing commands and bit images relayed from QDC 22 are drawn. It is expected that the higher-level program opens the window, initializes QDC 22, and then sits in a loop reading messages and, when appropriate, passes them to QDP 27.

Note that QDP 27 handles only QuickDraw images. It does not provide the logic which relays user events from a Timbuktu guest 20 to the source computer 10.

QDP 27 maintains the status of the playback session in a data record whose address must be passed to each of the QDP routines. This record reflects the entire state of QuickDraw 21 at the source computer 10 as relayed by messages sent through higher-level program. Included in this state record, for example, is the QDP counterpart to the grafPort cache maintained by QDC 22.

As QDC messages are processed, drawing is performed in the playback window and the state record is updated.

Font Mapping

Each Macintosh font is assigned a number which is unique within a given system. It is possible, however, that the source, or host, Macintosh system 10 on which QDC 22 is running does not have the same font number assignments as the destination, or guest, system 20 on which QDP 27 is running. If the source font numbers are used, text would be displayed incorrectly on the guest computer 20.

To prevent this problem, QDP 27 calls a font-mapping function supplied by the higher-level program. When QDC 22 sends a message to change fonts, it includes the desired font number from the source system. QDP 27 passes the source font number to the font-mapping function, which can then translate it into its counterpart on the destination system 20.

QDP Interface

QDP Initialize. This procedure initializes the playback session record and sets up the specified window for playback. It has the following parameters:
 the playback session record
 the source screen width
 the source screen height
 pointer to a window record
 boolean indicating whether or not the Draw calls are required If the source screen is larger than the window or if Draw calls are requested, a duplicate bit image of the source screen will be allocated. Once this call is made, the window becomes primarily the property of the playback session. Only its location, origin, foreground and background colors, and visible regions are not affected by the session.

QDP Terminate. This operation releases memory allocations and releases control of the window. It merely requires a pointer to the session record as a parameter.

QDP PlayMessage. This procedure is responsible for processing QDC 22 messages. The message type is passed to the procedure on the initial call and the procedure then calls the ReadData procedure parameter to obtain the message data. It returns a standard Macintosh error code and takes the following parameters:
 pointer to the session record
 message type
 function ReadData accepts buffer pointer and number of bytes to read; returns error code
 function MapFont which accepts a source font number and should return the local font number.

QDP SkipMessage. This procedure is used to skip a QDC 22 message in the message stream. It can be used in special cases to filter unwanted QDC 22 messages after a QDC/QDP session has ended. It returns an error code and has the following parameters:
 message type
 function ReadData accepts buffer pointer and number of bytes to read; returns error code
 function SkipBytesaccepts parameter indicating number of bytes to skip; returns error code QDP Draw, QDP DrawRect, QDP DrawRgn. These procedures are used to redraw the contents of the playback window in response to update events or in other situations. These calls are not always available—see QDP_Initialize. Their parameter lists are:
 pointer to the playback session record
 rectangle to draw (not passed to QDC_DrawRgn)
 region to draw (not passed to QDC_DrawRect)
QDP_Draw draws the intersection of the rectangle and the region. The other procedures internally call QDP_Draw.

GDI Capture and GDI Playback

Figure 4C:
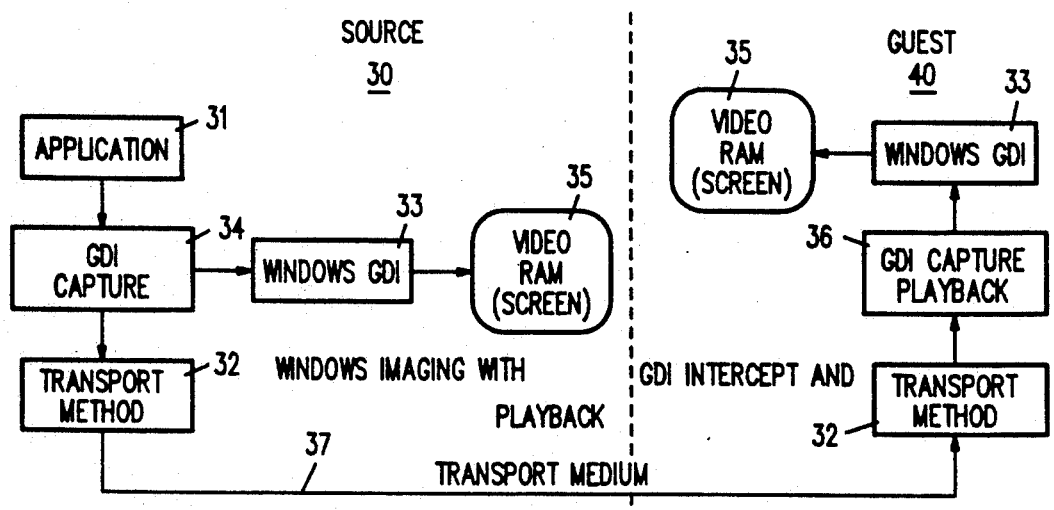
FIGS. 4C and 4D are detailed block diagrams of systems for recording, translation and playback of screen information among homogeneous computers utilizing the GDI capture module shown in FIG. 4B.
Figure 4D:
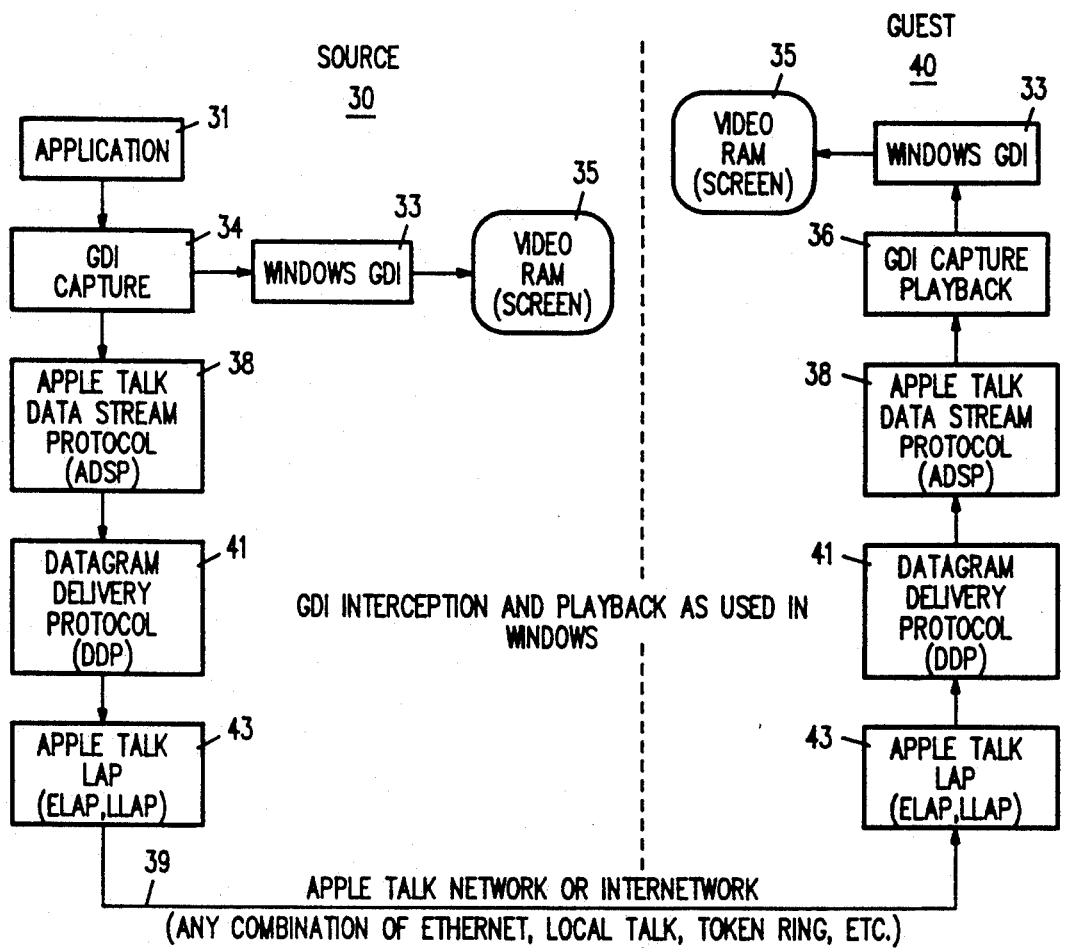

Referring now to FIGS. 4A–4D, with particular reference to FIGS. 4C and 4D, in a similar manner to that described above for a system of Macintosh computers, an Apple software package (transport method 32) comprising AppleTalk Data Stream Protocol (ADSP) modules 38, DDP modules 41 and AppleTalkLink AccessProtocol (ALAP) modules 43 supports a central, host or source microcomputer 30 and one or more destination or guest microcomputers 40 coupled to a networking link 39 (transport medium 37). Preferably, the source 30 and guest 40 computers are PC-AT or other suitable MS-Window-compatible computers. Each PC-AT typically includes a bit-mapped display screen 35 on which text and graphic information is displayed. Application programs 31 typically draw to the screen utilizing the GDI routines 33 included in the MS-Windows program.

In accordance with the present invention, a GDI capture module 34 intercepts calls to the GDI routines 33 and sends them via transport method 32 and transport medium 37 to a GDI Capture Playback module 36 in each of the guest computers 40 to perform identical operations on each guest computer's screen 35. The GDI Capture process is designed to detect changes that are being made to a display screen 35. This is done by trapping selected calls that are being made to the GDI 33. FIG. 4B illustrates the basic design of GDI Capture.

When the PC-AT application program 31 makes a call to the GDI 33, a GDI Capture module 34 is initialized and is able to "hook" functions in GDI 33 and have them rerouted to the GDI Capture module 34. GDI Capture 34 is then able to process the data that the calling application has passed to GDI (such as save it to disk, or transmit it over some type of transport mechanism) and can then call the GDI33 function which the application 31 originally intended. In FIG. 4B there are two other applications making calls to GDI 33 in addition to the one which is controlling the GDI Capture module 34.

The GDI Capture module 34 performs several steps in order to reroute these GDI functions.

1. The address of the function in memory is determined. MS-Windows provides functions which allow an application to determine the address of other functions.

2. The code segment in which the function is located is locked in memory. This step is necessary because of MS-Windows memory management scheme which will sometimes purge the memory used by code. When this code is needed again it is reloaded back from disk. Because GDI Capture is going to modify this code (see step 4) it can not be allowed to purged. MS-Windows includes functions which allow an application to lock portions of code in memory.

3. A data segment alias is allocated for the code segment in which the function is located. This step is necessary because of the architecture of the Intel 80×86 processors on which MS-Windows runs. In this architecture, sections of memory which contain code can not be modified by an application 31. GDI Capture 34 gets around this constraint by allocating a data segment which can access the same memory locations as the code segment. Because data segments can be modified, it is now possible to modify the code in the function GDI Capture 34 is rerouting.

4. GDI Capture 34 modifies the first few machine language instructions of the function being rerouted. One of the characteristics of the functions in GDI is that they, in general, begin with the following lines of Intel 80×86 machine codes:

```
mov ax, xxxx
inc bp
push bp
mov bp, sp
push ds
mov ds, ax
``` where xxxx is a value which is determined by memory management portion of MS-Windows. Because it was discovered that some GDI functions rely on this value being present, modifying it in any way was not possible. Instead, GDI Capture 34 modified the GDI function in such a way that does not disturb this memory location.

After GDI Capture 34 has modified the GDI function, the resulting code reads as follows:

```
mov ax, xxxx
call yyyy:zzzz
. . .
``` where yyyy:zzzz is the segment:offset address of the routine in GDI Capture 34 to which the function is being rerouted to. The data that was overwritten by this new code is saved so that it can be restored when needed.

While most library functions (such as GDI functions) conform to the description listed above, there are some exceptions. In general, these exceptions are handled on a case by case basis.

"Unhooking" a function basically reverses this process. The code is modified back to its original state and the data segment that was allocated to modify the code is released.

It is now possible for GDI Capture to capture calls to GDI functions. When an application calls a GDI function, it pushes onto its stack the parameters that are being passed to the function and then makes a call to the function which pushes a return address onto the stack. Once the modified GDI function is reached, another call command is executed which pushes the other return address onto the stack. This return address points to the memory location immediately after call instruction in the GDI function. The stack should now look like this:

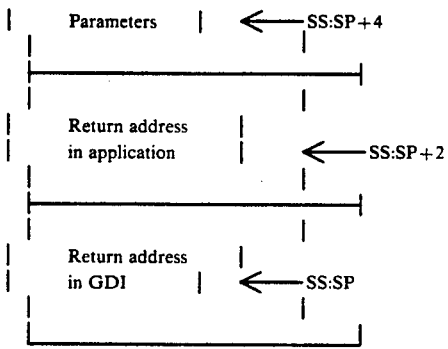

where SS is the value of the Stack Segmetn register and SP is the value of the Stack Pointer register. Control of the program should also have been passed to a routine in GDI Capture 34.

The routine in GDI Capture 34 can now examine the contents of the stack to determine the address of the GDI function that was called. By comparing this address to a list of function addresses for functions which have been intercepted, it is possible to determine which GDI function has been called and rerouted to GDI Capture 34. GDI Capture 34 is also able to examine the parameters that were passed to the function by looking up higher onto the stack.

At this point, it is possible for GDI Capture 34 to modify the hooked functions back to their original state and to then call the function in order to fulfill the request of the application. In this case, however, when the GDI function is completed it will return control to GDI Capture 34 and not the application. This allows GDI Capture 34 to do whatever additional processing is needed before returning control to the application 31.

First, GDI Capture 34 checks to determine if GDI Capture is being reentered. This situation occurs when GDI Capture makes a call to the GDI which in turn calls other GDI functions which also happen to be rerouted to GDI Capture 34. In general, GDI Capture 34 is not interested in these secondary GDI calls as it should be able to process the higher level calls. In this case, GDI Capture 34 simply completes the function call as described above and returns control to GDI 33 without doing any additional processing. It should be noted that it is necessary for these secondary GDI functions to be rerouted as applications will sometimes call them directly without going through the higher level call.

Next, GDI Capture 34 determines if the device context that is being drawn into is the display device 35. Other devices that could be drawn to are printers, metafiles or memory bitmaps. All of these devices use the same GDI function calls and GDI Capture 34 must be able to distinguish between them. Only if the device context is a display device does GDI Capture preform additional processing.

The next step is to determine if the given GDI drawing command will actually visibly change the screen 35. Because of the nature of the MS-Windows interface where different applications can run in multiple overlapping windows, it is possible that an application will draw something that is not actually visible on the display 35. GDI Capture 34 checks for this and does not preform any additional processing if it is not visible.

If a drawing command meets all of the criteria established by the tests listed above, GDI Capture 34 will notify the application that initialized GDI Capture. Before doing this, however, GDI Capture must first check to see if any changes have occurred in its device context drawing environment.

To do this, GDI Capture 34 maintains a data structure which mirrors the data structure of an actual device context. Whenever a valid drawing command is discovered, GDI Capture compares the values of the device context that was passed with the drawing command to the one it maintains in memory. If there are any differences, GDI Capture 34 first sends messages indicating these changes. By maintaining its own device context, a program receiving this stream of data should be able to continuously construct a device context identical to the one currently being drawn into. In addition, sending only changes in the device context eliminates a large amount of redundant data.

The only additional step to be preformed is for GDI Capture to do whenever translating of data is necessary. For example, many GDI functions accept handles (as defined in the referenced Microsoft Windows Software Development Kit) as parameters. These handles must often be dereferenced (i.e., converted to a pointer) and portions of this data extracted. Once GDI Capture 34 has completed this, a message is sent indicating which drawing command was called along with the associated data.

At this point, GDI Capture 34 is able to return to the original application which had called GDI 33 to begin with.

GDI Capture 34 is designed to capture both GDI drawing commands and changes to the drawing state (Device Context) and relay these commands and changes to a higher level application.

GDI Capture 34 also detects changes in the cursor location. These changes are handled by a separate mechanism so that the calling application has the option to decide how often it wished changes in the cursor location to be put into a data stream. The reason for this is that it has been found that cursor movements can consume considerable bandwidth in some situations and that providing fewer updates to the cursor location does not significantly impact the usability of the programs.

INT StartRecord (INT IHandle, RECORDCALLBACK dataCallback, SEND_DGRAMdatagramCallback);

StartRecord is used to initialize and start the GDI Capture 34 recording mechanism.

| Parameters | | |
|---|---|---|
| INT | iHandle | iHandle is a values specified by the higher level routines. GDI Capture returns the value when the callback routines are invoked. This allows the higher level routines to route the returned data. In practice, this values might be a file handle or a network address. |
| RECORDCALLBACK | dataCallBack | This function is invoked whenever a drawing command or a change in drawing state occurs. The function is passed the value of iHandle, the GDI Capture message and a pointer to the GDI Capture data. |
| SEND_DGRAM | datagramCallback | This function is invoked whenever GDI Capture detects a change in the location of the screen cursor. The callback function is passed the value of iHandle and a 4 byte value containing the new location of the cursor. |

VOID StopRecord(INT)

This function terminates recording and deallocates any internal data structures.

| Parameters |
|---|
| None |
| Returns |
| Nothing |

GDI Capture 34 relays drawing commands and device context information to the GDI Playback module 36 in a series of messages. Each message consists of a message type in the range of 0 to 127 and may be accompanied by one or more bytes of data. This message numbers are restricted to this range so that non-GDI Capture messages can be included in the same message stream.

The list below defines the message type and accompanying data.

| | |
|---|---|
| BYTE | 1 byte |
| SHORT | 2 bytes |
| WORD | 2 bytes |
| int | 2 bytes |
| DWORD | 4 bytes |
| LPSTR | 4 bytes |
| POINT | 4 bytes |
| n | Number of arbitrary size |
| [ ] | Array, or multiple instances of a data type. |
| BITMAP | Windows data structure defined as follows:<br>typedef struct tagBITMAP<br>{<br>int bmType;<br>int bmWidth;<br>int bmHeight;<br>int bmWidthBytes;<br>BYTE bmPlanes;<br>BYTE bmBitsPixel;<br>LPSTR bmBits;<br>}BITMAP; |
| LOGPEN | Windows data structuer defined as follows:<br>typedef struct tagLOGPEN<br>{<br>WORD lopnStyle<br>POINT lopnWidth;<br>DWORD lopnColor;<br>}LOGPEN; |
| LOGBRUSH | Windows data structure defined as follows:<br>typedef struct tagLOGBRUSH<br>{<br>WORD lbStyle;<br>DWORD lbColor;<br>int lbHatch;<br>}LOGBRUSH; |
| LOGFONT | Window data structure defined as follows:<br>typedef struct tagLOGFONT<br>{<br>int lfHeight;<br>int lfWidth;<br>int lfEscapement;<br>int lfOrientation;<br>int lfWeight;<br>BYTE lfItalic;<br>BYTE lfUnderline;<br>BYTE lfStrikeOut;<br>BYTE lfCharSet;<br>BYTE lfOutPrecision;<br>BYTE lfClipPrecision;<br>BYTE lfQuality;<br>BYTE lfPitchAndFamily; |

-continued

```
              BYTE          lfFaceName[LF_FACESIZE];
              }LOGFONT;
(NOTE: LF_FACESIZE is defined as 32)
MESSAGE                     TYPE  DATA
CMD_BITBLT                   1    Starting Coordinates in
                                  Destination Bitmap
                                        SHORT       X
                                        SHORT       Y
                                  Width and Height of
                                  Destination Bitmap
                                        SHORT       nWidth
                                        SHORT       nHeight
                                  Coordinates of Starting location
                                  in Source Bitmap
                                        SHORT       XSrc
                                        SHORT       YSrc
                                  Raster Operation to Apply
                                        DWORD       dwRop
                                  Description of Source Bitmap
                                        BITMAP      bm
                                  Source Bitmap Data
                                        BYTE[n]
CMD_PATBLT                   2    Starting Coordinates in
                                  Destination Bitmap
                                        SHORT       X
                                        SHORT       Y
                                  Width and Height of
                                  Destination Bitmap
                                        SHORT       nWidth
                                        SHORT       nHeight
                                  Raster Operation to Apply
                                        DWORD       dwRop
CMD_STRETCHBLT               3    Starting Coodrinates in
                                  Destination Bitmap
                                        SHORT       X
                                        SHORT       Y
                                  Width and Height of
                                  Destination Bitmap
                                        SHORT       nWidth
                                        SHORT       nHeight
                                  Coordinates of Starting Location
                                  in Source Bitmap
                                        SHORT       XSrc
                                        SHORT       YSrc
                                  Width and Height of Source
                                  Bitmap
                                        SHORT       nSrcWidth
                                        SHORT       nSrcHeight
                                  Raster Operation to Apply
                                        DWORD       dwRop
                                  Description of Source Bitmap
                                        BITMAP      bm
                                  Source Bitmap Data
                                        BYTE[n]
CMD_TEXTOUT                  4    Coordinate for TestOut Starting
                                  Location
                                        SHORT       X
                                        SHORT       Y
                                  Number of Characters being
                                  Drawn
                                        SHORT       nCount
                                  Characters
                                        BYTE[n]
CMD_EXTTEXTOUT               5    Mode Flags
                                        BYTE(2)     Flags
                                  Coordinate for Starting Location
                                        SHORT       X
                                        SHORT       Y
                                  Option Flags
                                        SHORT       wOptions
                                  Number of Characters being
                                  Drawn
                                        SHORT       nCount
                                  Characters and Other Data
                                  Depending on the Status of
                                  Prior Flags
                                        BYTE[n]
CMD_ARC                      6    Bounding Rectangle
                                        SHORT       X1
                                        SHORT       Y1
                                        SHORT       X2
                                        SHORT       Y2
```

|  |  |  |  |
|---|---|---|---|
|  |  | Arc's Starting Point | |
|  |  | SHORT | X3 |
|  |  | SHORT | Y3 |
|  |  | Arc's Ending Point | |
|  |  | SHORT | X4 |
|  |  | SHORT | Y4 |
| CMD_CHORD | 7 | Bounding Rectangle | |
|  |  | SHORT | X1 |
|  |  | SHORT | Y1 |
|  |  | SHORT | X2 |
|  |  | SHORT | Y2 |
|  |  | Line Segment's Starting Point | |
|  |  | SHORT | X3 |
|  |  | SHORT | Y3 |
|  |  | Line Segment's Ending Point | |
|  |  | SHORT | X4 |
|  |  | SHORT | Y4 |
| CMD_ELLIPSE | 8 | Bounding Rectangle | |
|  |  | SHORT | X1 |
|  |  | SHORT | Y1 |
|  |  | SHORT | X2 |
|  |  | SHORT | Y2 |
| CMD-PTE | 9 | Bounding Rectangle | |
|  |  | SHORT | X1 |
|  |  | SHORT | Y1 |
|  |  | SHORT | X2 |
|  |  | SHORT | Y2 |
|  |  | Starting Point | |
|  |  | SHORT | X3 |
|  |  | SHORT | Y3 |
|  |  | Ending Point | |
|  |  | SHORT | X4 |
|  |  | SHORT | Y4 |
| CMD_LINETO | 10 | Line's End Point | |
|  |  | SHORT | X |
|  |  | SHORT | Y |
| CMD_SETPIXEL | 11 | Pixel Location Being Set | |
|  |  | SHORT | X |
|  |  | SHORT | Y |
|  |  | Color Pixel is Being Set to | |
|  |  | DWORD | rgbColor |
| CMD_POLYGON | 12 | Number of Points in Polygon | |
|  |  | SHORT | nCount |
|  |  | Points in Polygon | |
|  |  | SHORT | X1 |
|  |  | SHORT | Y1 |
|  |  | — | |
|  |  | SHORT | Xn |
|  |  | SHORT | Yn |
| CMD_POLYLINE | 13 | Number of Point in Polyline | |
|  |  | SHORT | nCount |
|  |  | Points in Polyline | |
|  |  | SHORT | X1 |
|  |  | SHORT | Y1 |
|  |  | — | |
|  |  | SHORT | Xn |
|  |  | SHORT | Yn |
| CMD_RECTANGLE | 14 | Top Left Point of Rectangle | |
|  |  | SHORT | X1 |
|  |  | SHORT | Y1 |
|  |  | Lower Right Point of Rectangle | |
|  |  | SHORT | X2 |
|  |  | SHORT | Y2 |
| CMD_ROUNDRECT | 15 | Top Left point of Rectangle | |
|  |  | SHORT | X1 |
|  |  | SHORT | Y1 |
|  |  | Lower Right Point of Rectangle | |
|  |  | SHORT | X2 |
|  |  | SHORT | Y2 |
|  |  | Width and Height of Ellipsefor Rounded Corners | |
|  |  | SHORT | X3 |
|  |  | SHORT | Y3 |
| CMD_FLOODFILL | 16 | Flood Fill Start Point | |
|  |  | SHORT | X1 |
|  |  | SHORT | Y1 |
|  |  | Color to Flood With | |
|  |  | DWORD | rgbColor |
| CMD_FASTWINDOWFRAME | 17 | Only Used Internally | |
| CMD_BITBLT SCREEN | 18 | Starting Coordinates in Destination Bitmap | |
|  |  | SHORT | X |

-continued

|  |  |  |
|---|---|---|
|  |  | SHORT Y |
|  |  | Width and Height of Destination Bitmap |
|  |  | SHORT nWidth |
|  |  | SHORT nHeight |
|  |  | Coordinates of Starting Location in Source Bitmap |
|  |  | SHORT XSrc |
|  |  | SHORT YSrc |
|  |  | Raster Operation to Apply |
|  |  | DWORD dwRop |
| CMD_STRETCHBLT_SCREEN | 19 | Starting Coordinates in Destination Bitmap |
|  |  | SHORT X |
|  |  | SHORT Y |
|  |  | Width and Height of Destination Bitmap |
|  |  | SHORT nWidth |
|  |  | SHORT nHeight |
|  |  | Coordinates of Starting Location in Source Bitmap |
|  |  | SHORT XSrc |
|  |  | SHORT YSrc |
|  |  | Width and Height of Source Bitmap |
|  |  | SHORT nSrcWidth |
|  |  | SHORT nSrcHeight |
|  |  | Raster Operation to Apply |
|  |  | DWORD dwRop |
| CMD_SETBKCOLOR | 20 | Background Color |
|  |  | DWORD rgbColor |
| CMD_SETBKMODE | 21 | Background Mode |
|  |  | SHORT nBkMode |
| CMD_SETBRUSHORG | 22 | Brush Origin |
|  |  | SHORT X |
|  |  | SHORT Y |
| CMD_MOVETO | 23 | Point to Move Current Point to |
|  |  | SHORT X |
|  |  | SHORT Y |
| CMD_SETROP2 | 24 | Raster Operation to Apply Drawing |
|  |  | SHORT nDrawMode |
| CMD_SETTEXTCHARACTEREXTRA | 25 | Amount of Intercharacter Spacing |
|  |  | SHORT nCharExtra |
| CMD_SETMAPMODE | 26 | Coordinate System Mapping Mode |
|  |  | SHORT nMapMode |
| CMD_SETPOLYFILLMODE | 27 | Mode to Indicate how Polygons are Filled |
|  |  | SHORT nPolyFillMode |
| CMD_SETRELABS | 28 | No Longer Used |
| CMD_SETSTRETCHBLTMODE | 29 | Mode to Indicate how StretchBlts are Preformed |
|  |  | SHORT nStretchMode |
| CMD_SETTEXTCOLOR | 30 | Color to Set Text to |
|  |  | DWORD rbbColor |
| CMD_SETVIEWPORTTEXT | 31 | Coordinates of Viewport Extent |
|  |  | SHORT X |
|  |  | SHORT Y |
| CMD_SETVIEWPORTORG | 32 | Coordinate of Viewport Origin |
|  |  | SHORT X |
|  |  | SHORT Y |
| CMD_SETWINDOWEXT | 33 | Coordinate of Window Extent |
|  |  | SHORT X |
|  |  | SHORT Y |
| CMD_SETWINDOWORG | 34 | Coordinate of Window Origin |
|  |  | SHORT X |
|  |  | SHORT Y |
| CMD_SELECTOBJECT_PEN | 35 | Pen Description |
|  |  | LOGPEN lp |
| CMD_SELECTOBJECT_BRUSH | 36 | Brush Description |
|  |  | LOGBRUSH lb |
| CMD_SELECTOBJECT_PATTERNBRUSH | 37 | Brush Description |
|  |  | LOGBRUSH lb |
|  |  | Bitmap Description |
|  |  | BITMAP bm |
|  |  | Bitmap Data |
|  |  | BYTE[n] |
| CMD_SELECTOBJECT_STOCKBRUSH | 38 | No Longer Used |
| CMD_SELECTOBJECT_FONT | 39 | Font Description |
|  |  | LOGFONT lf |

-continued

| | | |
|---|---|---|
| CMD_SELECTOBJECT_REGION | 40 | Region Data<br>    BYTE[n] |
| CMD_SETCURSORPOS | 41 | Point to Move Cursor to<br>    POINT    pt |
| CMD_SETCURSOR | 42 | Location of Cursor Hot Spot<br>    SHORT    XHot<br>    SHORT    YHot<br>Height and Width of Cursor<br>    SHORT    nWidth<br>    SHORT    nHeight<br>Width of Cursor rounded up to nearest Byte<br>    SHORT    nWidthBytes;<br>Number of colors in cursor (always 2)<br>    SHORT    nColor; |
| CMD_HIDECURSOR | 43 | None |
| CMD_SETDCORG | 44 | Coordinate of Device Content Origin<br>    POINT    pt |
| CMD_START | 45 | None |
| CMD_STOP | 46 | None |
| CMD_SELECTDC1 | 47 | None |
| CMD_SELECTDC2 | 48 | None |
| CMD_SELECTDC3 | 49 | None |
| CMD_SELECTDC4 | 50 | None |
| CMD_SELECTDC5 | 51 | None |
| CMD_SELECTDC6 | 52 | None |
| CMD_SELECTDC7 | 53 | None |
| CMD_SETTEXTJUSTIFICATION Justification | 54 | Parameters to Set Text<br>    SHORT    nBreakExtra;<br>    SHORT    nBreakCount; |
| CMD_SETTEXTALIGN | 55 | Test Alignment Mode<br>    SHORT    nFlags |
| CMD_SAVESCREENBITMAP | 56 | Used Internally |
| CMD_EXTFLOODFILL | 57 | Coordinate of Initial Flood Fill Point<br>    SHORT    X<br>    SHORT    Y<br>Color to Fill With<br>    DWORD    rgbColor<br>Type of Flood Fill<br>    SHORT    type |
| CMD_KEYBOARD | 58 | Keyboard Scan Code<br>    SHORT    ScanKey<br>Virtual Scan Code<br>    SHORT    VirtualKey |
| CMD_MOUSE | 59 | Mouse State Information<br>    SHORT    state<br>Mouse Location<br>    SHORT    X<br>    SHORT    Y<br>Number of Mouse Buttons<br>    SHORT    buttons |

Homogeneous GDI Playback

GDI Playback 36 is a module which will playback the messages generated with the GDI Capture module 34. It is designed to playback these messages into a window on the Windows desktop.

One situation that must be handled is when a portion of the playback window is covered by another window. In this case GDI Playback 36, in cooperation with MS-Windows, is designed to automatically clip its rendering to the edge of the covering window. If the covering window is moved by the user, or its location is changed for any other reason, the area of the playback window which was covered may now be visible. GDI Playback 36 is designed to assist in the updating of the exposed area.

GDI Playback 36 maintains, in memory, an exact copy of what the on-screen window would look like if it were not covered by any other windows. This copy is called a shadow bitmap. Whenever a portion of the on-screen window needs updating, the data from the shadow bitmap can be copied to the screen. This same technique can be used to handle the scrolling of the on-screen image in a playback window.

GDI Playback 36 can also simulate the events generated by a user using a computer keyboard or mouse. These include such things as moving the cursor around on the screen, pressing a mouse button and typing on the keyboard.

IIDC StartPlay(HWND hWnd)

StartPlay initializes GDI Playback 36 and prepares it to begin playback in a window on the display screen 35. It also allocates memory for a shadow bitmap which can be used to update the on-screen window.

| Parameters | | |
|---|---|---|
| HWND | hWnd | The window into which GDI Playback is to render the messages generated by GDI Capture. |
| Returns | | |
| HDC | | A Device Content handle for the shadow |

-continued
```
                        bitmap.
VOID StopPlay(VOID);
```

Calling StopPlay indicates that no additional messages are to be rendered. This call allows GDI Playback 36 to deallocate data structures as well as the shadow bitmap.

```
    Parameters
        None
    Returns
        Nothing
VOID PlayRecord(LPSTRptr, UINT end);
```

PlayRecord renders a specific drawing command into the window specified by StartPlay.

```
Parameters
    LPSTR    ptr    A pointer to the data associated with
                    a given GDI Capture command.
    UINT     cmd    The GDI Capture command
Returns
    Nothing
VOID PlayBeginPaint(VOID);
```

This function needs to be called before updating the screen window with the shadow bitmap. It allows GDI Playback 36 to temporarily reset some internal data structures which would cause the update to not work properly.

```
    Parameters
        None
    Returns
        Nothing
VOID PlayEndPaint(VOID);
```

This function is called after updating the screen window with the shadow bitmap. It allows GDI Playback 36 to restore the internal data structures which were modified with PlayBeginPaint.

```
    Parameters
        None
    Returns
        Nothing
VOID SetPlayWindowOrg(INT X, INT Y);
```

GDI Playback 36 supports the ability to render messages into a window with an offset origin. SetPlayWindowOrg tells GDI Playback 36 of the new origin. This command is used primarily for scrolling the playback in a window which is too small to show the entire image.

```
Parameters
    INT    X    X coordinate of the new origin
    INT    Y    Y coordinate of the new origin
Returns
    Nothing
VOID ControlInit(VOID);
```

ControlInit allows GDI Playback 36 initialize internal data structures before simulating keyboard and mouse events.

```
    Parameters
        None
    Returns
        Nothing
VOID ControlUnInit(VOID);
    ControlUnInit deinitializes data structures allocated
    in ControlInit.
    Parameters
        None
    Returns
        Nothing
Void PlayControlRecord(INT type, LPBYTE buffer);
    This function simulates a mouse or keyboard event.
    Parameters
        INT      type     Indicate the type of event which is to be
                          simulated. Currently GDI Playback sup-
                          ports two types. CMD_MOUSE and
                          CMD_KEYBOARD
        LPBYTE   buffer   A pointer to the data associated with the
                          simulated event.
    Returns
        Nothing
```

QDC Playback on MS-Windows GDI

Figure 5A:
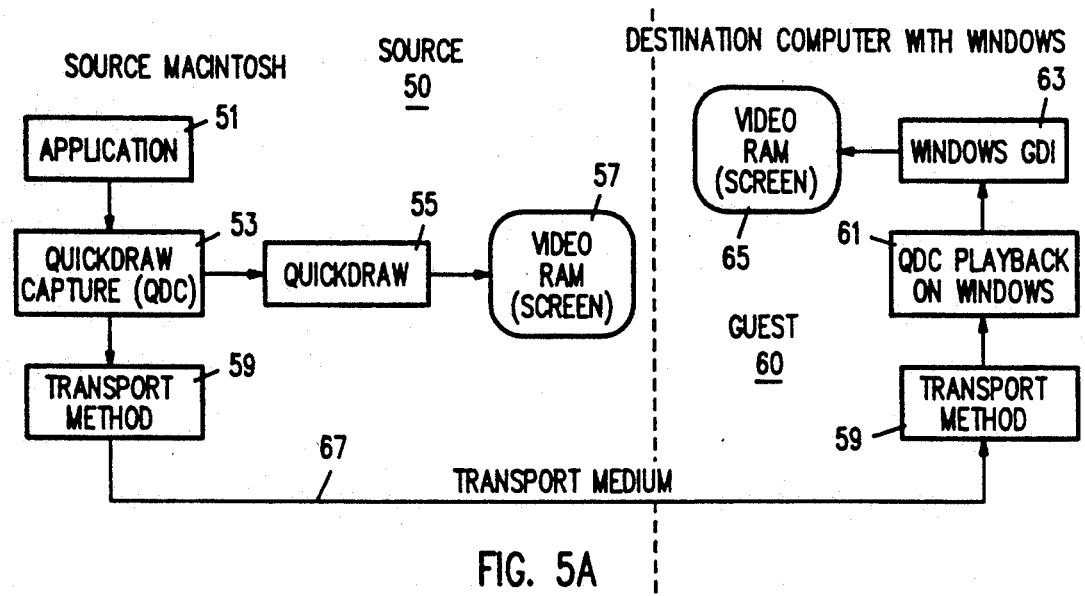
FIGS. 5A–5D are detailed block diagrams of a system for recording, translation and playback of screen information among heterogeneous computers constructed according to the principles of the present invention.
Figure 5B:
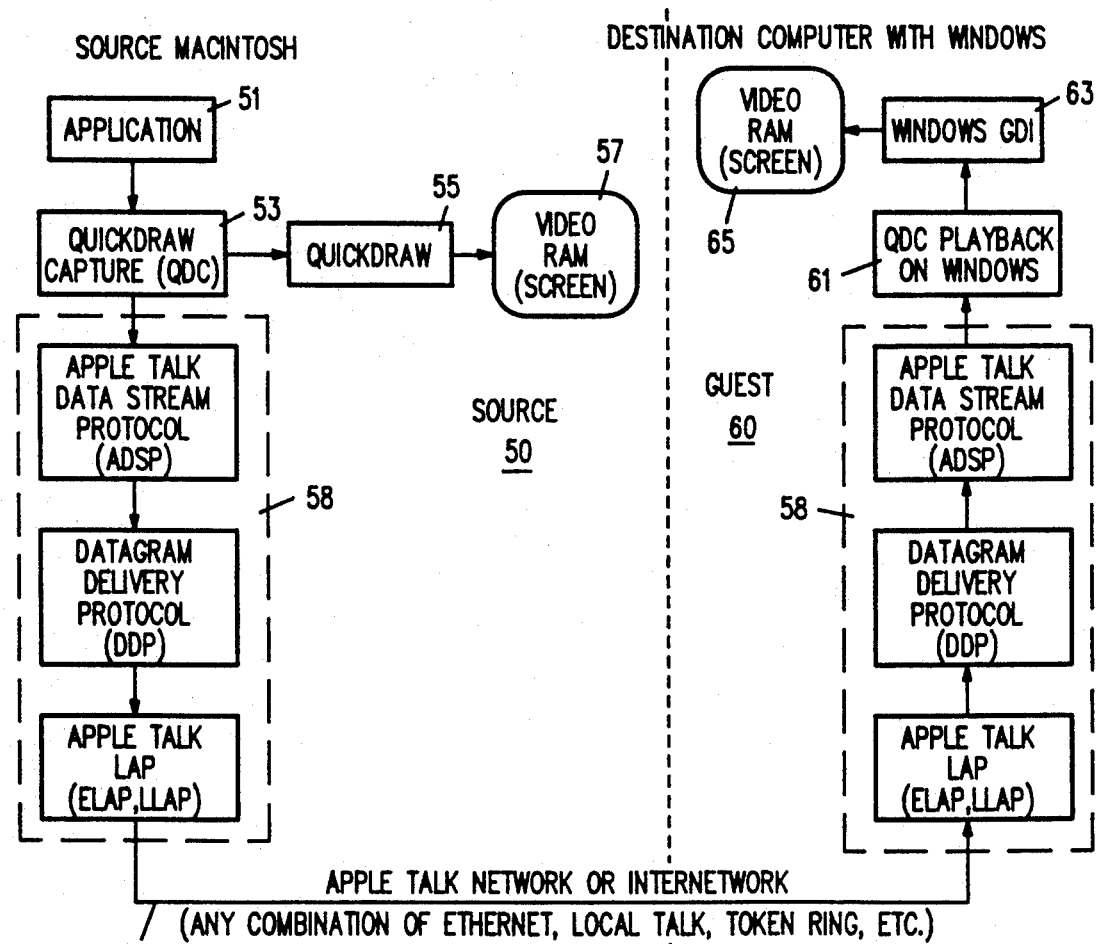

Referring now to FIGS. 5A-5B, FIG. 5A is a block diagram illustrating a heterogeneous computer system in which a source Macintosh computer 50 is coupled to one or more destination or guest computers 60, at least one of which comprises a PC-AT computer with MS-Windows. The source Macintosh 50 and guest PC-AT/MS-Windows 60 computers are coupled together via transport modules 59 and transport medium 67. As described hereinabove with reference to FIGS. 3A-3C, a QDC module 53 intercepts calls to the QuickDraw routines 55 and sends QDC messages representing such intercepted calls to a QDC playback module 61 in the guest computer 60. In order to playback the QDC messages on the PC-AT/MS-Windows platform 60, a playback environment must be setup to initiate computer screen sharing and the QDC messages must be translated into MS-Windows GDI procedure calls which provide the substantially identical display on a guest PC-AT/MS-Windows platform 60 while preserving the context of the source Macintosh 50 screen presentation.

In the preferred embodiment, QDC messages generated by QDC 53 are sent to the QDC playback module 61 where the messages are translated, as described in more detail hereinbelow, directly to the corresponding GDI procedure calls. Alternatively, the QDC messages can be first translated to corresponding GDI capture messages and then coupled to a GDI capture playback module 36 (as shown in FIGS. 4C and 4D) to provide the appropriate GDI procedure calls to the windows GDI module 63 and the screen 65.

FIG. 5B is a detailed block diagram illustrating a heterogeneous computer system in which a source Macintosh computer 50 is coupled to one or more guest computers 60 via an Apple software package 58, described hereinabove with reference to FIGS. 4C and 4d, and network 66.

Figure 5C:
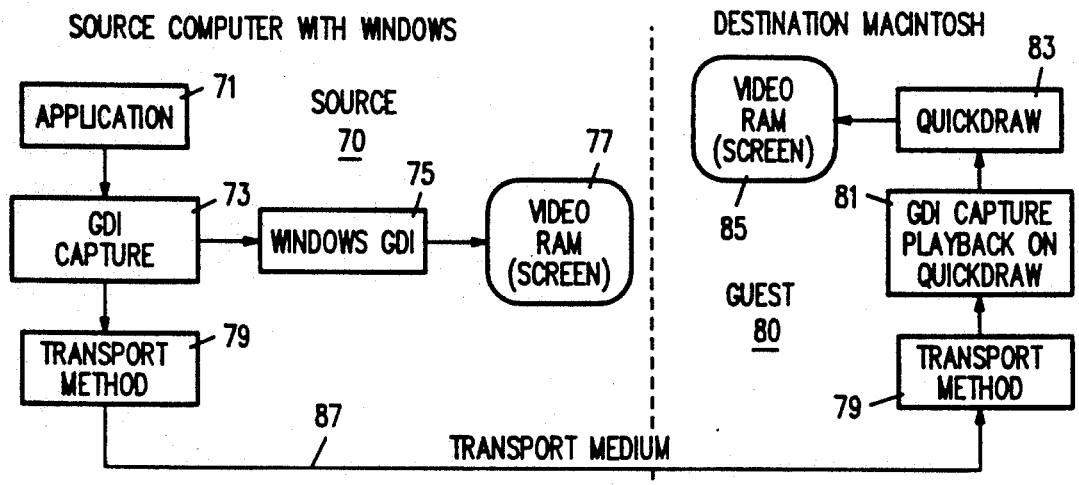
Figure 5D:
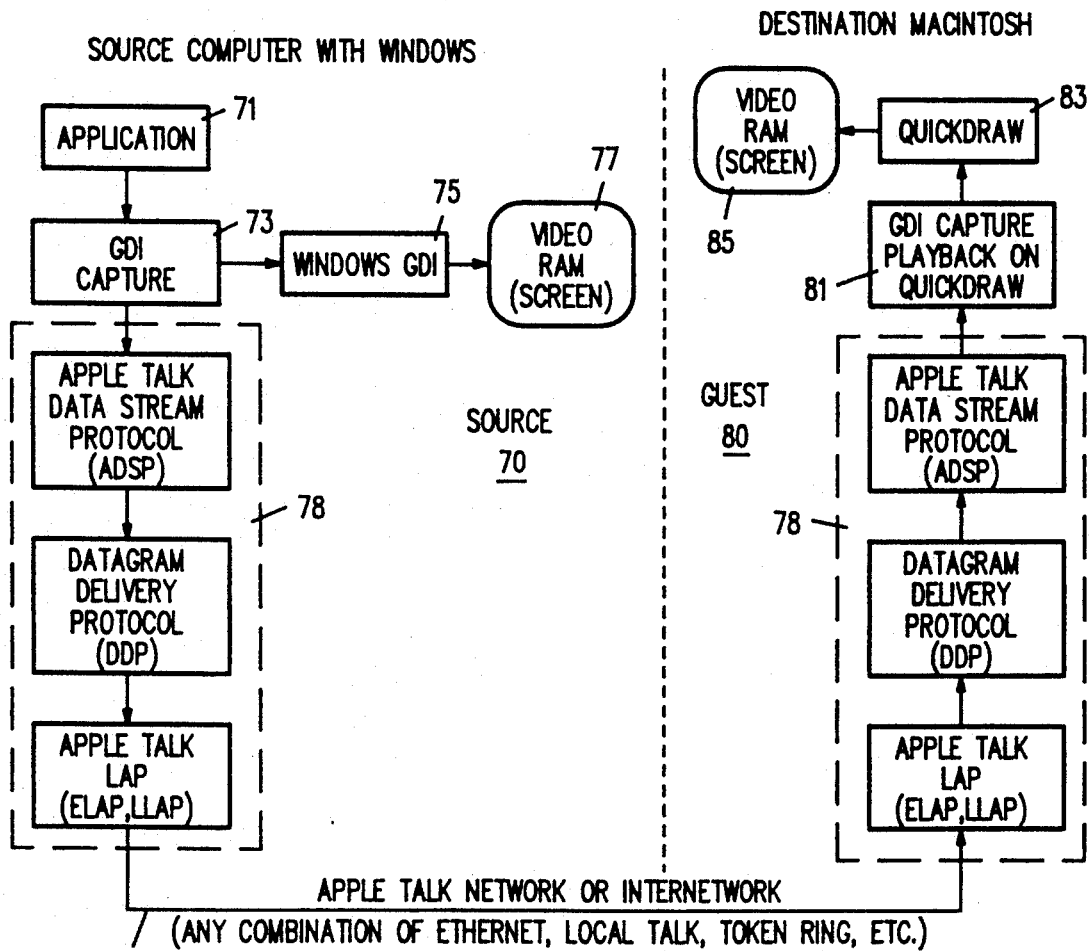

Referring now to FIGS. 5C and 5D, FIG. 5C is a block diagram illustrating a heterogeneous computer system in which a source PC-AT/MS-Windows computer 70, for example, is coupled to one or more destination or guest Macintosh computers 80 via transport modules 79 and transport medium 87. FIG. 5D is a detailed block diagram wherein a source PC-AT/MS-Windows computer 70 is coupled to one or more guest Macintosh computers 80 via Apple software package 78 and network 86. As described hereinabove with reference to FIGS. 4A-4D, GDI capture module 73 intercepts calls to the windows GDI routines 75 from applications 71 and sends GDI capture messages to a GDI capture playback module 81 which translates the GDI capture messages to corresponding QuickDraw procedure calls for use by the QuickDraw routines 83 to provide substantially identical text and graphics on the guest screen 85 while preserving the context of the source PC-AT computer 70 screen presentation. As described above, GDI capture messages may be translated directly to QuickDraw procedure calls or, alternatively, may be translated in two steps.

Figure 6:
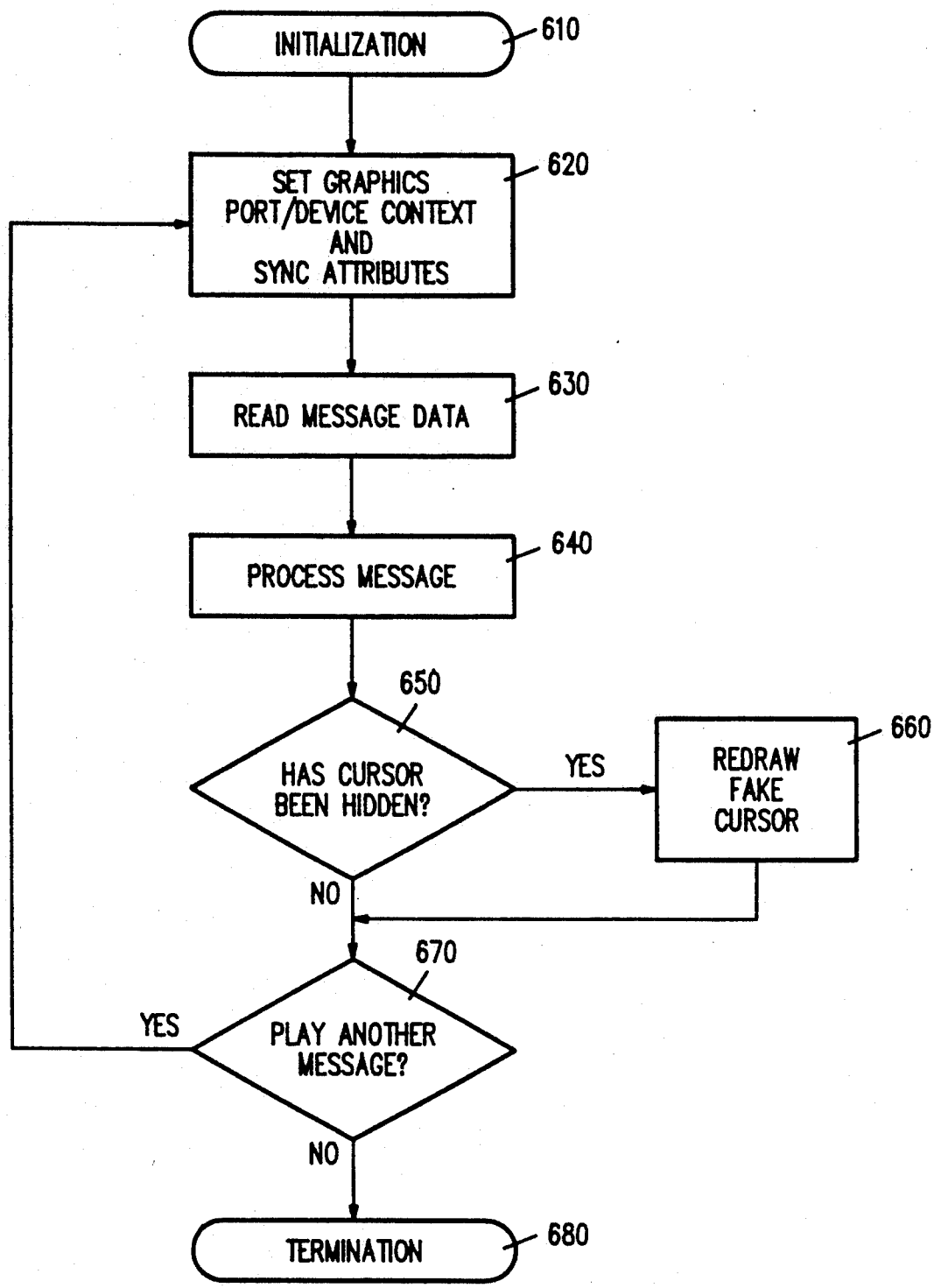
FIG. 6 is a flow diagram illustrating the processing and translation process for the GDI Playback and QDC Playback systems shown in FIGS. 5A–5D.

Referring now to FIG. 6, a flow diagram illustrating the playback of captured messages for the heterogeneous systems shown in FIGS. 5A-5D. Processing messages consists of performing a series of operations, including initialization 610, setting the graphics port (Macintosh) or device context (PC-AT/MS-Windows) and setting the port's attributes 620, reading the message data 630, processing the message 640, i.e., actually performing the operation, redrawing the cursor 650, 660, if needed, playing another message 670, and termination 680.

The Initialization phase 610 initializes the playback session record and sets up the specific window for playback. The playback window must already exist. The drawing environment is created according to the recording, i.e., the source computer, graphics environment.

To set Graphics Port/Device Context and Sync Port Attributes 620 the current port is set to the session's port and the QuickDraw pen is set to the normal pen, the foreground color is set to black, the background color is set to white, the background pattern is set to white and the pen pattern is set to black.

Reading Message Data 630 requests the source application to read the data required for the current message, if any. If not all the message date is available, a Nonfatal continueError will be returned. The caller should then proceed normally, but the next message check (play another message 670) will also process the message WIN_msgContinue. The additional message data (if available) will be read and the drawing operation completed.

The inProcess Message 640, the desired drawing command, or action, must be carried out. This can include, but is not limited to, drawing graphic objects, setting the graphics context, and posting keyboard and mouse events. FIGS. 8A-8E and 9A-9E provide examples of various message processing routines for QDC messages and GDI capture messages, respectively.

If the Fake Cursor has been hidden 650 because a drawing operation would have overlapped it, the fake cursor must be redrawn 660. This is accomplished by first CopyBitsing the cursor's mask onto the window using the notSrcOR transfer mode, the CopyBitsing the cursor data onto the window using the SrcXOR transfer mode.

Continue processing messages 670 until the current session is to be terminated. Termination 680 then deallocates all memory based data structures associated with this playback session, and no longer owns the playback window.

Figure 7:
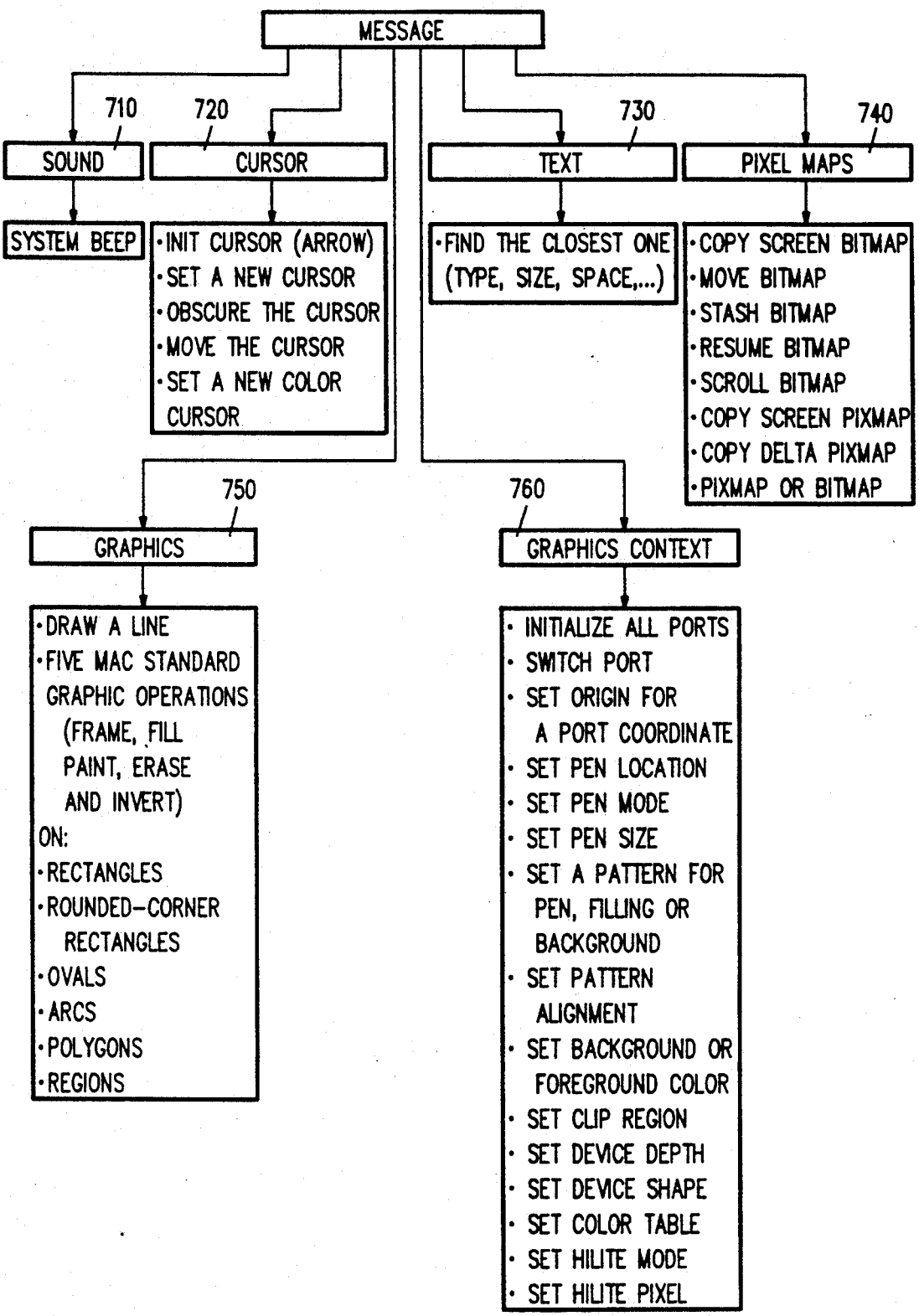
FIG. 7 is a flow chart illustrating the QuickDraw Capture and GDI Capture message groups and message types utilized by the systems of FIGS. 5A–5D.

Referring now to FIG. 7, QDC and GDI Capture messages are classified, for the preferred embodiment, in six categories. A message may or may not be followed by data. FIG. 7 is a chart illustrating the classes of messages 710-760 which are defined as follows.

Sound 710: the only sound information recorded comprises a system beep and well-known methods for sound message translation may be utilized.

Cursor 720: Cursor operations are relatively independent from graphics operations. A cursor consists of two bitmaps: a mask and a cursor. These two bitmaps are displayed as a cursor on the screen by logic operations in conjunction with the screen, depending on the given window system. If the current cursor includes color, color table and pixel map data are included with the other cursor data. For cursor 720 category, subcategories are provided below.

- Init Cursor: Since an arrow cursor is standard in Macintosh systems, an arrow cursor is created and displayed in the playback window on the guest screen at the beginning of each session.
- Set a New Cursor: The shape of the cursor may change. When a new cursor message is read, new mask data and new cursor data are fetched. Then a new cursor is created to replace the previous cursor displayed on the screen.
- Set a New Color Cursor: For a color cursor, color table and pixel value data will be included along with the standard black/white cursor data.
- Obscure the Cursor: This message hides the cursor until next mouse movement.
- Move the Cursor: This message first restores the screen bits under the cursor and then moves the cursor to the given location.

Text 730: The basic strategy is to determine the closest font, if not precisely the same font to draw text. Since there is a great difference between Macintosh and MS-Windows font systems, a bitmap is recorded when text is recorded in the preferred embodiment of this invention.

Pixel Map 740: Pixel maps and bitmaps are used in Macintosh systems to implement some on- and off-screen activities. For the Pixel map 740 category, subcategories are provided below.

- Copy Screen Bitmap: A screen bitmap is read and is then transmitted in a bit block transfer operation to the playback screen.
- Move Bitmap: A bitmap is moved from one location to another location.
- Stash Bitmap or Pixel Map: The bitmap is stashed under the pop up menu when a menu pops up.
- Restore Bitmap or Pixel Map: The bitmap stashed last time is restored.
- Scroll Bitmap: Scrolling a rectangle is very often used in a window system. It moves the portion of the screen bitmap which is within the screen rectangle to a new location.
- Screen Pixel Map: A pixel map is read. It's then blited on the playback screen.
- Changed Screen Pixel Map: A delta screen pixel map is read. It then update the playback screen.
- Copy Pixel Map: A pixel map is copied from one place to another place on the playback screen.
- Copy Bitmap: A bitmap is copied from one place to another place on the playback screen. Graphics 750: Subcategories are defined as given below.
- Draw a Line: Two points define a line. The current pen location provides the first point. The point data following the line drawing message defines the other. To playback the line exactly as recorded on a different window system, a region is created to represent the line.

Macintosh Standard Graphic Operations: Frame, fill, paint, erase and invert are five standard graphic operations on rectangles in addition to rounded-corner rectangle, ovals, arcs, polygons and regions included in QuickDraw. Using the same method as described for line drawing, these operations and shapes are recreated in the MS-Windows environment. Since MS-Windows does not provide the same graphic operations as QuickDraw, it is much easier to use region operations to create arbitrary geometric shapes than using bitmap or other operations. Region is used to recreate a changed part of a graphic image after an operation is performed on a geometric shape. For instance, a rectangle is defined by two points: the top left corner and the bottom right corner. When framing a rectangle, region draws an outline just inside the specified rectangle. The width and height of the outline trace are determined by the current pen's width and height. When a graphic operation is to be performed, the graphics context is also involved.

Graphics Context 760: Graphics context in a window system is tightly connected to graphic operations. Before doing drawings on a window system, a graphic context must be set up. The system will set up a default context if there is no user intervention. For example, the foreground and background colors will be defined either by default, such as black and white, or by procedure calls of colors a user desires, respectively.

Initialize All Ports: In QuickDraw, more than one grafPort can be created. All graphic operations are performed in grafPorts. Each grafPort has its own local coordinate system and graphics context. Seven grafPorts are used to capture QuickDraw messages. On MS-Windows, there is no counterpart of a grafPort. Therefore, environments similar to grafPorts are created before any playback on a PC-AT/MS-Windows platform can take place.

Switch Port: The playback environment is switched to the given port.

Set Origin for a Port Coordinate: A port coordinate system is set relative to the display global coordinate system.

Set Pen Locations: The current pen location is moved to a new one.

Set Pen Mode: Pen Mode is the type of logic operation used to determine how a drawing is to appear in a bit image. There are eight transfer modes in QuickDraw. The given mode is set when this message is processed.

Set Pen Size: The pen in the current port is set to the given size.

Set a Pattern for pen, Filling or Background: A pattern is an 8-by-8-bit design and is used for some graphic operations. For example, the pen pattern is used to draw a line and therefore, the area defined by the line is continuously "painted" by the pen pattern. There are five standard pen patterns in QuickDraw: white, black, gray, light gray and dark gray. Patterns are subject to change. Therefore, to set a pattern, pattern data is fetched and is used to replace the previous pattern.

Set Pattern Alignment: By default, the top left corner of a pattern is aligned with the top left corner of the portRect which defines a grafPort rectangle. The alignment location is changed to the given place when this message is processed.

Set Background or Foreground Color: The background or foreground color is set to the given color.

Device Color Table: A device color table is read and translated.

Device Screen Size: A screen size is retrieved.

Device Depth: A device color ability is retrieved.

Set a Color Pattern for Pen, Filling or Background: A pixel map pattern and a color table are set for the same purpose as those of bitmap patterns.

Set Highlight Mode and Pixel: A highlight color and its flag are set.

Referring now to FIGS. 8A–8E, flow charts illustrating exemplary graphics operations according to the present invention are shown.

Figure 8A:
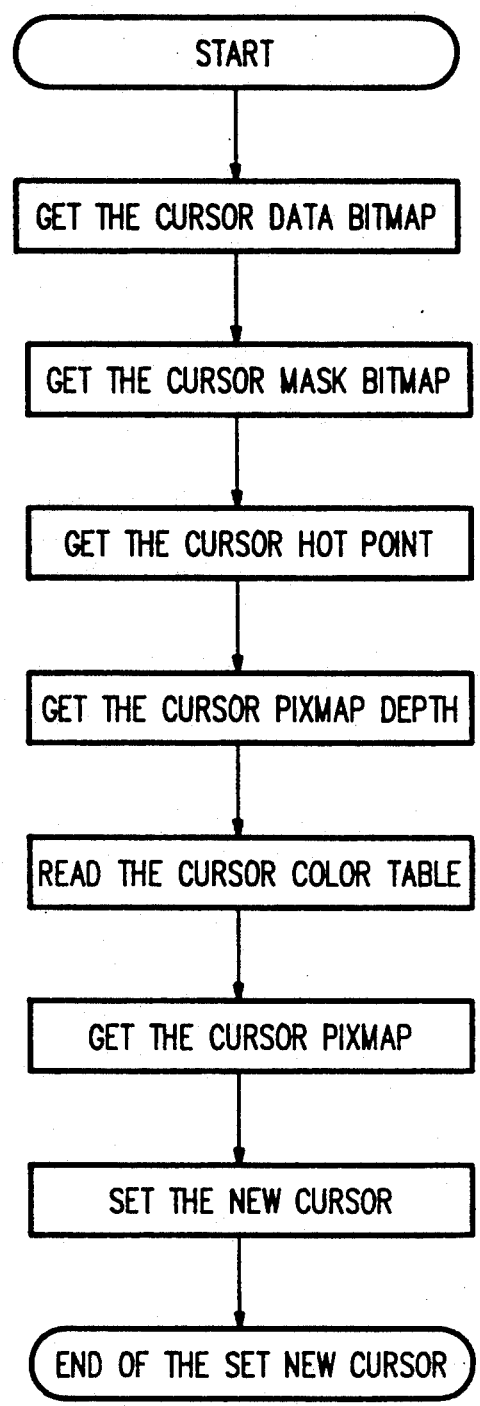
FIGS. 8A–8E are flow diagrams of examples of QDC message translation according to the principles of the present invention.

Cursor: FIG. 8A: Set a new color cursor (see FIG. 2)
        Get the cursor data bitmap;
        Get the cursor mask bitmap;
        Get the cursor hot point;
        Get the cursor pixmap depth;
        Get the cursor color table;
        Get the cursor pixmap; and
        Get the cursor as the current one.

Figure 8B:
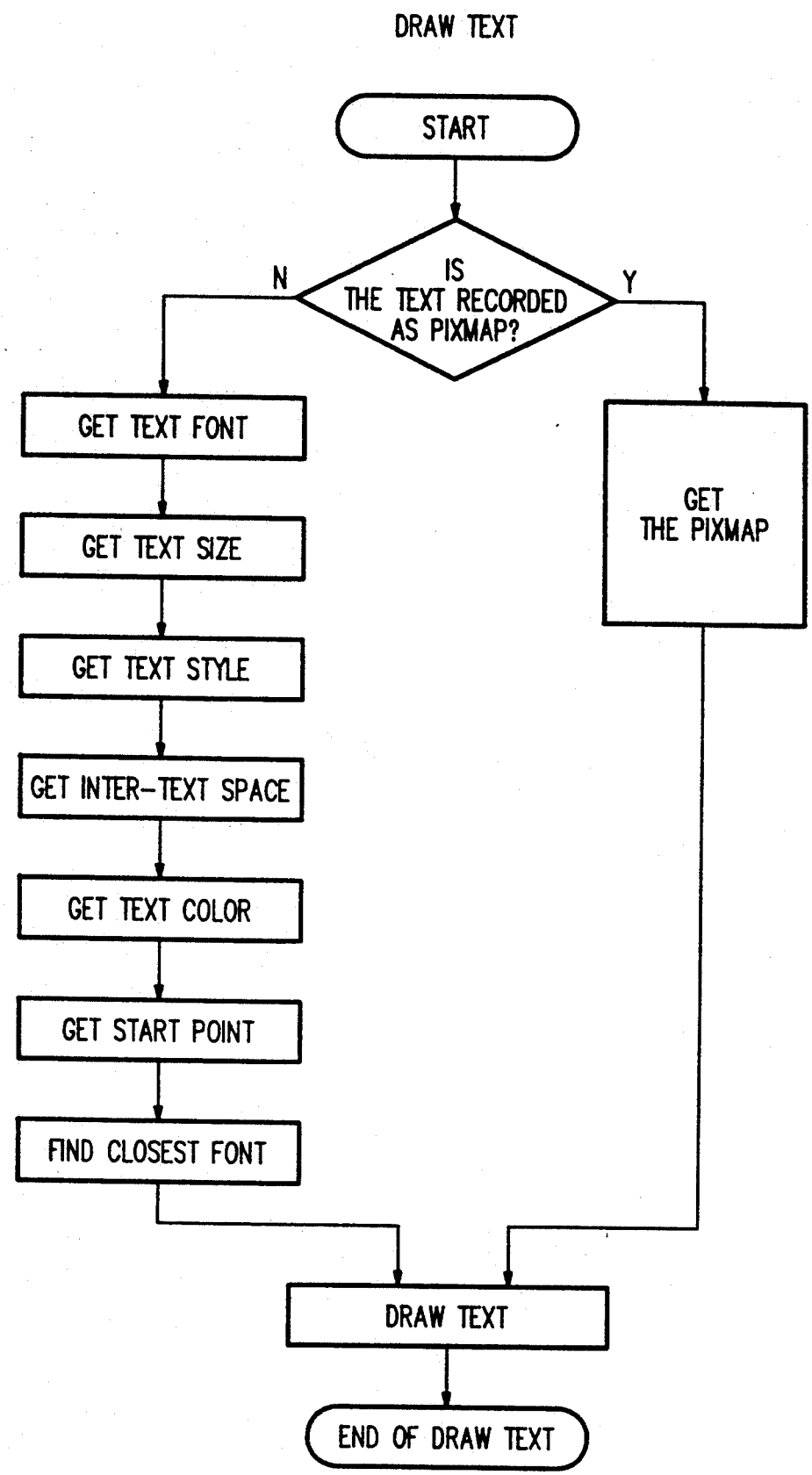
Figure 8C:
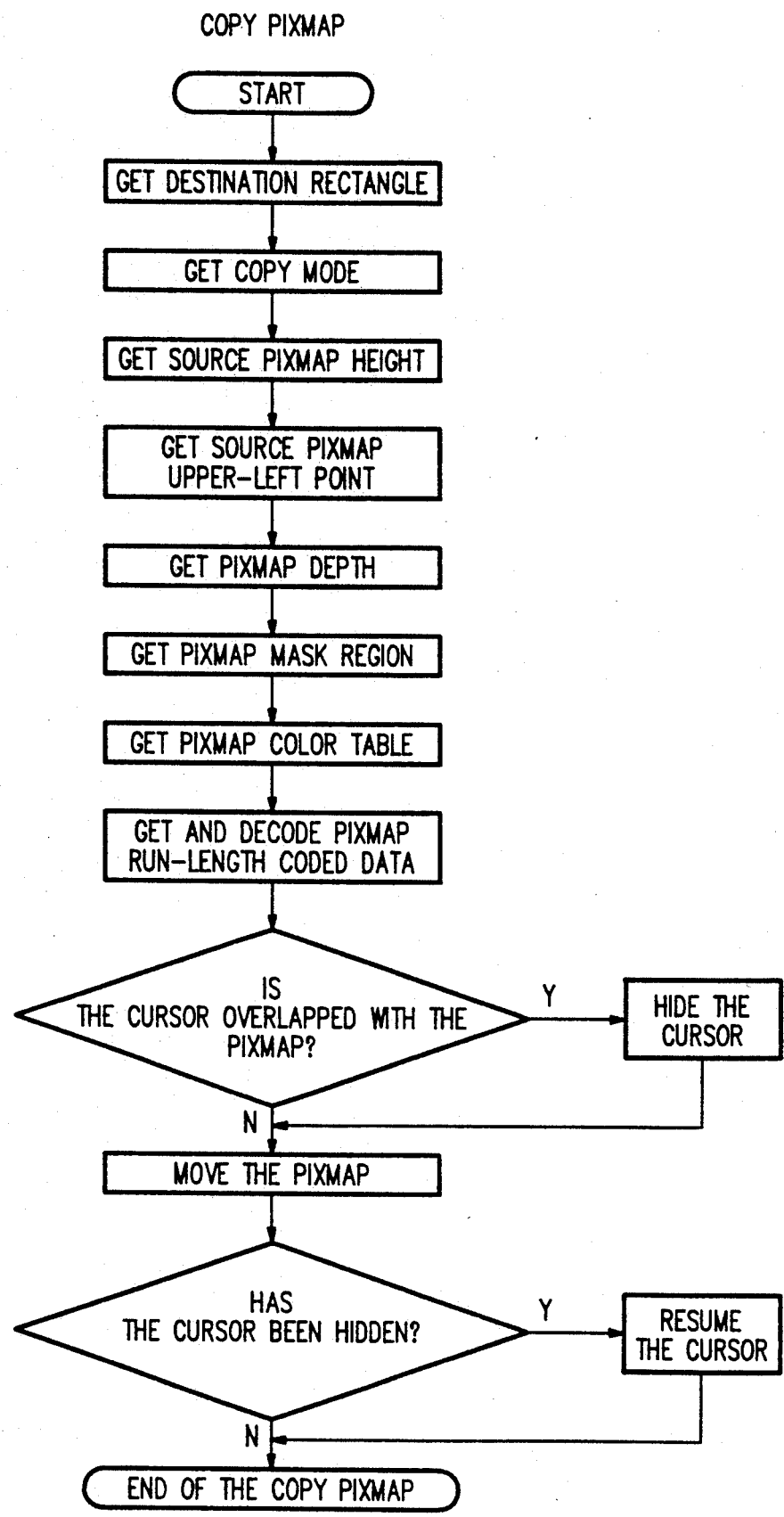

Text: FIG. 8B: Draw text
        Text can be either recorded as text data or pixmap;
        If recorded as text data:
        Get text font;
        Get text size;
        Get text style;
        Get inter-text space;
        Get text color;
        Get start point where to draw;
        Find the closest font in playback system;
        Otherwise, the text is recorded as pixmap. Get the pixmap.
        Draw the text on the playback screen;

Pixel Map: FIG. 8C: Copy Pixmap
        Get destination rectangle where the pixmap is to be copied to;
        Get copy mode;
        Get source pixmap height which is the column number;
        Get source pixmap upper-left point;
        Get pixmap mask region: To avoid record or send data which is not needed in a pixmap, a mask region is used to define the pixmap to be recorded or sent;
        Get pixmap color table: each Pixmap has its own color table Pixmap is compressed in run-length code. So it has to be decoded before being used by pixmap operation procedures
        Check to see if the cursor on the playback screen is overlapped with the pixmap. If so, hide the cursor;
        Move the source pixmap to the destination rectangle;
        Check to see if the cursor has been hidden, if so, resume the cursor.

Figure 8D:
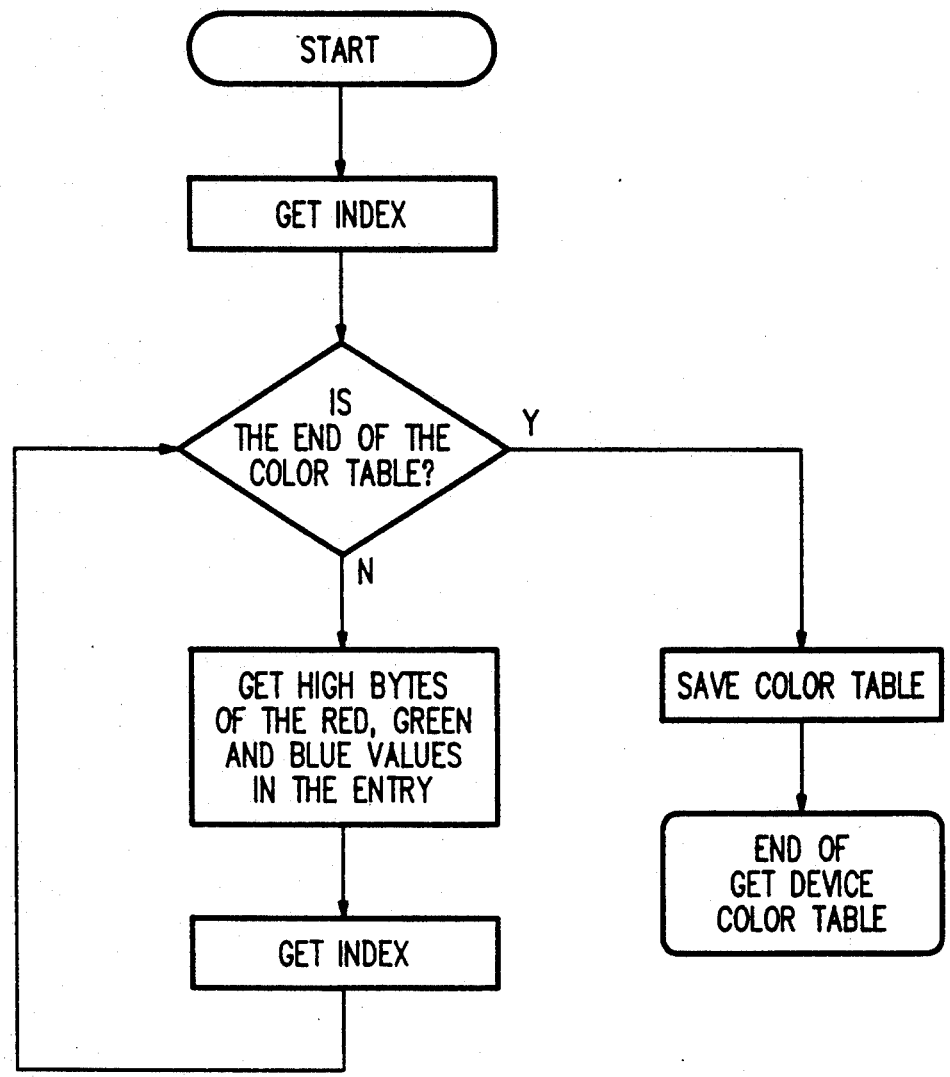

Graphic context: FIG. 8D: Get device color table
        Get index: Color table index are cardinals. Minus one is used for the flag of the end of the color table;
        Test to see if the end of the color table is reached;
        If not the end of the color table, retrieve the high bytes of the red, green and blue values. Since the data structure of the color table in QuickDraw is different from that of the color table in MS-Windows GDI (QuickDraw uses integers to hold red, green and blue values. GDI uses bytes.), we have to sacrifice the color information fidelity during the translation process.

Otherwise, the end of color table is detected. The retrieved color table is saved for the following graphics drawing or pixmap operations.

Graphics: This category messages are to implement five QuickDraw standard graphic operations (frame, fill, paint erase and invert) on rectangles, rounded-corner rectangles, ovals, arcs, polygons and regions. There is also a line drawing operation included in this category.

The basic technique used for those five graphic operations mentioned above is to create a region which can exactly represent the given geometric shape and then fill it with a certain pattern, a certain arithmetic mode and the current graphics context.

a. Create a region:
  Rectangle: create a rectangle region;
  Rounded-corner rectangle: create two rectangle regions and four oval regions and union them into a rounded-corner rectangle;
  Oval: Create an oval region:
  Arc:
    create an oval region Rgn1such that the arc is part of the oval;
    find two arc end points on the oval and expand these two points to the rectangle which includes the oval to get two points, say p1 and p2, on the rectangle. The rectangle is divided into two parts; say r1 and r2, by p1, p2 and the center of the oval;
    create a region Rgn2 which is one of r1 and r2 and does not intersect the arc.
    the difference of Rgn1 and Rgn2 is the arc region.
  Polygon: create a polygon region.
  Region:
    get region inversion points from region data.
    create rectangle regions from the inversion points row by row.
    union all small rectangle regions into a region which is what we want.
b. Graphics Operation:
  (on the region created above, for example)
  Frame:
    copy the original region, say Rgn1, to Rgn2;
    shrink Rgn2 by the current pen size;
    get the frame region from the difference of Rgn1 and Rgn2;
    fill the frame region with the current pen pattern and the current arithmetic mode.
  Paint:
    fill the region with the current background pattern and copy mode.
  Invert:
    invert pixels in the region.
  Fill:
    fill the region with the current fill pattern and copy mode.

Figure 8E:
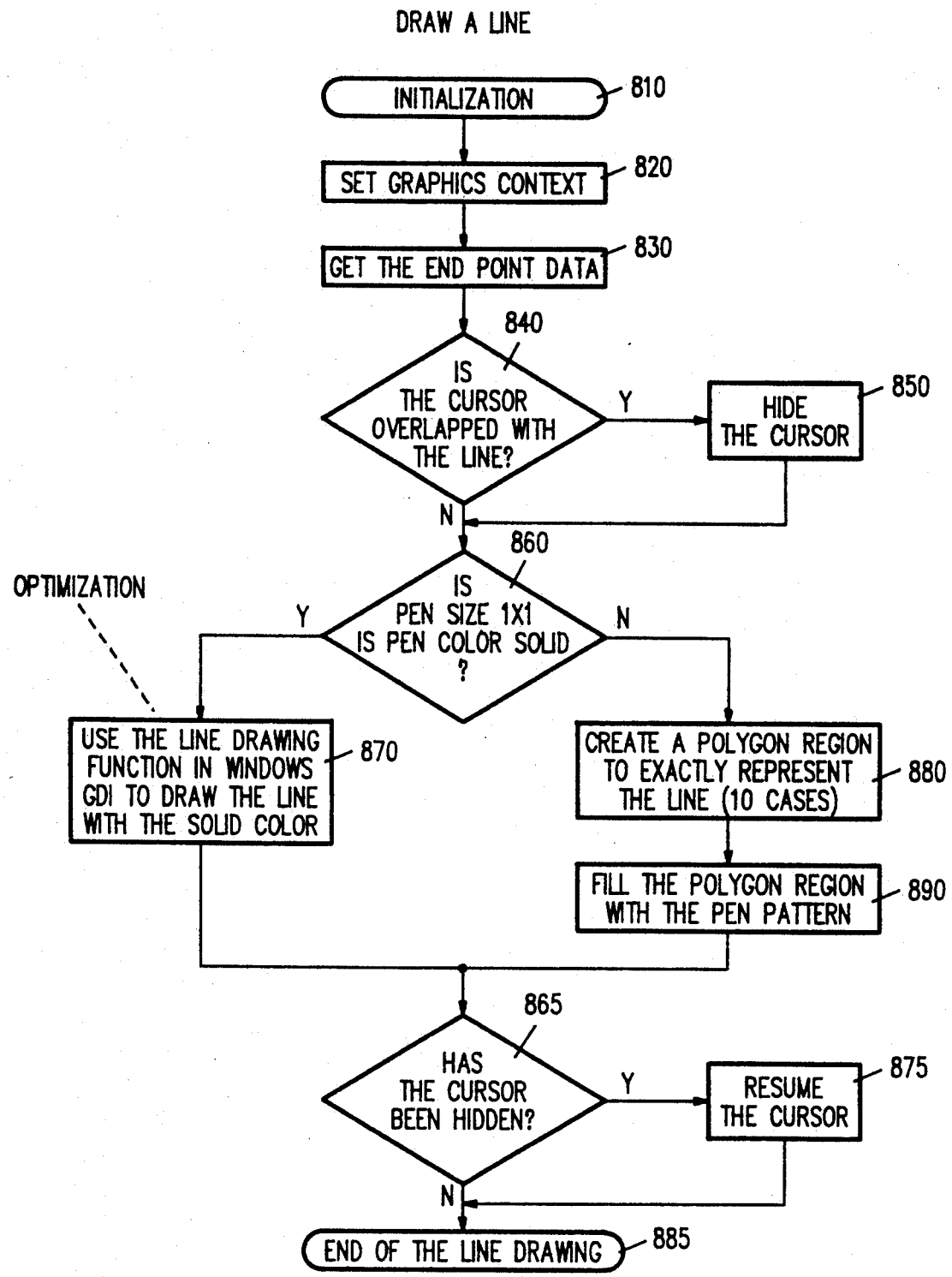

Referring to FIG. 8E, a Line Draw operation in accordance with the generalized graphics operation described above is illustrated.

Initialization operation 810: A playback window has to exist. The drawing environment is set to a given grafPort which is created according to the recording graphics environment.

Set Graphics Context, operation 820: At least the following elements of the current graphics context must be set:
mapping mode;
window origin;
viewport origin;
window extents;
brush pattern;
foreground color;
background color;
drawing mode;
brush origin;
clipping region;
pen size;
current pen position.

Get End Point Data, operation 830: Following the line drawing message, the end point data of the line must be fetched.

Check for cursor overlap, operation 840: The cursor is often floating on the display screen. It should not affect or be affected by any graphic operation, and should not be covered by any other graphic object on the screen. If the line to be drawn will intersect with the cursor, the cursor must be hidden.

Hide Cursor, operation 850: As discussed above, if the graphic object to be drawn is going to intersect the cursor currently on the screen, the cursor must be hidden. The cursor is erased and then the image under the cursor is restored.

Imaging, operation 870: Since the graphic functions in QuickDraw are implemented differently from those in MS-Windows GDI, QuickDraw functions are rebuilt with different algorithms in the MS-Windows environment. However, such algorithms may be optimized by directly using GDI functions. For example, if the pen size 860 is one bit wide and one bit in height and the pen pattern is solid color, a direct GDI line drawing function can be called to implement the tanslation. Alternatively, a line drawing function may be created by processes 880 and 890.

Create a Polygon Region to Exactly Represent the Line to be Drawn, process 880: A line is defined by two points: the starting point (i.e., the current pen location), say (x1,y1), and the ending point (the data following the line drawing message), say (x2,y2). The area which the line will occupy is defined by the starting and ending points and the current pen size because the pen size in QuickDraw determines how wide its trajectory is when a graphic operation is taking place. Since there is no counterpart in MS-Windows for creating a line drawing according to QuickDraw operations, a region is created which precisely represents the area defined by the pen size and the given line. There are ten conditions which must be resolved in the process of creating this region:

| | | |
|---|---|---|
| 1. $x1 = x2, y1 > y2$: | the region is a 4-point polygon; extending from the bottom to the top. |
| 2. $x1 = x2, y1 < y2$: | the region is a 4-point polygon; extending from the top to the bottom. |
| 3. $x1 > x2, y1 = y2$: | the region is a 4-point polygon; extending from the right to the left. |
| 4. $x1 < x2, y1 = y2$: | the region is a 4-point polygon; extending from the left to the right. |
| 5. $x1 > x2, y1 > y2$: | the region is a 6-point polygon; extending from the bottom right to the top left. |
| 6. $x1 > x2, y1 < y2$: | the region is a 6-point polygon; |

-continued

| | |
|---|---|
| | extending from the top right to the bottom left. |
| 7. x1 < x2,y1 > y2: | the region is a 6-point polygon; extending from the bottom left to the top right. |
| 8. x1 < x2,y1 < y2: | the region is a 6-point polygon; extending from the top left to the bottom right. |
| 9. x1 = x2,y1 = y2: | the region is a 4-point polygon; no direction specified. |

10. Exceptions:
  a. if |x1−2| < the width of the pen, and if |y1−y2| < the height of the pen, revert to case 9, since it cannot be smaller than a point;
  b. if (the width of the pen<0), or if (the height of the pen<0), nothing should be drawn.

Fill the Polygon with the Pen Pattern, process 890: This operation completes the line drawing process. It fills the region which in fact represents the line to be drawn with the given pen pattern. The pen mode decides how the pen pattern is going to blend with the image already on the screen.

Check for Cursor Operation 865: If the cursor was hidden before the line was drawn, it must be resumed.

Resume the Cursor, operation 875: Mask and cursor data is used with screen logic operations to restore the cursor to its original location.

GDI Playback on Macintosh

As stated elsewhere in the specification, GDI is used for imaging all complex graphic operations on a PC-AT. Again, among other PC-ATs, playback of recorded graphic functions is rapid and accurate. For playback of GDI graphic operations on a Macintosh, GDI functions must be captured and translated for playback on a Macintosh.

Referring now to FIGS. 4c and 5c, the GDI Capture Module also referred to as Hooker, first captures the graphic operation from GDI. The captured messages are either saved as a stored file or sent to other computers via computer networks, modems or ISDN, etc. If the windowing system which is used to playback the captured messages is GDI, the computer screen sharing is said to be homogeneous. If the windowing system used for playback is not GDI, the computer screen sharing is heterogeneous.

Referring now to FIGS. 6 and 9A-9E, in order to playback GDI messages on a Macintosh, a playback environment must be set up in a manner not unlike the process (as shown in FIG. 6) required for playback of QuickDraw messages on a PC-AT. For example, a playback window has to be opened for the visual graphics messages, and the location, size, and related parameters of the window must be defined. The Pascal procedure and function definitions that are called to perform the various aspects of playing back MS-Windows/GDI Messages on the Macintosh system are defined as follows:

| FUNCTION WIN_Initialize | |
|---|---|
| ( | |
| VAR session: | WIN_Session; |
| srcScrnWidth: | Integer; |
| srcScrnHeight: | Integer; |
| srcScrnDepth: | Integer; |
| winVersion: | Integer; |
| winCouldSendColor: | Boolean; |

| FUNCTION WIN_Initialize | |
|---|---|
| grayScaleOkay: | Boolean |
| ): OSErr; | |
| Parameters: | |
| OSErr: | Operating System Error code returned, zero means OK. |

Prepare to playback WIN messages into the current grafPort (window). The window becomes primarily the property of the playback session. Only its location, origin, and visRgn are preserved by the session. The foreground color should remain black and the background color white. The guest is responsible for scrolling the window. Also see WIN_PortChanged below.

| PROCEDURE WIN_Terminate | |
|---|---|
| ( | |
| VAR session: | WIN_Session |
| ): | |
| Parameters: | |
| session: | The record stores all information relevant to this session. |

Terminate the playback session, releasing memory allocations and disposing of all relevant information. Only call this routine when you wish to stop a playback session.

| PROCEDURE WIN_GetVersion | |
|---|---|
| ( | |
| VAR Session: | WIN_Session; |
| VAR version: | Integer; |
| VAR canImageColor: | Boolean |
| ); | |
| Parameters: | |
| session: | This record stores all information relevant to this session. |
| Version: | The current playback version is returned. |
| canImageColor: | Whether or not color can be drawn is returned. |

Return the current version of the playback session, and whether or not it can draw in color.

| FUNCTION WIN_PlayMessage | |
|---|---|
| ( | |
| VAR session: | WIN_Session; |
| msg Type: | SignedByte: |
| FUNCTION DataBytes Available (VAR bytesAvail: Integer): OSErr; | |
| FUNCTION ReadData (data: Ptr; len: Integer): OSErr; | |
| FUNCTION MapFont (srcFontNum: Integer): Integer | |
| ): OSErr; | |
| Parameters: | |
| session: | This record stores all information relevant to this session. |
| msgType: | The message type to be playbed back. |
| DataBytesAvailable: | This function is called to find out how many data bytes are available. |
| ReadData: | This function is called to read len bytes of data from the data stream. |
| MapFont: | This function is called to map the srcFontNum to an available font. |
| Result: | |
| OSErr: | Operating System Error code returned, zero means OK. |

Read the message's data (if any) and perform the drawing for one message. If not all the message data is available, WIN_PlayMessage will return the non-fatal error WIN_continueError. The caller should then proceed normally, but the next time it is checking for messages, it should call WIN_PlayMessage again with the message WIN_msgContinue. WIN_PlayMessage will read the additional message data (if available) and finish the drawing operation.

| FUNCTION WIN SkipMessage | |
|---|---|
| ( | |
| msgType: | Signed Byte; |
| FUNCTION ReadData (data: Ptr; len: Integer): OSErr; | |
| FUNCTION SkipBytes(numBytes:Integer): OSErr | |
| ): OSErr; | |
| Parameters: | |
| session: | This record stores all information relevant to this session. |
| msgType: | The message type to be played back. |
| ReadData: | This function is called to read len bytes of data from the data stream. |
| SkipBytes: | This function is called to skipnumBytesbytes of data in stream. |
| Result: | |
| OSErr: | Operating System Error code returned, zero means OK. |

Skip the message's data (if any) for one message in the data stream. This routine is not usually called. It could be used to browse through the data stream.

| PROCEDURE WIN_Draw | |
|---|---|
| ( | |
| VAR session: | WIN_Session; |
| r: | Rect; |
| maskRgn: | RgnHandle |
| ); | |
| Parameters | |
| session: | This record stores all information relevant to this session. |
| r: | The rectangular area to redraw. |
| maskRgn: | A mask region to be applied to the drawing. |

Redraw, update, the specified area of the window. This routine allows you to specify a rectangle and a mask region to intersect it with. It is normally called in response to an update event.

| PROCEDURE WIN_DrawRect | |
|---|---|
| (VAR session: | WIN_Session; |
| r: | Rect |
| ); | |
| Parameters: | |
| session: | This record stores all information relevant to the session. |
| r: | The rectangular area to redraw. |

Redraw, update, the specified rectangle of the window. It is normally called in response to an update event.

| PROCEDURE WIN_DrawRgn | |
|---|---|
| ( | |
| VAR session: | WIN_Session; |
| rgn: | RgnHandle |
| ); | |
| Parameters: | |

-continued

| PROCEDURE WIN_DrawRgn | |
|---|---|
| session: | This record stores all information relevant to this session. |
| maskRgn: | The region area to redraw. |

Redraw, update, the specified region area of the window. It is normally called in response to an update event.

| PROCEDURE WIN_SetClip | |
|---|---|
| ( | |
| VAR session: | WIN_Session; |
| playBackClip: | RgnHandle |
| ); | |
| Parameters: | |
| session: | This record stores all information relevant to this session. |
| playBackClip: | This region area to clip the playback to. |

Se an extra clipping region for playback.

| PROCEDURE WIN_SetGrayScaleOption | |
|---|---|
| ( | |
| VAR session: | WIN_Session; |
| grayScaleOkay: | Boolean |
| ); | |
| Parameters: | |
| session: | This record stores all information relevant to this session. |
| grayScaleOkay: | Allow mapping to gray scale, or restrict to colors. |

If the playback window is on a device that can't display all the source colors, should the window map to gray-scale or to a selection of default colors?

| FUNCTION WIN_GrayScaleMatters | |
|---|---|
| ( | |
| VAR session: | WIN_Session |
| ): Boolean; | |
| Parameters: | |
| session: | This record stores all information relevant to this session. |
| Result: | |
| Boolean: | Boolean, TRUE or FALSE, result returned. |

Will setting the gray scale option make any difference in the display

| PROCEDURE WIN_Move Cursor | |
|---|---|
| ( | |
| VAR session: | WIN_Session |
| newLoc: | Point |
| ); | |
| Parameters: | |
| session: | This record stores all information relevant to this session. |
| newLoc: | New point location to move the cursor to. |

Move the mouse pointer, cursor, to the location specified by the Point parameter.

| PROCEDURE WIN_StopDrawingOnScreen | |
|---|---|
| ( | |
| VAR session: | WIN_Session |
| ); | |
| Parameters: | |
| session: | This record stores all information relevant to this session. |

Stop drawing in the on-screen window. Drawing continues in the off-screen bitmap. The on-screen window will be brought up to date when WIN_ResumeDrawingOnScreen is called.

```
PROCEDURE WIN_ResumeDrawingOnScreen
(
VAR session:    WIN_Session
);
Parameters:
session:        This record stores all information relevant to
                this session.
```

Resume drawing in the on-screen window. Drawing also continues in the off-screen bitmap. The on-screen window will be brought up to date.

```
PROCEDURE WIN_CheckLocation
(
VAR session    WIN_Session
);
Parameters:
session:        This record stores all information relevant to
                this session.
```

Call WIN_CheckLocation if the playback window may have moved or changed size.

```
PROCEDURE WIN_Activate
(
VAR session:    WIN_Session;
activate:       Boolean
);
Parameters:
session:        This record stores all information relevant to
                this session.
activate:       activate, or deactivate, playback window.
Call WIN_Activateif the playback window was activated
or deactivated.
PROCEDURE WIN_CheckScreenDepth
(
VAR session:    WIN_Session
);
Parameters:
session         This record stores all information relevant to
                this session.
```

Call WIN_CheckScreenDepth when it is suspected that the screen depth might have changed. A good time would be when an update event for the window is handled. WIN_CheckLocation checks the screen depth so you don't need to call WIN_CheckScreenDepth where you are already calling WIN_CheckLocation.

```
PROCEDURE WIN_CheckWindowColorTable
(
VAR session:    WIN_Session
);
Parameters:
session:        This record stores all information relevant to
                this session.
```

Call WIN_CheckWindowColorTable when it is suspected that the window's device's color table might have been changed. A good time would be on activate events and update event.

```
PROCEDURE WIN_PortChanged
(
VAR session:    WIN_Session
);
```

-continued
```
Parameters
session:        This record stores all information relevant to
                this session.
```

Call WIN_PortChanged if you have changed anything in the playback window.

The GDI playback on a Macintosh will translate the captured messages into QuickDraw procedure calls on the destination Macintosh computer. In the preferred embodiment of the present invention, the implementation of the GDI playback on a Macintosh utilizes many native QuickDraw functions.

A playback session then must be opened to start the computer screen sharing. The session includes defining the proper data structure and GDI default graphics operational environment.

As noted before, QuickDraw sets up graphics ports differently than MS-Windows context. Therefore, both the graphics port necessary for QuickDraw operations and the graphics context similar to one in which MS-Windows functions must be set up.

Messages are obtained either from a stored file or from a communication channel. Such messages are handed down to Hooker by the higher-level application program.

For translation, GDI messages are roughly classified into six categories. A message can be with or without data following. Again, in a heterogeneous computer system, the data must be fetched and translated at least at the byte level. The GDI capture messages have the same ID number and message data as the corresponding QDC messages described hereinabove. Each message is translated differently according to its classification which is described elsewhere in this specification with reference to FIG. 7. The translation algorithms are optimized in order to playback quickly and save as much storage space as possible.

| Cursor: | 3 messages |
|---|---|
| WIN_CMD_SETCURSOR | |
| WIN_CMD_HIDECURSOR | |
| WIN_CMD_SETCURSORS | |
| Text: | 2 messages |
| WIN_CMD_TEXTOUT | |
| WIN_CMD_EXTTEXTOUT | |
| BitMap: | 4 messages |
| WIN_CMD_BITBLT | |
| WIN_CMD_STRETCHBLT | |
| WIN_CMD_BITBLT_SCREEN | |
| WIN_CMC_STRETCHBLT_SCREEN | |
| WIN_CMD_FLOODFILL | |
| WIN_CMD_EXTFLOODFILL | |
| Graphical Objects: | 13 messages |
| WIN_CMD_SETPIXEL | |
| WIN_CMD_LINETO | |
| WIN_CMD_PATBLT | |
| WIN_CMD_ARC | |
| WIN_CMD_CHORD | |
| WIN_CMD_ELLIPSE | |
| WIN_CMD_PIE | |
| WIN_CMD_POLYGON | |
| WIN_CMD_POLYLINE | |
| WIN_CMD_RECTANGLE | |
| WIN_CMD_ROUNDRECT | |
| Graphics Context: | 33 messages |
| WIN_CMD_START | |
| WIN_CMD_STOP | |
| WIN_CMD_SELECTDC1 | |
| WIN_CMD_SELECTDC2 | |
| WIN_CMD_SELECTDC3 | |

-continued

```
WIN_CMD_SELECTDC4
WIN_CMD_SELECTDC5
WIN_CMD_SELECTDC6
WIN_CMD_SELECTDC7
WIN_CMD_SETDCORG
WIN_CMD_SETVIEWPORTEXT
WIN_CMD_SETVIEWPORTORG
WIN_CMD_SETWINDOWEXT
WIN_CMD_WINDOWORG
WIN_CMD_SELECTOBJECTPEN
WIN_CMD_SELECTOBJECT_BRUSH
WIN_CMD_SELECTOBJECT_PATTERNBRUSH
WIN_CMD_SELECTOBJECT_STOCKBRUSH
WIN_CMD_SELECTOBJECT_FONT
WIN_CMD_SELECTOBJECT_REGION
WIN_CMD_MOVETO
WIN_CMD_SETBRUSHORG
WIN_CMD_SETROP2
WIN_CMD_SETMAPMODE
WIN_CMD_SETBKMODE
WIN_CMD_SETBKCOLOR
WIN_CMD_SETPOLYFILLMODE
WIN_CMD_SETRELABS
WIN_CMD_SETSTRETCHBLTMOD
WIN_CMD_SETTEXTALIGN
WIN_CMD_SETTEXTJUSTIFICATION
WIN_CMD_SETTEXT COLOR
WIN_CMD_SETTEXTCHARACTEREXTRA
Reserved:          4 messages
WIN_CMD_FASTWINDOFRAME
WIN_CMD_SAVESCREENITMAP
WIN_CMD_MOUSE
WIN_CMD_KEYBOARD
```

Figure 9A:
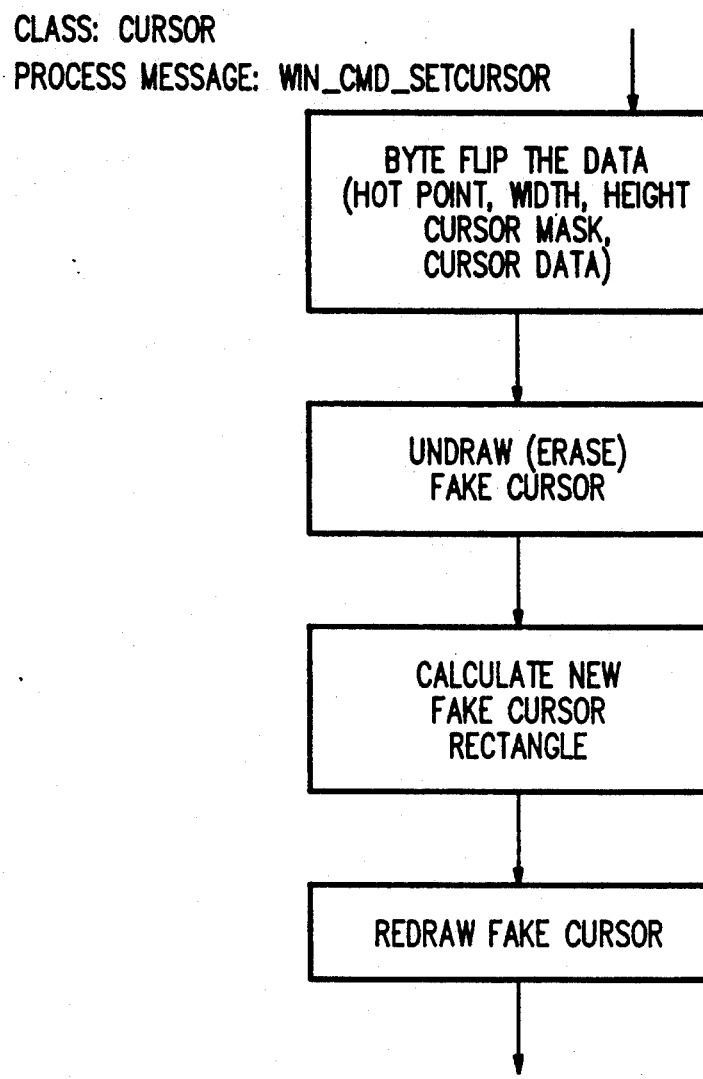
FIGS. 9A–9E are flow diagrams of examples of GDI message translation according to the principles of the present invention.

FIGS. 9A–9E provide flow diagrams illustrating the processing of exemplary MS-Window/GDI messages. With reference to FIG. 9A, to Process the WIN_CMD_SETCURSOR message, the data associated with this message must be byte swapped. All data fields that are two byte integers, or four byte long integers must be byte flipped. This will translate all the native 80×86 data field into native 680×0 data.

Since a new cursor shape, size, position, and hot spot will be set, the current cursor must be undrawn (i.e., erased) from the window. This is accomplished simply by copying the image behind the cursor to the window, thus removing the cursor.

Calculate the new cursor's bounding rectangle, since any one of its attributes, shape, size, position and hot spot, or all may have changed. The hot spot is aligned with the cursor's current position.

Since the cursor is no longer visible it must be redrawn. This is accomplished by first CopyBitsing the cursor's mask onto the window using the not SrcOR transfer mode, then CopyBitsing the cursor data onto the window using the SrcXOR transfer mode.

Figure 9B:
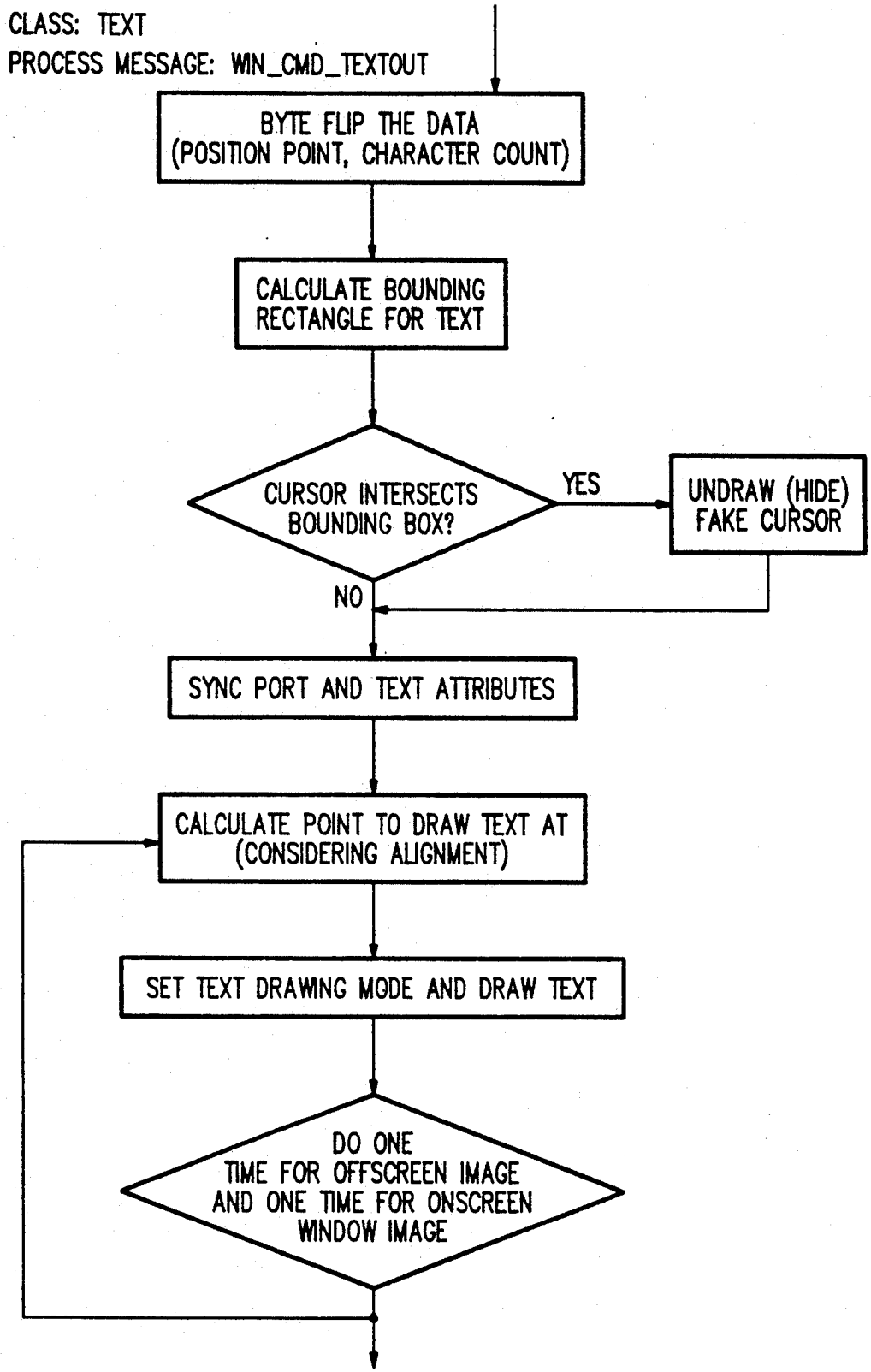

With reference to FIG. 9B, to process the WIN_CMD_TEXTOUT message, the data associated with this message must be byte swapped. All data fields that are two byte integers, or four byte long integers must be byte flipped. This will translate all the native 80×86 data fields into native 680×0 data. Only the horizontal and vertical position points and the character count are flipped. The actual characters to be drawn, the text itself, is not byte swapped. This is because the data is a stream of characters, each one byte long, and only fields larger than one byte need to be byte swapped.

Calculate the text's bounding rectangle. Set the text size and style, which must be derived from the specified font's height, weight, and style information. The font information provides the character height while text width is determined by measuring the length of the text using the TextWidth routine. Next, the starting point to a pixel location is mapped; this takes into account the GDI mapping modes, viewport and window extents and origins. From this point, using the text width, height, and text alignment flags, the text's bounding rectangle and where to actually start drawing the text can be calculated. If the cursor's rectangle intersects the calculated bounding rectangle for the text, the current cursor must be undrawn from the window, since the cursor floats on top of the image.

To set Sync Port and Text Attributes, the current port is set to the session's port and the QuickDraw pen is set to the normal Pen, the foreground color is set to black, the background color is set to white, the background pattern is set to white, and the pen pattern is set to black. The text font is set to the default application font, the text size is set to twelve point, the text's face, or style, is set to bold and condense, and the text mode is set to srcOR plus the text mask mode flag.

The point at which to start drawing the text is now calculated as described above. This routine takes into account all the text alignment options and also calculates the text's bounding rectangle.

Setting the text drawing mode takes into account the GDI background mode, which can be either transparent or opaque, the GDI text color, and the GDI background color. Using this mode and colors the text mode and foreground and background colors are set appropriately.

Move the pen to the calculated drawing point and call DrawText to draw the text.

Most all of the previous steps must be done one time for the off-screen copy of the image, and one time for the on-screen image displayed in the window.

Figure 9C:
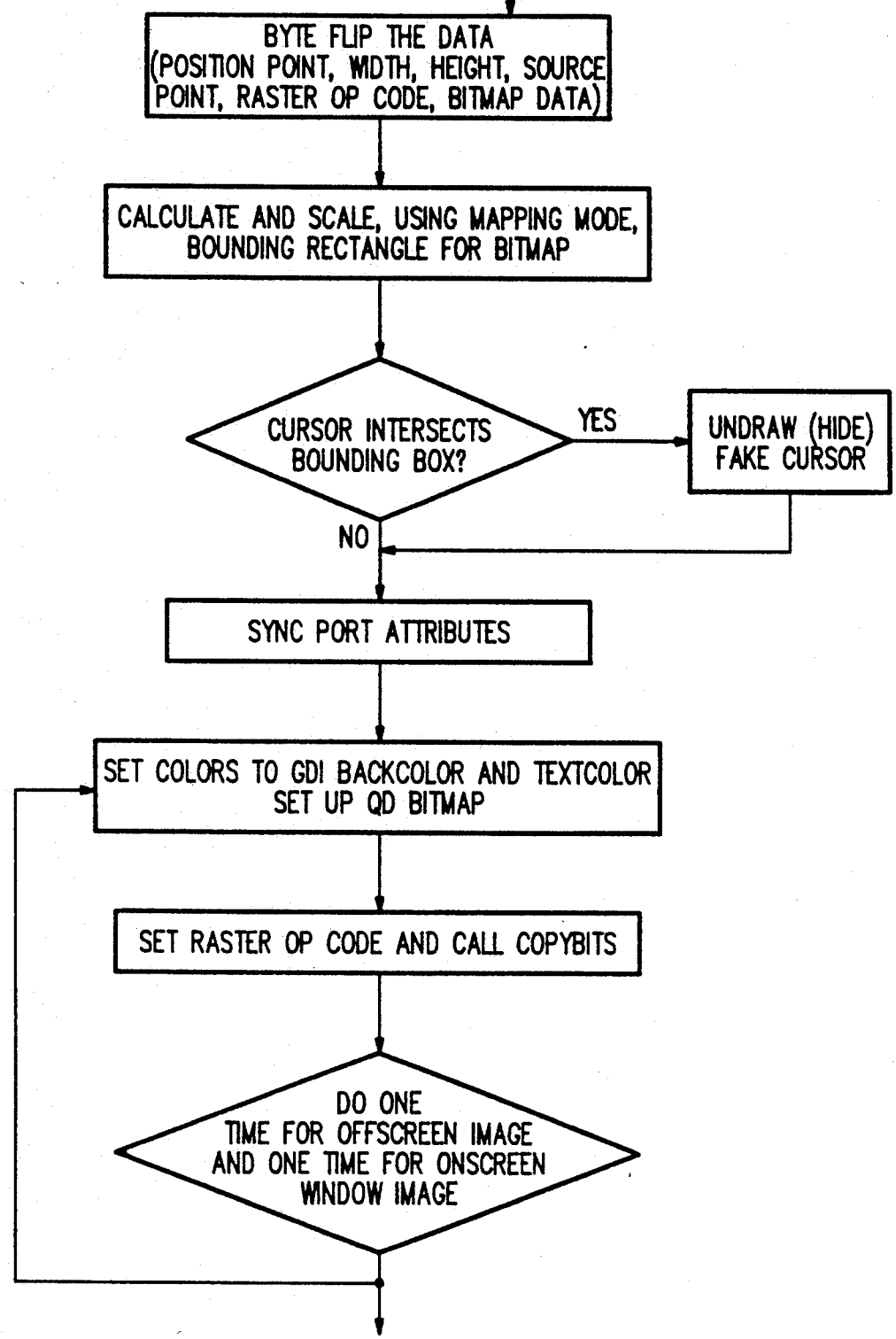

With reference to FIG. 9C, to process the WIN_CMD_BITBLTmessage, the data Associated with this message must be byte swapped. All data fields that are two byte integers, or four byte integers must be byte flipped. This will translate all the native 80×86 data fields into native 680×0 data. Only the horizontal and vertical position points, width, height, source position point, and the raster operation code are flipped. The actual bitmap data to be drawn is not byte swapped. This is because the data is a stream of bits, packed eight bits into one byte, and only fields larger than one byte need to be byte swapped.

Calculate the bitmap's bounding rectangle. Calculate the bounding rectangle using the position point and the height and width of the bitmap. The bounding rectangle may need to be scaled by taking into account the GDI mapping modes, viewport and window extents and origins.

If the cursor's rectangle intersects the calculated bounding rectangle for the bitmap, the current cursor must be undrawn from the window, since the cursor floats on top of the image.

To Sync Port Attributes, the current port is set to the session's port and the QuickDraw pen is set to the normal pen, the foreground color is set to black, the background color is set to white, the background pattern is set to white, and the pen pattern is set to black.

Set foreground color to the GDI text color, and the background color to the GDI background color. A QuickDraw bitmap that represents the GDI bitmap must also be created and initialized.

Determine which QuickDraw transfer mode, or combination of transfer modes, has the same effect as the GDI raster operation code and call CopyBits one or more times as required using the QuickDraw transfer modes.

Most all of the previous steps must be done one time for the off-screen copy of the image, and one time for the on-screen image in the window.

Figure 9D:
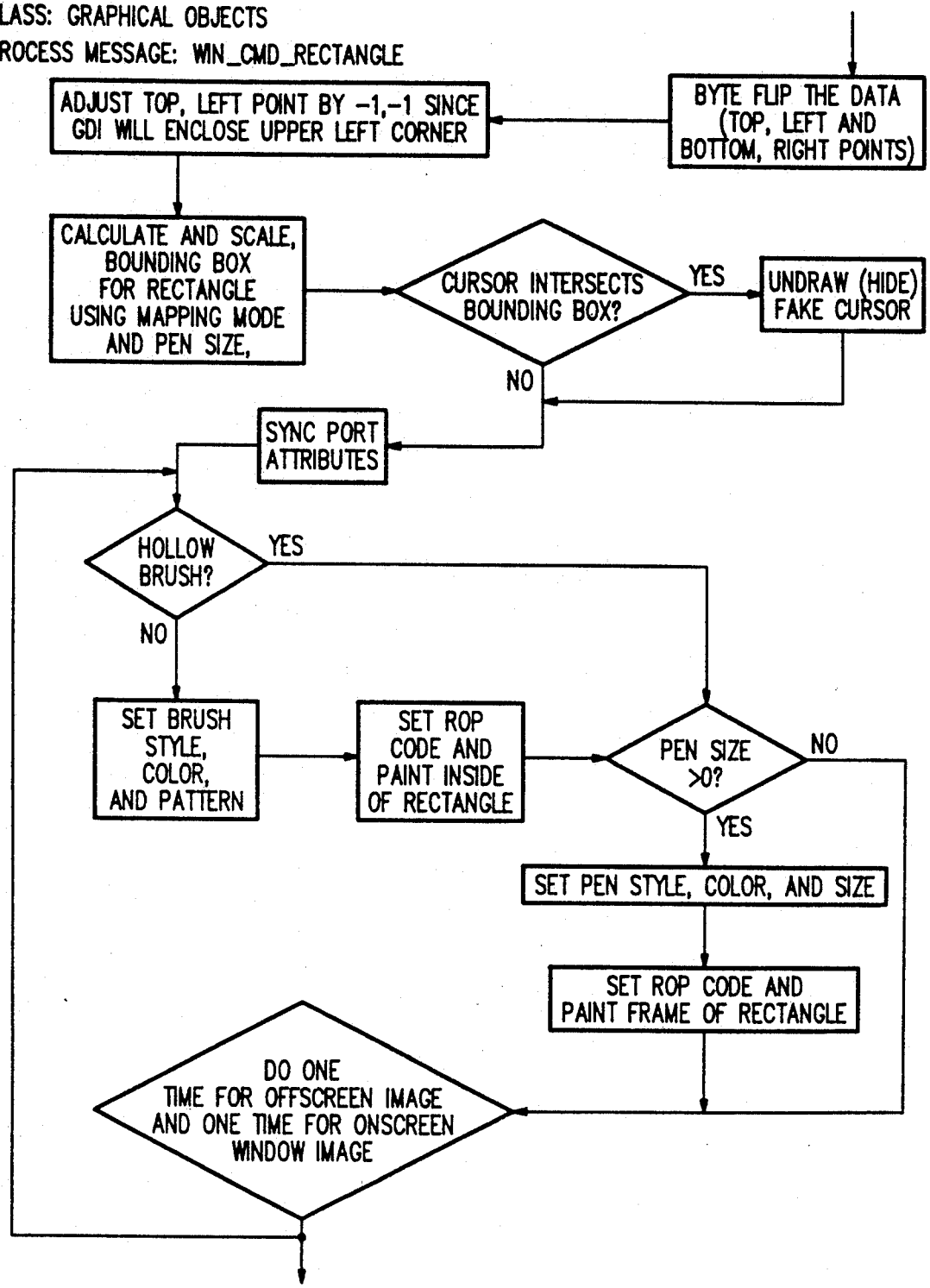

With reference to FIG. 9D, to process the WIN_CMD_RECTANGLE message the data associated with this message must be swapped. All data fields that are two byte integers, or four byte long integers must be byte flipped. This will translate all the native 80×86 data fields into native 680×0 data.

The top coordinate and the left coordinate must be both decremented by one since GDI encloses the top left point in an object when drawing it, and QuickDraw does not. This also accounts for the fact that GDI bits represent the screen pixels while QuickDraw bits represent infinitely thin lines between the screen pixels in the screen coordinate system. The QuickDraw pen also hangs down and to the right of a bit or point, whereas the GDI pen is normally centered over the bit or point.

Calculate the graphical object's bounding rectangle. This operation must also take into account the pen size, and its style. The pen's style must be considered since it determines whether the pen is centered on top of the object's frame, or completely inside the object's frame. Calculate the bounding rectangle using the top left and bottom right bounding points of the graphical object, and one half the pen size, if its style is centered. The bounding rectangle may need to be scaled by taking into account the GDI mapping modes, viewport and window extents and origins.

If the cursor's rectangle intersects the calculated bounding rectangle for the graphical object, the current cursor must be undrawn from the window, since the cursor floats on top of the image.

To set Sync Port Attributes, the current port is set to the session's port and the QuickDraw pen is set to the normal pen, the foreground color is set to black the background color is set to white, the background pattern is set to white, and the pen pattern is set to black.

If the brush style is hollow, skip to the check for pen size less than, or equal to zero. If the brush style is not hollow, translate the GDI brush style, color, and pattern into their respective QuickDraw counterparts. This involves setting up the proper QuickDraw pen pattern, pen mode, foreground color and background color.

Determine which QuickDraw transfer mode, or combination of transfer modes, has the same effect as the GDI raster operation code and call PaintShape one or more times after setting the QuickDraw transfer modes. For the arc graphical object, the PaintShape routine does nothing since an arc is an elliptical line rather than a filled area. To paint the inside of a roundrect shape, the pen width is determined, and a new roundrect region is created by framing the original roundrect. The region is then inset by the size of the pen, one-half the pen size if the pen is centered, and painted. This method is used to completely fill the rounded corners. To paint a chord, an oval region is created by painting the bounding rectangle with an oval. A second region is then created by drawing a line connecting the two points on the circle, and then extending the line in both directions until both ends intersect the bounding rectangle. The intersection of these two regions is then adjusted for the pen size and painted. To paint a pie graphical object, simply call PaintArc, after calculating the angles. Another method for painting the pie, would be to create a region in the same manner used for the chord, and paint the region.

If the pen size is less than, or equal to zero skip the pen drawing section. If the pen size is greater than zero, translate the GDI pen style, color, and size into their respective QuickDraw counterparts. This involves setting up the proper QuickDraw pen size, pen pattern, pen mode, foreground color, and background color.

Determine which QuickDraw transfer mode or combination of transfer modes, has the same effect as the GDI raster operation code and call FrameShape one or more times after setting the QuickDraw transfer modes. For the arc graphical object, simply call FrameArc, after calculating the angles. To frame a roundrect shape, a new roundrect region is created by framing the original roundrect. The frame of the region is then drawn. This method is used so that if the roundrect is also painted, the rounded corners will be completely filled in. To frame a chord, after calculating the two angles, call FrameArc to draw the arc, then calculate the two endpoints, and draw a line connecting them, or a region could be created in the same manner used for painting the chord, and frame the region. To frame a pie graphical object, call FrameArc after calculating the two angles. Two lines must then be drawn from the midpoint to each of the endpoints of the arc. One could also create a region in the same manner used for the chord, and frame the region.

Most all of the previous steps must be done one time for the off-screen copy of the image, and one time for the on-screen image in the window.

Figure 9E:
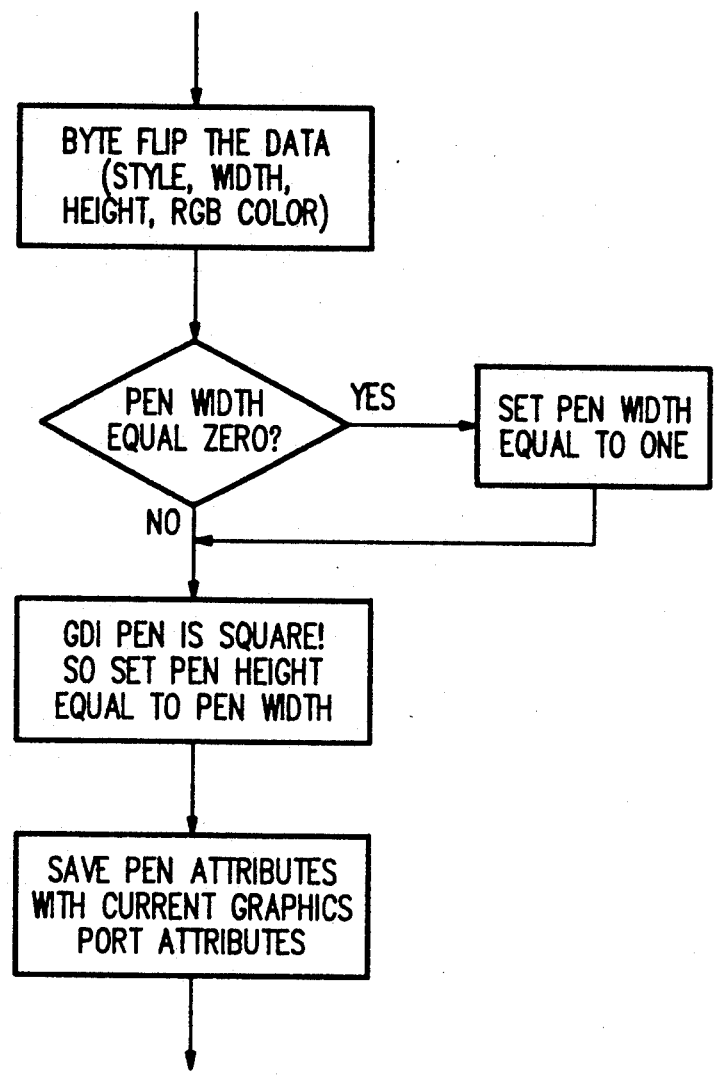

With reference to FIG. 9E to process the WIN_CMD_SELECTOBJECT_PEN message all the data associated with this message must be byte swapped. If the pen width is zero, the GDI sets the width to one. Since the GDI pen is square, its height and width must be the same. Therefore, since GDI only uses the pen width, the pen's height must be set equal to its width to define a square pen. The new GDI pen attributes thus set are saved with the current session's graphics port attributes.

The present invention has been particularly shown and described with respect to certain preferred embodiments thereof. However, it should be readily apparent to those of ordinary skill in the art that various changes and modifications in form and details may be made without departing from the spirit and scope of the invention as set forth in the appended claims.

We claim:

1. A method for control and playback of information displayed on a source computer having a resident graphics interface means on at least one destination computer having a resident graphics interface means differing from said source computer's graphics interface means in ways which include but are not limited to its architecture, graphics primitives, geometry, applied program interface, run-time environment, said method comprising the step of:

intercepting and capturing source computer system graphics commands in the source computer;

translating on a command-by-command basis said captured source computer system graphics commands in one of said computers into one or more procedure calls for implementing said translated graphics commands on said destination computer such that the resulting graphics image on the destination computer will be substantially the same as the image on the source computer;

calling up graphics routines corresponding to the procedure calls in the destination computer; and imaging graphics corresponding to said procedure calls on said destination computer.

2. The method as in claim 1 wherein:

said step of capturing source computer graphics commands includes the step of capturing destination computer event messages;

said step of translating source computer system graphics commands into procedure calls includes the step of translating said captured destination computer event messages into event messages compatible with said source computer.

3. The method of claim 2 wherein said steps of capturing and translating said destination computer system event messages includes the steps of capturing and translating source computer system event messages into event messages compatible with said destination computer.

4. The method as in claim 3 wherein the steps of translating said captured source computer graphics commands and event messages are performed by said source computer, and further includes the step of transporting said translated source computer graphics commands and event messages to said destination computer.

5. The method of claim 4 wherein the step of transporting said translated graphics commands includes the steps of storing a data file comprising said translated source computer graphics commands in storage media and transporting said storage media to said destination computer.

6. The method of claim 4 wherein the step of transporting said captured source computer event messages includes the steps of storing a data file comprising said captured event messages in storage media and transporting said storage media to said destination computer.

7. The method of claims 5 or 6 wherein said storage media comprises a magnetic storage disk.

8. The method of claim 4 wherein the step of transporting said translated source computer graphics commands and event messages includes the step of transmitting said translated source computer graphics commands and event messages over a computer network.

9. The method as in claim 3 further including the step of transporting said captured source computer graphics commands and event messages to said destination computer; and said steps of translating said captured source computer graphics commands and event messages are performed by said destination computer.

10. The method of claim 9 wherein the step of transporting said captured source computer graphics commands and event messages includes the step of transmitting said captured source computer graphics commands and event messages over a computer network.

11. The method of claim 2 further including the steps of:

capturing event messages on at least one destination computer;

transporting said captured destination computer event messages to said source computer;

translating said captured destination computer event messages into event messages compatible with said source computer on said source computer system; and generating events corresponding to said translated event messages on said source computer system.

12. The method of claim 1 wherein the step of capturing source computer graphics command includes intercepting source application commands being transmitted to a graphics library resident in said source computer.

13. The method of claim 12 wherein said source application commands include procedure calls to said graphics library for text and graphics routines.

14. The method of claim 13 wherein the step of capturing source computer graphics commands includes the step of altering the address of said called graphics routine to the address of a corresponding capture routine, said corresponding capture routine having a set of predetermined operations.

15. The method of claim 14 further including the step of performing said set of predetermined operations which includes the step of calling said previously called graphics routine addressed by said intercepted source application command.

16. The method of claim 14 including the additional steps of:

storing a bitmap representative of the computer screen for said source computer in a frame buffer in said source computer;

storing a plurality of bitmaps representative of the computer screens of the source computer and each of the destination computers in respective storage media of said source and destination computers;

comparing the bitmap stored in said frame buffer in said source computer with the bitmap stored in said storage media of said source computer to determine if said source computer bitmap in said frame buffer in said source computer is altered as a result of captured source computer graphics commands; and transporting only data for altering said bitmap in said destination computer in response to said captured source computer graphics commands.

17. The method of claim 13 wherein said graphic routines include graphics library low level routines.

18. The method of claim 1 wherein said step of translating said captured source computer graphics commands includes the steps of:

defining a computer screen sharing environment in said destination computer; and determining desired procedure calls compatible with a graphics interface means resident in said destination computer.

19. The method of claim 18 wherein playback on said at least one destination computer of information displayed on said source computer includes the steps of continuously changing said screen sharing environment in said destination computer consistent with the source computer graphics environment.

20. The method of claim 19 wherein said step of continuously changing said screen sharing environment in said destination computer includes the steps of:

setting a destination computer current port to a playback session port; and setting session port attributes to be consistent with source computer graphics attributes for the playback session.

21. The method of claim 19 wherein said step of continuously changing said screen sharing environment in said destination computer includes the steps of:

setting destination computer current device context to playback session device context; and setting session device context attributes to be consistent with source computer graphics attributes for the playback session.

22. The method of claim 18 wherein said step of translating said captured source computer graphics commands includes the step of continuously translating said captured source computer graphics commands into said desired procedure calls.

23. The method of claim 22 further including the step of making changes to said destination computer screen sharing environment for said desired procedure calls in response to said translated source computer graphics commands.

24. The method of claim 18 wherein said step of imaging said captured source computer graphics commands comprises the steps of:
initiating said computer screen sharing environment in said destination computer;
invoking said desired procedure calls.

25. The method of claim 1 further including the steps of:
transporting said captured source computer graphics commands to said destination computer; and
translating said captured source computer graphics commands into procedure calls for imaging said source computer system graphics commands on said destination computer.

26. The method of claim 1 wherein said source computer system and at least one destination computer comprise heterogeneous computers.

27. A system for control and playback of information displayed on a source computer on at least one destination computer, each of said computers having resident graphic display means, the graphic display means of said at least one destination computer differing from the graphic display means of said source computer in ways which include but are not limited to its architecture, graphics primitives, geometry, applied program interface, run-time environment, said system comprising:
capture means for intercepting and capturing within said source computer drawing messages employed by the graphic display means of said source computer; and
playback means for translating within one of said computers on a command-by-command basis said captured source computer drawing messages into one or more procedure calls for calling up graphics routines employed by the graphic display means of said destination computer and for imaging graphics corresponding to said procedure calls on said destination computer such that the resulting graphics image on the destination computer will be substantially the same as the image on the source computer.

28. A system as in claim 27 wherein said capture means includes processing means for intercepting and altering procedure calls called by said captured drawing messages.

29. A system as in claim 28 further comprising:
a source computer graphics library coupled to said source computer capture means and graphic display means and having drawing and graphics routines which convert graphics commands from application programs for presentation on said source computer display, said source computer graphic display means including a memory mapped, raster graphics display screen; and
a destination computer graphics library, coupled to said playback means and to said destination computer display means and having drawing and graphics routines which convert graphics commands from application programs for presentation on said destination computer display means, said destination computer graphics display means comprising a memory mapped, raster graphics display screen.

30. The system of claim 29 further comprising memory means coupled to said capture means and said playback means in said source computer and in each of said destination computers, respectively, wherein:
each respective graphics display screen is represented by a bitmap stored in said memory means of said source computer and said destination computers; and
each of said respective memory means maintains identical bitmap representations for corresponding display screen areas associated with captured source computer drawing commands.

31. A system as in claim 30 further including:
frame buffer means in said source and destination computers for storing bitmap representations of said display screens for said source and destination computers; and
comparison means in said source computer, coupled to said memory means and said frame buffer means in said source computer, for comparing the corresponding bitmap representation of said display screens in said memory means of said source computer with said bitmap representations of said display screen in said frame buffer means of said source computer to determine if said source computer screen display is altered in response to captured source computer drawing commands.

32. A system as in claim 31 wherein said comparison means transports only data for altering said destination computer screen display.

33. A system as in claim 28 wherein said processing means includes means for altering the address of source computer drawing routines associated with said procedure calls for calling corresponding substitute capture routines, said capture routines each having a set of predetermined operations associated therewith.

34. A system as in claim 33 wherein said processing means modifies at least some of the machine language instructions for the source computer drawing routines being intercepted.

35. A system as in claim 33 wherein said predetermined operations include an operation for calling the source computer drawing routine associated with said intercepted procedure call.

36. A system as in claim 27 further including:
translating means for translating said captured source computer drawing messages in said source computer; and
transport means for transporting said translated source computer drawing messages to said destination computer.

37. The method of claim 36 wherein said translating means includes storage means for storing a data file comprising said translated source computer drawing messages in storage media and transporting said storage media to said destination computer.

38. A system as in claim 37 wherein said transport means includes network means for coupling said source computer to at least one destination computer and for transmitting a data file comprising said translated source computer drawing messages between said source computer and said one of said destination computers.

39. A system as in claim 37 wherein said data file includes capture messages corresponding to said captured source computer drawing messages.

40. A system as in claim 37 wherein said storage media comprises a magnetic storage disk.

41. A system as in claim 27 further including:

transport means for transporting said captured source computer drawing messages to said destination computer; and translating means for translating said captured source computer drawing messages in said destination computer.

42. A system as in claim 41 wherein said transport means includes network means for coupling said source computer to at least one destination computer and for transmitting a data file comprising said captured source computer drawing messages between said source computer and said one of said destination computers.

43. A system as in claim 42 wherein said network means comprises a local area network.

44. A system as in claim 38 or 39 or 43 wherein said data file includes source computer screen data and drawing commands.

45. A system as in claim 42 wherein said network means comprises a wide area network.

* * * * *